(12) United States Patent
Jørgensen et al.

(10) Patent No.: US 11,840,050 B2
(45) Date of Patent: Dec. 12, 2023

(54) VIG UNIT LAMINATION

(71) Applicant: VKR Holding A/S, Hørsholm (DK)

(72) Inventors: Kristian Damholdt Jørgensen, Hørsholm (DK); Thomas Villiam Sejer Mikkelsen, Hørsholm (DK); Karsten Hansgaard Nielsen, Hørsholm (DK); Thomas Lind Madsen, Hørsholm (DK); Henrik Aslak Jensen, Hørsholm (DK); Willibrordus Servatius Bouwens, Hørsholm (DK)

(73) Assignee: VKR HOLDING A/S, Horsholm (DK)

( * ) Notice: Subject to any disclaimer, the term of this patent is extended or adjusted under 35 U.S.C. 154(b) by 420 days.

(21) Appl. No.: 17/057,756

(22) PCT Filed: May 24, 2019

(86) PCT No.: PCT/EP2019/063491
§ 371 (c)(1),
(2) Date: Nov. 23, 2020

(87) PCT Pub. No.: WO2019/224362
PCT Pub. Date: Nov. 28, 2019

(65) Prior Publication Data
US 2021/0291506 A1    Sep. 23, 2021

(30) Foreign Application Priority Data

May 24, 2018  (DK) .............................. PA201870312
Jun. 28, 2018  (DK) .............................. PA201870446

(51) Int. Cl.
*B32B 37/06*    (2006.01)
*B32B 37/08*    (2006.01)
(Continued)

(52) U.S. Cl.
CPC .......... *B32B 17/10871* (2013.01); *B32B 3/10* (2013.01); *B32B 17/10055* (2013.01);
(Continued)

(58) Field of Classification Search
CPC ................ B32B 17/10871; B32B 3/10; B32B 17/10055; B32B 17/10091;
(Continued)

(56) References Cited

U.S. PATENT DOCUMENTS 5,087,502 A    2/1992  Esposito
5,812,332 A    9/1998  Freeman
(Continued)

FOREIGN PATENT DOCUMENTS

CN    2835403 Y      11/2006
CN    102260049 A  * 11/2011
(Continued)

OTHER PUBLICATIONS

CN103936269A Machine Translation of Description (EPO/Google) (Year: 2023).*
(Continued)

*Primary Examiner* — Cynthia L Schaller
(74) *Attorney, Agent, or Firm* — CANTOR COLBURN LLP

(57) ABSTRACT

The present disclosure relates to a method of providing a laminated vacuum insulated glass (VIG) unit, wherein the method comprises: —providing a lamination assembly (10) comprising a vacuum insulated glass (VIG) unit (11) comprising at least two glass sheets (11a, 11b) separated by a plurality of support structures (12) distributed in a gap (13) between the glass sheets (11a, 11b), and a lamination layer (2) arranged between one of the glass sheets (11a, 11b) of the vacuum insulated glass (VIG) unit (11) and a further sheet (3). The lamination assembly (10) is subjected to a heating
(Continued)

Figure 1:
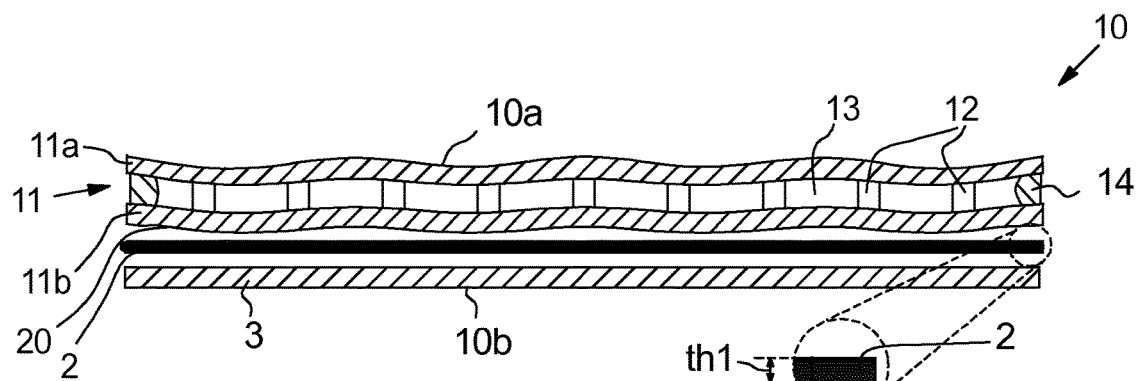

step at a heating location so as to soften the lamination layer to provide a bonding between the vacuum insulated glass unit and the lamination layer (3), and a bonding between the further sheet (3) and the lamination layer (2). The heated lamination assembly (10) is then subjected to a cooling step provided by a cooling system (350), wherein said cooling step comprises providing a controlled cooling of one or both major outer surfaces (10a, 10b) of the heated lamination assembly (10) so as to cool said heated lamination assembly (10) to harden said lamination layer (2). The present disclosure additionally relates to use of a cooling system.

20 Claims, 20 Drawing Sheets

(51) Int. Cl.
| | |
|---|---|
| E06B 3/673 | (2006.01) |
| B32B 37/00 | (2006.01) |
| C03C 27/06 | (2006.01) |
| B32B 38/00 | (2006.01) |
| B32B 17/10 | (2006.01) |
| B32B 3/10 | (2006.01) |
| B32B 41/00 | (2006.01) |
| E06B 3/66 | (2006.01) |

(52) U.S. Cl.
CPC .. *B32B 17/10091* (2013.01); *B32B 17/10174* (2013.01); *B32B 17/10302* (2013.01); *B32B 17/10743* (2013.01); *B32B 17/10788* (2013.01); *B32B 37/0046* (2013.01); *B32B 37/06* (2013.01); *B32B 37/08* (2013.01); *B32B 38/0036* (2013.01); *B32B 41/00* (2013.01); *C03C 27/06* (2013.01); *E06B 3/6612* (2013.01); *E06B 3/673* (2013.01); *E06B 3/6736* (2013.01); *B32B 2307/304* (2013.01); *B32B 2307/412* (2013.01); *B32B 2315/08* (2013.01); *B32B 2419/00* (2013.01)

(58) Field of Classification Search
CPC ........ B32B 17/10174; B32B 17/10302; B32B 17/10743; B32B 17/10788; B32B 37/0046; B32B 37/06; B32B 37/08; B32B 38/0036; B32B 41/00; B32B 2307/304; B32B 2307/412; B32B 2315/08; C03C 27/06; E06B 3/6612; E06B 3/673; E06B 3/6736

See application file for complete search history.

(56) References Cited

U.S. PATENT DOCUMENTS

| 6,071,575 A | 6/2000 | Collins |
| 2006/0154005 A1 | 7/2006 | Misonou |
| 2012/0210750 A1 | 8/2012 | Cooper |
| 2015/0223619 A1 | 8/2015 | Artwohl |

FOREIGN PATENT DOCUMENTS

| CN | 202164971 U | | 3/2012 |
| CN | 103359956 A | | 10/2013 |
| CN | 103936269 A | * | 7/2014 |
| CN | 206418926 U | | 8/2017 |
| EP | 1544180 A1 | | 6/2005 |
| EP | 1923921 A2 | | 5/2008 |
| JP | 2002326843 A | | 11/2002 |
| JP | 2004323317 A | | 11/2004 |
| KR | 20120006840 A | * | 1/2012 |
| KR | 20140032367 A | | 3/2014 |
| WO | WO 03/057478 A | * | 7/2003 |
| WO | 2004016563 A1 | | 2/2004 |
| WO | 2005000762 A1 | | 1/2005 |
| WO | 2010011742 A1 | | 1/2010 |
| WO | 2012157616 A1 | | 11/2012 |
| WO | 2017210701 A1 | | 12/2017 |

OTHER PUBLICATIONS

KR20120006840A Machine Translation of Description (Google) (Year: 2023).*
CN102260049A Machine Translation of Description (EPO/Google) (Year: 2023).*
Machine translation of applicant cited CN 206418926 (Year: 2017).
International Search Report for corresponding application PCT/EP2019/063477 filed May 24, 2019; dated Sep. 30, 2019.
International Search Report for corresponding application PCT/EP2019/063486 filed May 24, 2019; dated Sep. 30, 2019.
International Search Report for corresponding application PCT/EP2019/063491 filed May 24, 2019; dated Sep. 30, 2019.
International Search Report for corresponding application PCT/EP2019/063495 filed May 24, 2019; dated Sep. 30, 2019.
European Office Action for corresponding application 19 728 594.3; Report dated Jan. 30, 2023.

* cited by examiner

VIG UNIT LAMINATION

The present disclosure relates to a method of laminating vacuum insulated glass units, and use of a cooling system.

BACKGROUND

A desire to laminate vacuum insulated glass (VIG) units is present to for example improve safety in case a glass sheet of the VIG unit breaks. A VIG unit may comprise glass sheets kept separated by support structures arranged in an airtight and evacuated gap between the glass sheets.

CN103359956 A discloses an autoclave based VIG lamination solution. US2006/0154005, U.S. Pat. No. 6,071,575 and JP 2004-323317 discloses further solutions for laminating VIG units.

It has however shown that issues relating to laminating VIG units may occur. The present disclosure may e.g. relate to providing an improved and/or faster solution for laminating VIG units such as VIG units for covering apertures in buildings and/or for other purposes. The present disclosure may additionally or alternatively relate to providing improved laminated VIG units.

SUMMARY

The present disclosure relates to a method of providing a laminated vacuum insulated glass (VIG) unit. The method comprises:
providing a lamination assembly comprising
a vacuum insulated glass unit comprising at least two glass sheets separated by a plurality of support structures distributed in a gap between the glass sheets, and a lamination layer arranged between one of the glass sheets of the vacuum insulated glass unit and a further sheet.
the lamination assembly is subjected to a heating step at a heating location so as to soften said lamination layer to provide a bonding between the VIG unit and the lamination layer, and a bonding between the further sheet and the lamination layer. Additionally, the heated lamination assembly may be subjected to a cooling step provided by a cooling system, wherein said cooling step comprises providing a controlled cooling of one or both major outer surfaces of the heated lamination assembly so as to cool said heated lamination assembly to harden said lamination layer.

The cooling step may e.g. help to provide a faster cooling solution for a heated lamination assembly, and/or a solution where an improved control of the stress in the final laminated VIG unit may be obtained.

The inventors have seen indications that an uneven cooling of the glass sheets of the VIG unit separated by an evacuated gap may cause a thermal bending/deflection of the VIG unit, as the VIG unit may thermally deflect if the temperature of the VIG unit's glass sheets are different, due to a rigid edge seal of the VIG unit. The VIG unit's edge sealing may in aspects of the present disclosure be made from e.g. a glass material such as a solder glass material, for example a glass frit based material or another suitable type of edge sealing material such as a metal solder. A too large and uncontrolled temperature difference between the glass sheets of the VIG unit during cool down may cause a risk of providing undesired tensions/stress conditions in the VIG unit during cool down, and/or in the lamination layer of the final laminated VIG unit, which may be caused by a thermal deflection of the VIG unit during the cooling step.

It is generally understood that the VIG unit of the lamination assembly may have different heat capacities at the oppositely directed major surface of the VIG unit. For example, at one side of the VIG unit, the lamination layer and further sheet such as a glass sheet is placed, whereas the other side of the VIG unit may remain un-laminated. The side of the VIG unit where the lamination layer and the lamination sheet is placed hence has a higher thermal capacity/heat capacity than the other, un-laminated side of the VIG unit. This may provide complex issues with regard to the heating step and/or the cooling step which the present disclosure may help to solve.

The present disclosure may thus help to enable a fast lamination process where a controlled cooling of the lamination assembly is provided at the outer, major surfaces of the lamination assembly. The present disclosure may additionally help to enable an improved control of stress conditions during cooling and/or in the final laminated VIG unit, as the temperature of the VIG unit glass sheets may be maintained within a desired temperature range due to the controlled cooling, and hence during the hardening of the lamination layer.

In one or more aspects of the present disclosure, said controlled cooling is a forced cooling. The forced cooling may e.g. be provided by means of one or more cooling systems such as e.g. a forced convection cooling and/or a forced conduction cooling. This may provide a more controlled and controllable cooling of the lamination assembly, and e.g. also a faster cooling of one or both of the lamination assembly's outer major surfaces.

In one or more aspects of the present disclosure, said controlled cooling may force a larger heat transfer per time unit from said further sheet, when compared to the heat transfer per time unit provided from the oppositely directed outer major surface of the lamination assembly.

This may be advantageous as it may help to improve the control of the thermal deflection/bending of the VIG unit during cool down to harden the lamination layer, while also enabling a faster cooling. The side of the VIG unit where the lamination layer and the lamination sheet is placed may have a higher thermal capacity/heat capacity than the other, such as un-laminated, side of the VIG unit, due to the presence of lamination layer that is softened by heat, and due to the further sheet such as a glass sheet, e.g. an annealed glass sheet. Hence, if cooling the outer major surfaces of the lamination assembly by the same heat transfer per time unit, this may cause an undesired thermal deflection/bending of the VIG unit, as the major outer surface at the e.g. un-laminated side may tend to be cooled faster than the laminated side of the VIG unit. This may cause undesired stresses in the lamination assembly during or after the cooling step. This may however be handled by forcing a larger heat transfer per time unit from the further sheet during the cooling step.

In one or more aspects of the present disclosure, said forced, larger heat transfer per time unit from the further sheet may be provided by means of providing a time delayed cooling at said oppositely directed outer major surface of the lamination assembly. Also or alternatively, the forced, larger heat transfer per time unit from the further sheet may be provided by means of providing a cooling at the further sheet by a first cooling medium having a lower temperature compared to the temperature of a second cooling medium used for cooling said oppositely directed outer major surface of the lamination assembly. In one or more further aspects of the present disclosure, the forced, larger heat transfer per time unit from the further sheet may be provided by means of providing a larger fluid flow per time unit of a first cooling medium at the further sheet when compared to the fluid flow per time unit of a cooling medium used for cooling said oppositely directed outer major surface of the lamination assembly.

In one or more still further aspects of the present disclosure, the forced, larger heat transfer per time unit from the further sheet may be provided by utilizing cooling systems of different types at the opposing outer surfaces of the lamination assembly. For example by providing a conduction cooling at one of the surfaces and a convection cooling at the other surface.

In one or more aspects of the present disclosure, said controlled cooling may provide a forced cooling of both oppositely directed outer major surfaces of the heated lamination assembly by means of different cooling systems.

This may help to provide an improved control of the cooling during the cooling step, e.g. to control the thermal deflection of the VIG unit.

In one or more aspects of the present disclosure, said cooling step may be provided in one or more cooling chambers enclosed by walls of a cooling arrangement.

This may e.g. provide improved control of the cooling of the lamination assembly during the cooling step. The walls encloses the cooling chamber, and the one or more cooling chambers may arranged inside a room of a building of a VIG unit lamination facility.

In one or more aspects of the present disclosure, a transport system such as a conveyer system may be configured to transport the heated lamination assembly from said heating location and into the one or more cooling chambers.

This may provide a space saving solution where a fast lamination of VIG units may be obtained. The cooling system may hence be arranged in continuation of the heating location, e.g. in the same building. Said transport system may e.g. comprise a conveyer belt solution, a conveyer chain arrangement and/or or the like configured to hold and support the heated lamination assembly during the cooling step.

In one or more aspects of the present disclosure, the controlled cooling may subject the lamination assembly to a controlled change of the cooling temperature provided by of a cooling medium utilized at one or both of said major outer surfaces of the lamination assembly during said cooling step.

This may e.g. help to provide a more controlled cooling of the lamination assembly, help to reduce thermal deflection of the VIG unit during the cooling and/or help to provide a reduced stress condition in the lamination layer.

Said temperature regulation may e.g. comprise gradually lowering the temperature of a surface used for conduction heating or a cooling gas used for convection heating during the cooling step. It may also or alternatively comprise providing an initial, rather low cooling temperature, and before the lamination layer reaches a target temperature, the temperature may be increased in order to e.g. prevent or reduce an "overshoot" where the lamination layer temperature exceeds a desired target temperature. This may e.g. be provided by subjecting the lamination assembly to different cooling temperatures at different zones by means of different cooling systems arranged in continuation of each other, or by regulating the temperature of the same cooling medium.

In one or more aspects of the present disclosure, said controlled change of the cooling temperature may subjects the lamination assembly to a first higher cooling temperature during the cooling step, followed by a lower cooling temperature.

This may e.g. be obtained by regulating the temperature of the same cooling medium, or subjecting the lamination assembly to a first cooling medium in a first cooling zone, followed by moving the lamination assembly to a subsequently arranged further cooling zone where a cooling temperature is set to be lower.

In one or more aspects of the present disclosure, said controlled change in temperature subject the lamination assembly to a lower cooling temperature in a first time interval, followed by a higher cooling temperature in a subsequent time interval, during said cooling step.

This may e.g. help to enable a faster and at the same time controlled cooling of the lamination assembly, such as at the laminated side of the VIG unit, while reducing an undesired "cooling overshot" situation.

In one or more aspects of the present disclosure, wherein said lamination assembly is moved between different cooling zones utilizing different cooling systems during said cooling step, such as wherein said different cooling systems are configured with different temperature settings for a cooling medium for providing the cooling in the respective zone.

This may help to provide a more cost efficient and fast cooling that may be more easy control. For example, by e.g. controlling the time with which the lamination assembly is placed in the respective, cooling zone, the cooling profile used for the lamination assembly may be controlled and adjusted, e.g. without needing to provide a larger temperature regulation of the same cooling medium.

The zones may be consecutively arranged and e.g. in further aspects be divided by partition walls such as mechanical walls with an outlet from one zone and acting as an inlet for the next cooling zone, an air curtain solution and/or the like.

In one or more aspects of the present disclosure, said controlled cooling may comprise providing a conduction cooling by means of a conduction cooling system to at least one of said outer major surfaces of the lamination assembly by means of one or more cooling bodies.

Conduction cooling may help to provide an advantageous cooling solution such as at a downwardly facing major surface of the lamination assembly. It may also help to provide a fast cooling of the lamination assembly to provide a higher heat transfer per time unit. In further aspects, the transport arrangement, such as a conveyer band/sheet (e.g. made from a fabric, a silicone material, a plastic sheet or the like) for transporting the lamination assembly may support directly on the cooling body so as to transfer the heat energy from the lamination assembly to the cooling body.

In one or more aspects of the present disclosure, said conduction cooling may be provided to the outer major surface of the lamination assembly which is arranged at the side of the vacuum insulated glass unit where said further sheet and said lamination layer is placed.

Hence, said conduction cooling may be provided so as to cool the lamination layer by cooling the further sheet by means of the conduction cooling.

In one or more aspects of the present disclosure, at least a part of said controlled cooling is a forced convection cooling provided by means of a convection cooling system utilizing a temperature controlled cooling gas, such as air, provided in a convection cooling chamber.

This my help to provide a good and cost efficient cooling solution which may be easy to implement and/or regulate during the cooling step.

In one or more aspects of the present disclosure, said forced convection cooling is provided by supplying a cooling gas through one or more gas outlets such as one or more nozzles of a cooling gas outlet arrangement.

In one or more aspects of the present disclosure, said gas outlet arrangement may e.g. comprise one or more first outlets configured to direct cooling gas to a first outer major surface of the lamination assembly. It may also or alternatively comprise one or a plurality of second, further outlets configured to direct cooling gas to the second, oppositely directed outer major surface of the lamination assembly.

In one or more aspects of the present disclosure, at least a part of said convection cooling is provided so as to cool the glass sheet of the vacuum insulated glass unit facing away from the further sheet.

This glass sheet of the vacuum insulated glass unit facing away from the further sheet, which may be unlaminated, may face upwards during cooling while the further sheet may support on a conveyer. The upwardly facing surface may hence easily be cooled by convection cooling providing a forced gass flow of temperature controlled cooling gas over/onto the upwardly facing surface.

Also or alternatively, the convection cooling may be provided at the further sheet. In one or more aspects of the present disclosure, a larger heat transfer per time unit from the further sheet may be provided by supplying a larger cooling gas flow for cooling this further sheet during said cooling step than a cooling gas flow supplied to the oppositely directed outer major surface of the lamination assembly.

The larger cooling gas flow may in aspects be at least 1.5 times, such as at least 2 times, for example at least 3 times greater than the cooling gas flow provided to cool the other outer major surface. Also or alternatively said larger heat transfer may be provided by supplying a cooling gas to cool the further sheet and lamination layer which has a lower temperature than the temperature of a cooling gas provided to the oppositely directed outer major surface of the lamination assembly.

In one or more aspects of the present disclosure, one of the outer major surfaces of the lamination assembly may be cooled by means of conduction cooling, and wherein the other outer major surface may be cooled by means of convection cooling such as forced convection cooling.

This may e.g. provide a solution which may be less complex to implement and control. Also or alternatively, it may help to provide an advantageous and efficient cooling step where a control of the thermal deflection of the VIG unit may be enhanced.

In one or more aspects of the present disclosure, said lamination layer is a Polyvinyl butyral (PVB) layer.

The lamination layer may alternatively be an Ethylene Vinyl Acetate (EVA) layer. The layer may be provided as a sheet to the lamination assembly.

In one or more aspects of the present disclosure, said cooling step is terminated when the lamination layer (2) has reached a temperature which is below 95° C. such as below 60° C., for example below 45° C.

At around 95° C., the lamination layer may have hardened enough to allow a more uncontrolled further cooling. However, finishing the controlled cooling by the cooling step at an even lower temperature such as below 60° C. or below 45° C. may e.g. provide a lamination solution where the lamination assembly may faster be handled by automation equipment, and may also be more safe to handle for humans, and. Also, it may have resulted in a further controlled hardening of the lamination assembly which may be beneficial to obtain a desired stress condition of the VIG unit.

In one or more aspects of the present disclosure, the difference in temperature between said glass sheets of the vacuum insulated glass unit enclosing said gap is kept below 65° C., such as below 45° C., for example below 20° C., for example below 10° C. by means of said cooling system during at least 50% such as at least 70%, e.g. at least 90%, such as around 99% of the time of said cooling step.

Providing that the temperature between the glass sheets of the vacuum insulated glass unit enclosing and providing the gap which is evacuated is kept below 65° C. may e.g. help to reduce the risk of the VIG unit getting damaged due to a thermal deflection during the cooling step due to stress conditions around and in the edge seal enclosing the evacuated gap.

Providing that the temperature difference between the glass sheets of the VIG unit enclosing the evacuated gap is kept low during the cooling step may also or alternatively help to control the stress conditions in the final laminated VIG unit, as the present inventors have seen indications that a cooling that that is not sufficiently controlled may cause undesired stress conditions in the lamination layer after cooling.

In one or more aspects of the present disclosure, the difference in temperature between said at least two glass sheets of the vacuum insulated glass unit is kept below 40° C., such as below 20° C., for example below 10° C. or below 5° C. by means of said cooling system during said cooling step, such as at least during the last 50%, such as during the last 25%, such as during the last 10% or last 5% of said cooling step by means of said cooling system.

This may e.g. help to provide more desired stress conditions in the lamination layer of the final VIG unit.

The temperature difference may e.g. be determined by placing a temperature sensor, such as a thermos-couple sensor between the lamination layer and the VIG unit glass sheet, and a further temperature sensor at the other VIG unit surface, and track the temperature difference measured by these over time during the cooling step.

In ne or more aspects of the present disclosure, said cooling step is provided for a time span (tc0-tc3) which is between 4 minutes and 60 minutes, such as between 6 minutes and 30 minutes, for example between 8 minutes and 15 minutes.

Foe example, in one or more aspects of the present disclosure, said cooling step is provided for less than 60 minutes, such as less than 30 minutes, for example less than 20 minutes such as less than 15 minutes.

The controlled cooling may hence help to provide a fast and efficient cooling of the lamination assembly, and hence help to reduce the manufacturing time for producing laminated VIG units. After this time span, the lamination layer may be cooled and then hardened enough to enable a movement of the laminated VIG unit without the risk of damaging or unintentionally changing on the structure of the lamination layer or the relative position between the further sheet and VIG unit. Hence, the laminated VIG unit may be subjected to e.g. more abrupt movements.

The said cooling step provided for less than 60 minutes, such as less than 30 minutes, for example less than 20 minutes such as less than 15 minutes may in embodiments of the present disclosure provide that the lamination assembly has reaches a temperature which is below 95° C. such as below 60° C., for example below 45° C.

In one or more aspects of the present disclosure, the total time from said heating step is initiated to said cooling step is terminated is less than 60 minutes, such as less than 40 minutes, for example less than 25 minutes.

Hence, a fast lamination process for VIG units may be obtained that may fit larger scale manufacturing desires/demands.

In one or more aspects of the present disclosure, said glass sheets of the vacuum insulated glass unit may be tempered glass sheets such as thermally tempered glass sheets.

These glass sheets may allow a low pressure in the evacuated gap while also allowing a larger distance between support structures, hence providing a VIG unit with enhanced insulating capabilities.

In one or more aspects of the present disclosure, the lamination assembly is arranged in a vacuum enclosure and subjected to an evacuation step in the vacuum enclosure, such as prior to and/or during said heating step.

This evacuation step may help to remove gas bobbles/remains between the lamination layer and the VIG unit and/or between the lamination layer and the further sheet.

The further sheet may in one or more aspects of the present disclosure be a glass sheet such as an annealed glass sheet.

In one or more aspects of the present disclosure, said heating step may comprise:
   arranging the lamination assembly between clamping bodies providing clamping surfaces,
   displacing at least one of said clamping surfaces by one or more clamping body displacers, such as mechanical clamping body displacers, to change the distance between the clamping surfaces, so as to provide a compression pressure (F) to the lamination assembly by the clamping surfaces, and
   heating the lamination assembly between the clamping bodies by means of a heating arrangement.

This may e.g. help to provide an overall faster lamination process for laminating VIG units. The clamping bodies may help to even out unevenesses of the lamination assembly, such as e.g. help to reduce a thermal deflection of the VIG unit during the heating.

Also or alternatively, if the VIG unit glass sheets are thermally tempered, such glass sheets may comprise "wavy" surface variations which may be of less concern due to the compression pressure that may help to provide a sufficient bonding of the lamination layer.

In one or more aspects of the present disclosure, the compression pressure applied to the lamination assembly may be between 1.5 and 3.5 Newton/cm2, for example between 2 and 3 Newton/cm2, such as between 2.4 and 2.8 Newton/cm2. Some of this pressure may be provided by the weight of one of the clamping bodies, and the rest by means of the one or more clamping body displacers providing a further controlled clamping pressure on top of the pressure provided by gravity acting on the clamping body.

In one or more aspects of the present disclosure, said clamping bodies may be rigid clamping bodies providing substantially rigid, such as substantially plane, clamping surfaces.

The clamping bodies providing good thermal conduction, and may e.g. be made from one or more metals, such as copper, aluminium and/or brass blocks.

In one or more aspects of the present disclosure, said clamping bodies for providing said compression pressure to the lamination assembly during lamination of the vacuum insulated glass (VIG) unit comprises one or more heaters for providing said heating.

In one or more aspects of the present disclosure, said heating step may comprise heating the lamination layer (2) to a temperature (T3) between 85° C. and 160° C., such as between 90° C. and 155° C., e.g. between 95° C. and 150° C., such as between 100° C. and 140° C.

This may help to provide that the lamination layer gets soft enough so that a reduced compression pressure may be applied to e.g. even out surface roughness on the lamination layer sheet, and hence the VIG unit may be spared from a too large compression pressure that may damage the VIG unit.

In one or more aspects of the present disclosure, said heating step may comprise: that the outer major surface of the further sheet is subjected to a first heating temperature, and
   that the outer, major surface of the glass sheet of the vacuum insulated glass unit facing away from the further sheet is simultaneously subjected to a second heating temperature, wherein the first temperature is higher than the second temperature.

This may e.g. help to control the thermal deflection of the VIG unit during the heating and hence e.g. reduce the risk that the VIG unit does not break during the heating step due to thermal deflection, and/or it may help to provide an improved lamination of the VIG unit.

In one or more aspects of the present disclosure, said first heating temperature may be provided by a first heating arrangement, and wherein the second heating temperature may be provided by a second heating arrangement.

The first and/or second heating arrangement may in aspects comprise one or more electrical heaters and/or one or more heating arrangements configured to provide heating by means of a fluid such as a liquid, e.g. an oil or water.

In one or more aspects, said temperature difference between the first and second temperature may be caused at least partly by different temperature settings of the first and second heating arrangements.

In one or more aspects of the present disclosure, the heating of the outer major surface of lamination assembly facing away from the further sheet may be time delayed compared to the initiation of the heating at the outwardly facing major surface of the further sheet.

This may e.g. be advantageous when providing laminated VIG units having an unlaminated side not comprising a lamination layer and a lamination glass sheet.

The time delay may be provided by delaying the reduction of the distance between the clamping surfaces so that the compression pressure is applied, thereby providing that the further sheet, such as a glass sheet, is heated initially for an amount, (e.g. a predefined amount) of time before conduction heating is provided to the other surface by reducing the distance between the clamping bodies to provide the compression pressure.

In one or more aspects of the present disclosure, a resilient layer, such as a resilient mat, is arranged between a major surface of the lamination assembly and one or both of said clamping surfaces.

The resilient layer may provide a force distribution of the compression pressure and/or spare the major surface of the lamination assembly while the compression pressure is applied. Also or alternatively, the resilient layer, such as a silicon or rubber mat, may help to provide an improved contact between the lamination assembly's outer major surface(s) and the heating arrangement used for heating and softening the lamination layer. The VIG unit may inherently, without even providing a temperature difference between the VIG unit glass sheets, be subjected to an initial bending/deflection which may provide poor or even no heating at certain points of the VIG unit if the resilient layer is not present. This may cause a poor lamination quality and/or a poor control of the VIG unit deflection at certain areas of the VIG unit during the heating and pressing. The resilient layer hay however help to solve this problem.

In one or more aspects of the present disclosure, a control arrangement may receive lamination assembly information from a user interface and/or a sensor arrangement, and said control arrangement is configured to control said one or more clamping body displacers so as to provide said compression pressure to the lamination assembly which is determined based on said received lamination assembly information.

When utilizing a clamping solution comprising clamping bodies for providing clamping pressure, it may be relevant to adapt the pressure based on the type of VIG unit of the lamination assembly that is to be laminated. This may be done in order not to damage the lamination assembly so that cracks occur in the VIG unit's glass sheets or the lamination glass 3, and/or not to unintentionally compress the support structures arranged in the evacuated gap of the VIG unit. On the other hand, the quality of the lamination process should not be compromised. Hence, by providing a control arrangement is configured to control the one or more clamping body displacers to provide a compression pressure to the lamination assembly which is determined based on received lamination assembly information, an individualized lamination process may be achieved. Also, the same lamination arrangement for providing the heating and clamping may be used for laminating different VIG unit types with reduced risk of damaging the VIG units. It may hence also help to provide a higher yield of laminated VIG units having an acceptable lamination quality. It may also or alternatively help to provide a more user-friendly solution which reduces the risk of setting or calculation mistakes provided by human operators.

The present disclosure additionally relates to use of a cooling system for cooling a heated lamination assembly, wherein said lamination assembly comprises a vacuum insulated glass (VIG) unit comprising at least two glass sheets separated by a plurality of support structures distributed in a gap between the glass sheets, and a lamination layer arranged between one of the glass sheets of the vacuum insulated glass (VIG) unit and a further sheet, wherein said cooling comprises subjecting said heated lamination assembly to a cooling step, wherein said cooling step is provided subsequent to a prior heating step where the lamination layer is heated to provide a bonding between the Vacuum Insulated Glass unit and the lamination layer, and a bonding between the further sheet and the lamination layer, thereby providing said heated lamination assembly, and wherein said cooling step provides a controlled cooling of one or both major outer surfaces of a heated lamination assembly so as to cool the heated lamination assembly to harden the lamination layer.

In aspects of the above mentioned use of a cooling system, said heating step and/or said cooling step is provided according to the method of any of the claims 1-36.

FIGURES

Figure 2:
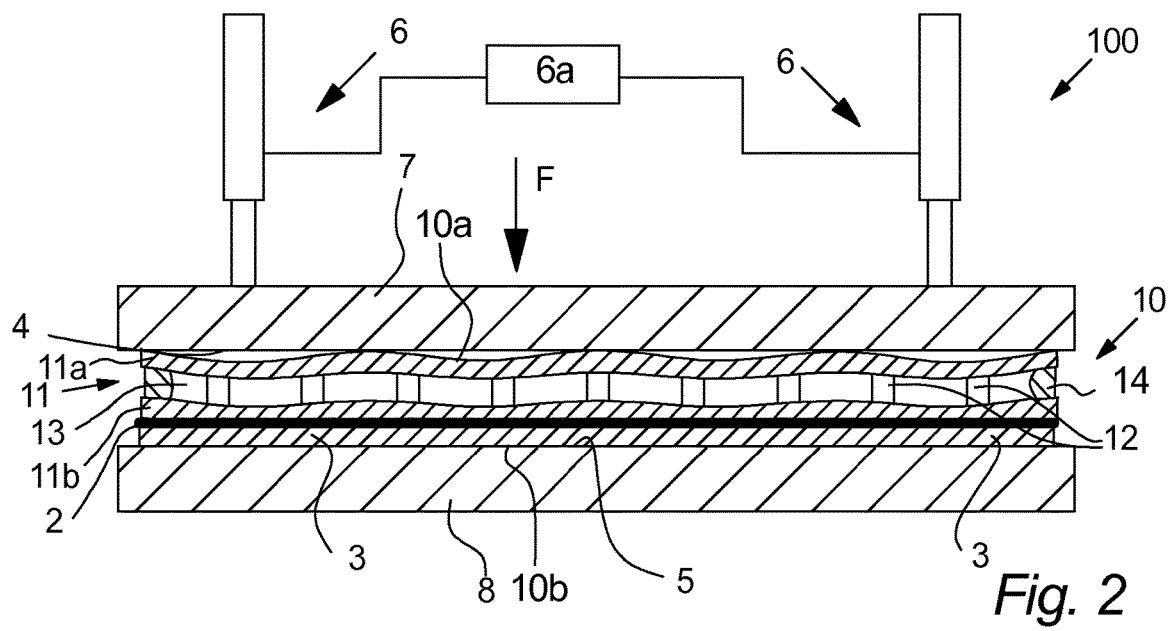
Figure 3:
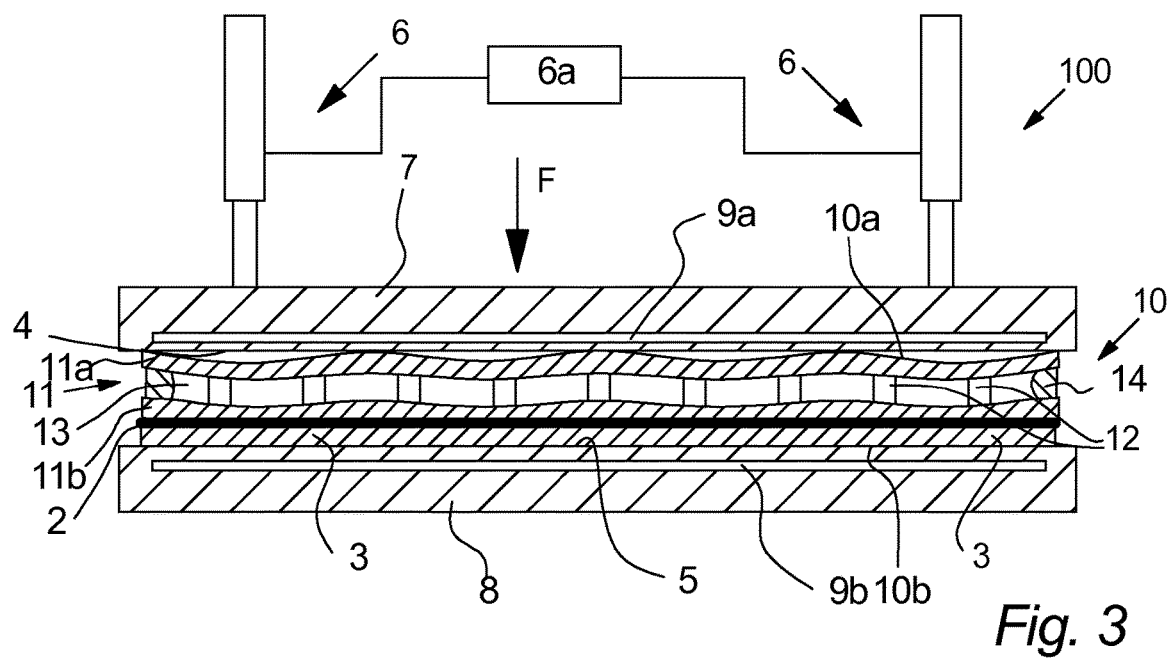
Figure 4:
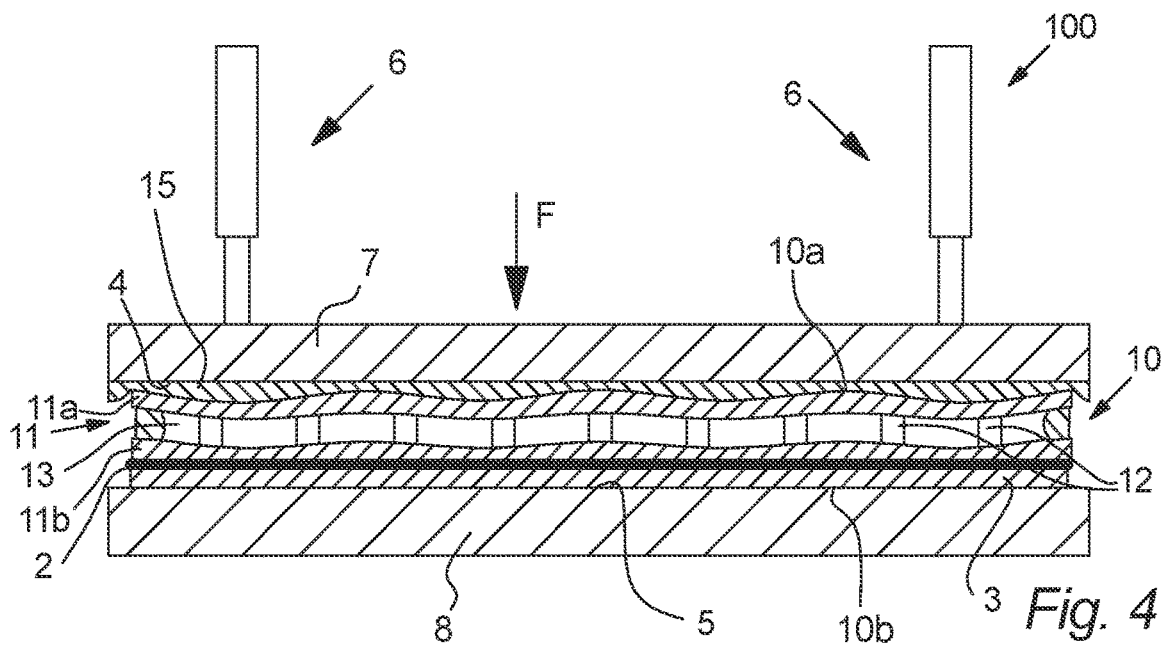
Figure 5:
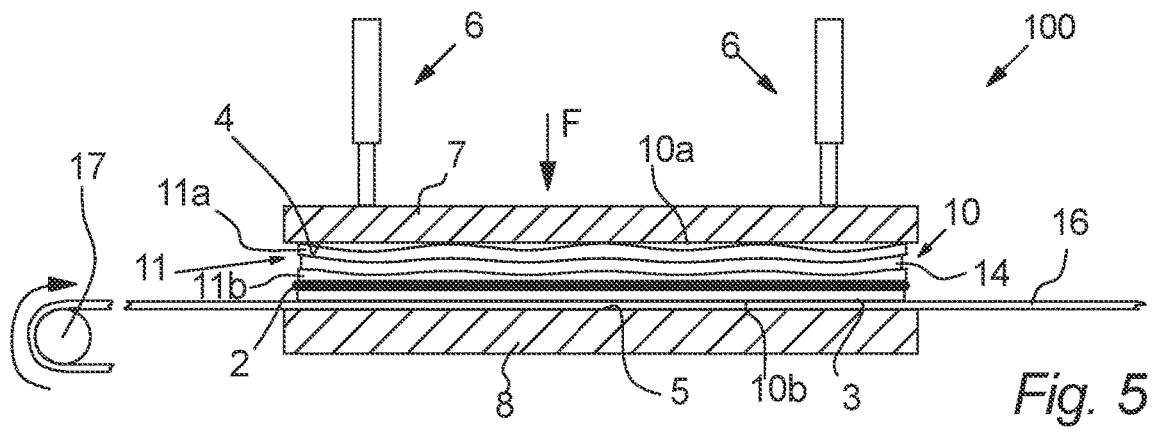
Figure 6:
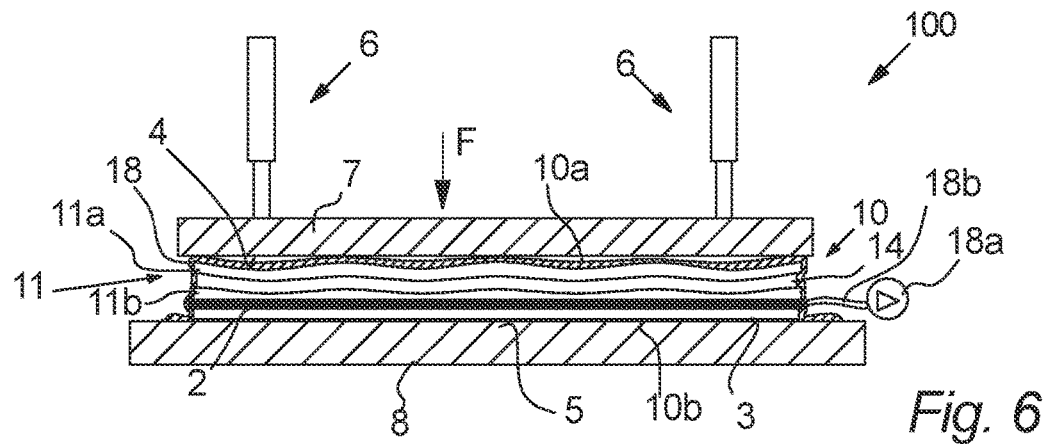
Figure 11:
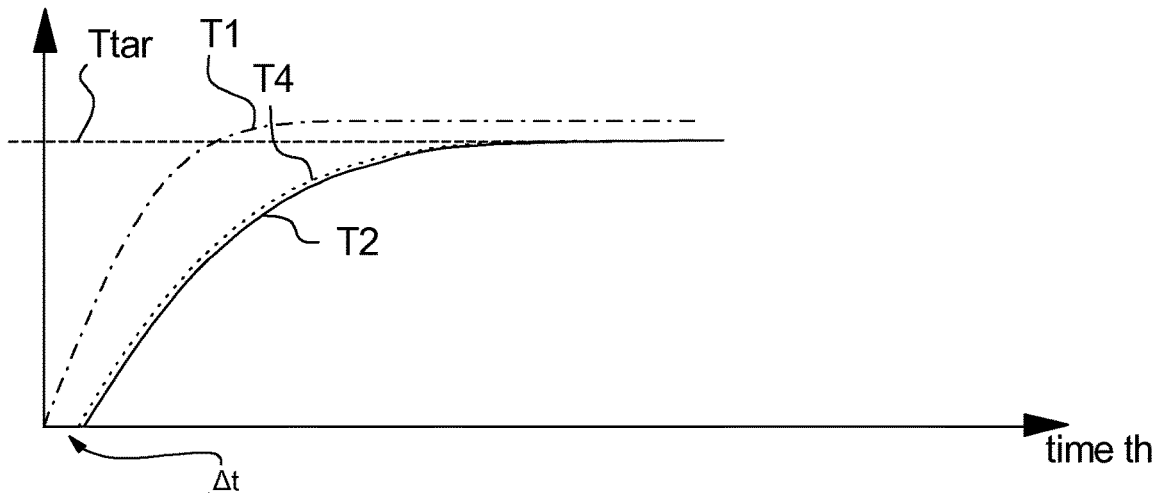
Figure 12:
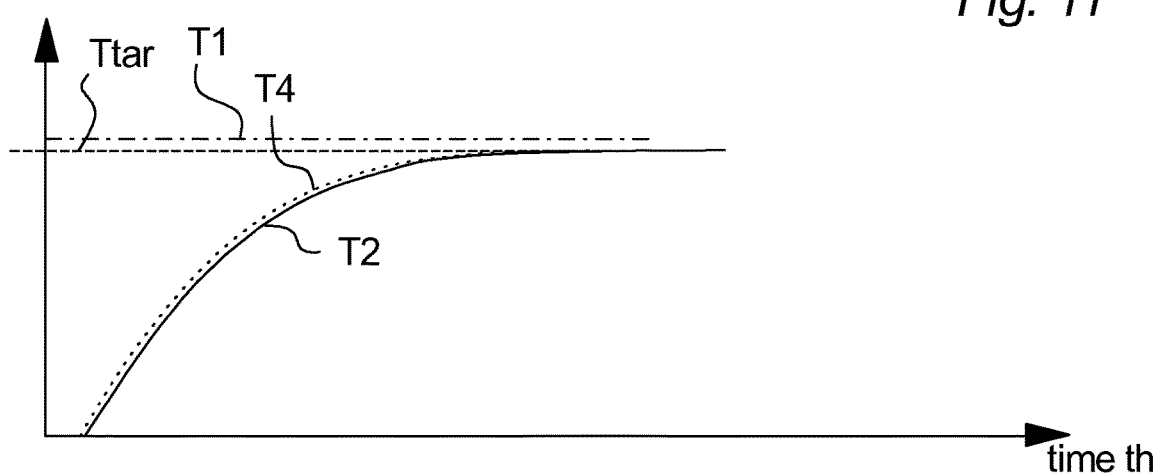
Figure 13:
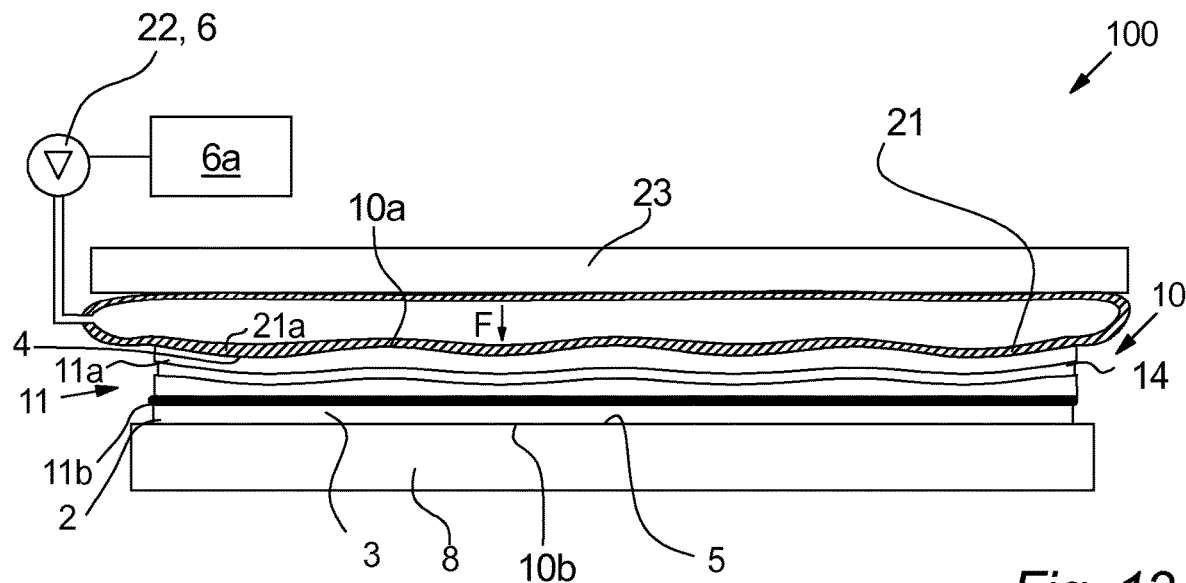
Figure 13A:
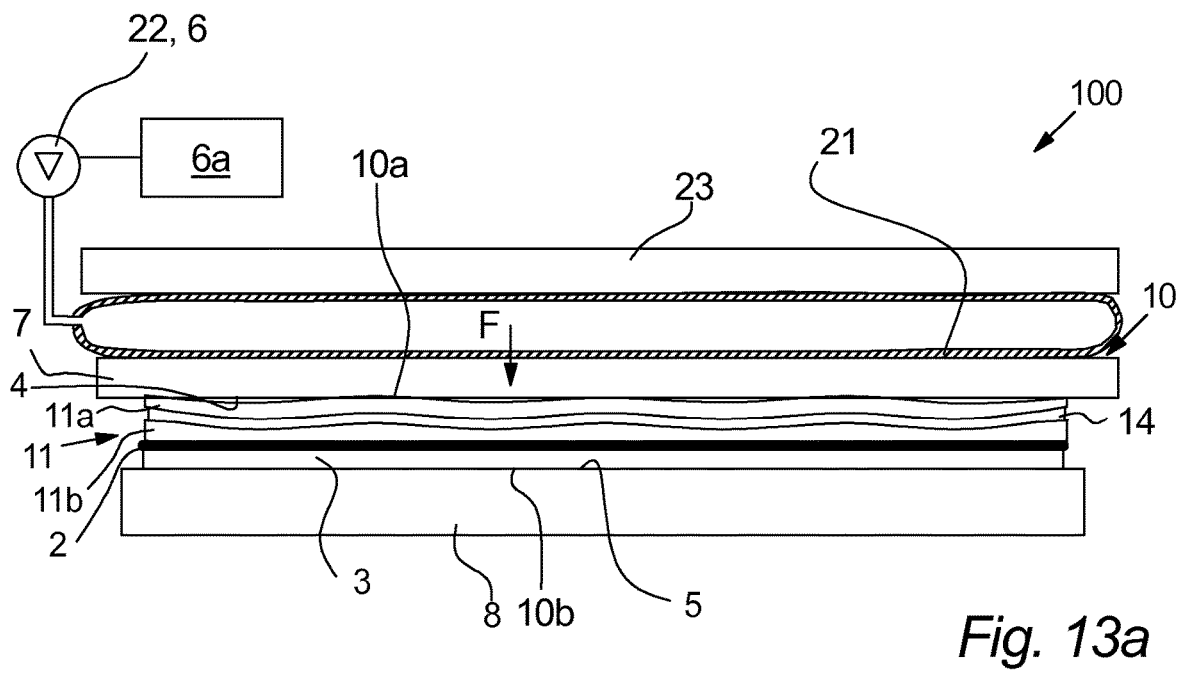
Figure 14:
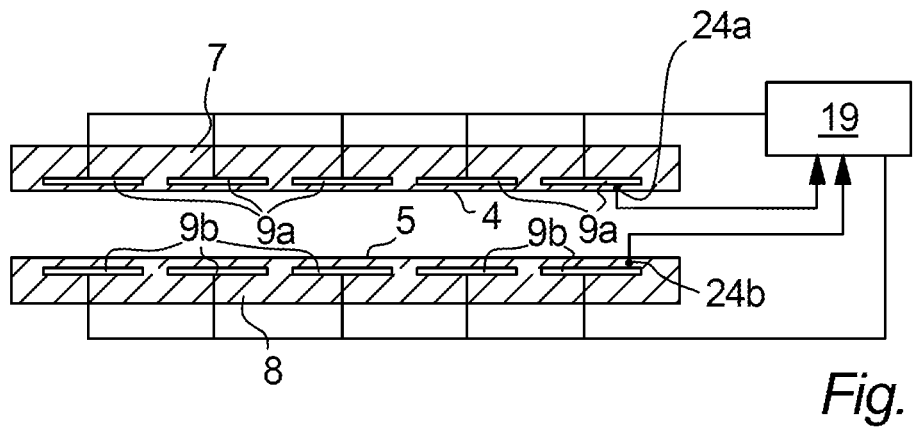
Figure 15:
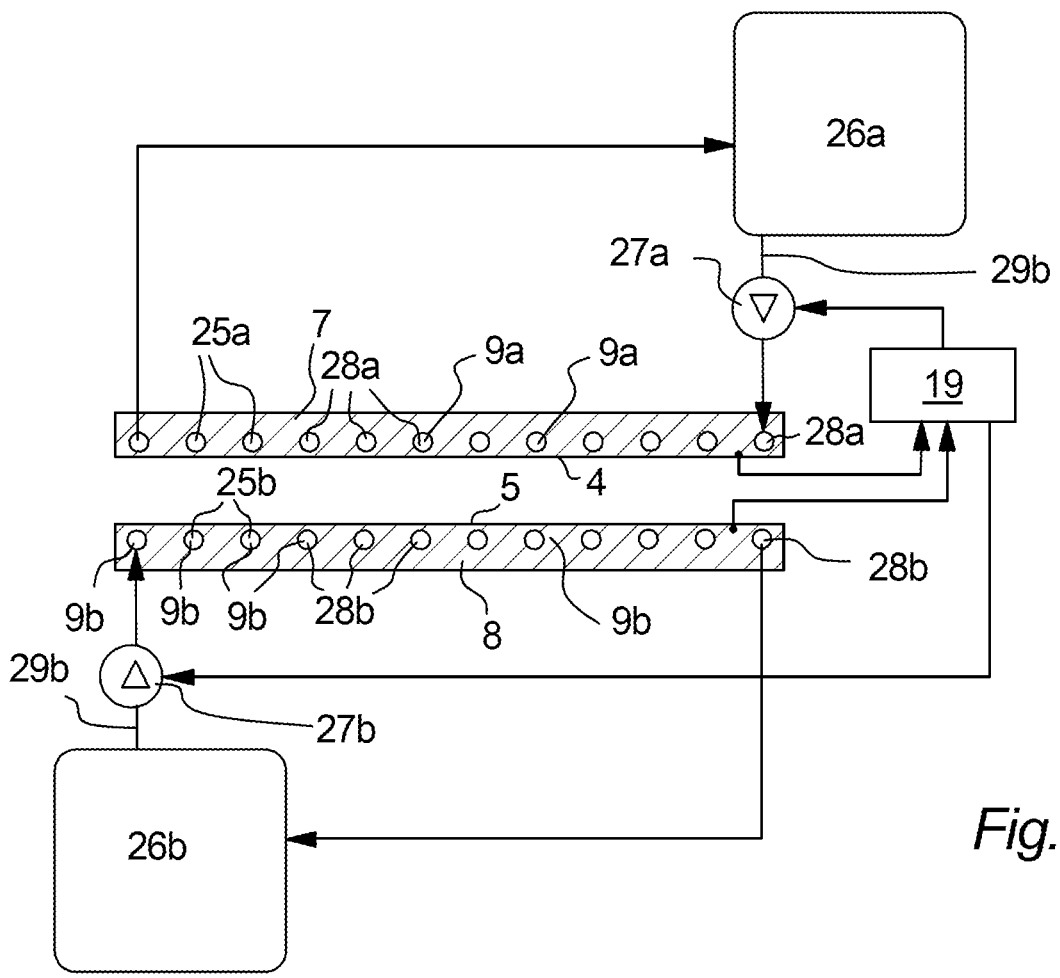
Figure 16A:
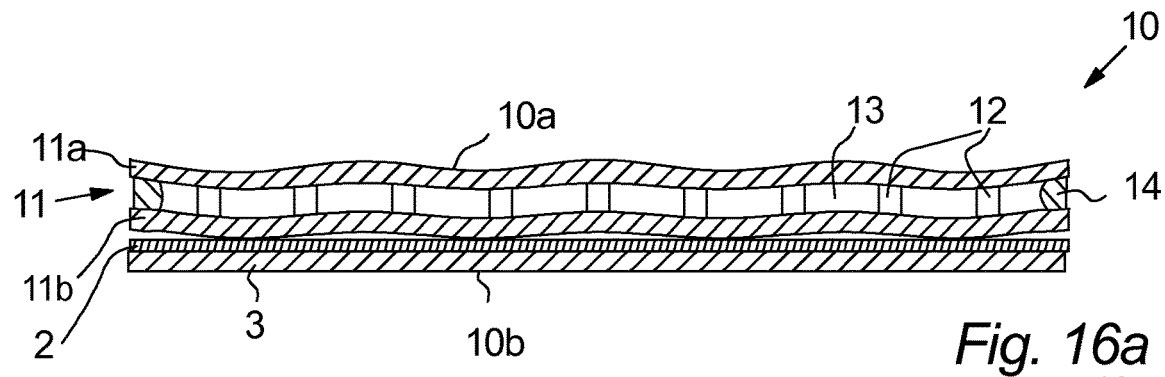
Figure 16B:
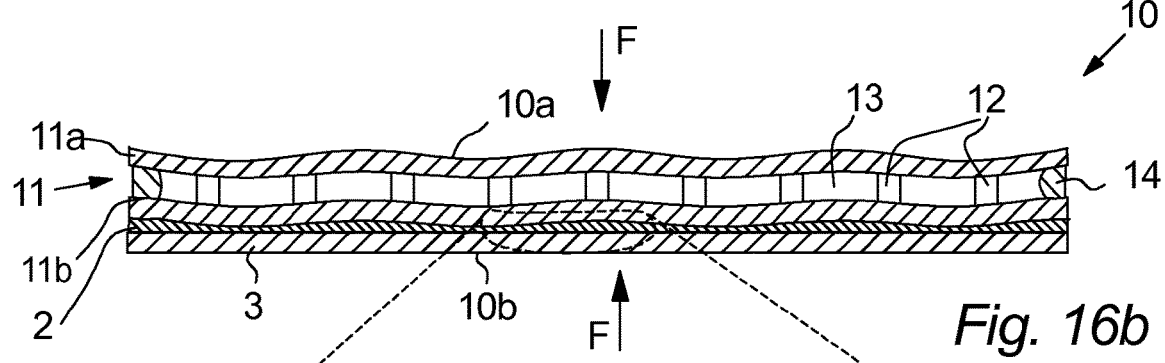
Figure 17A:
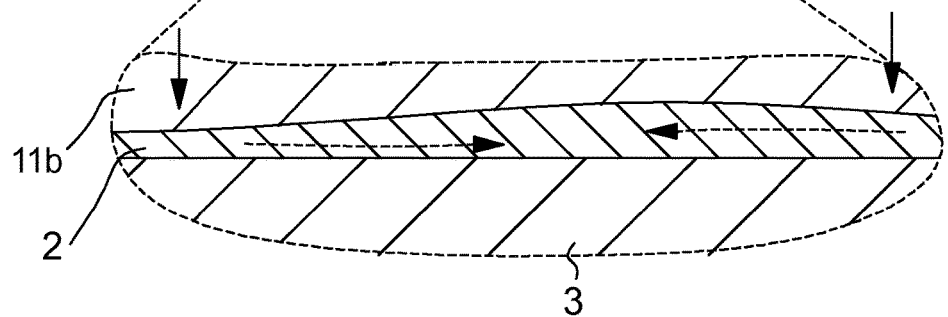
Figure 17A:
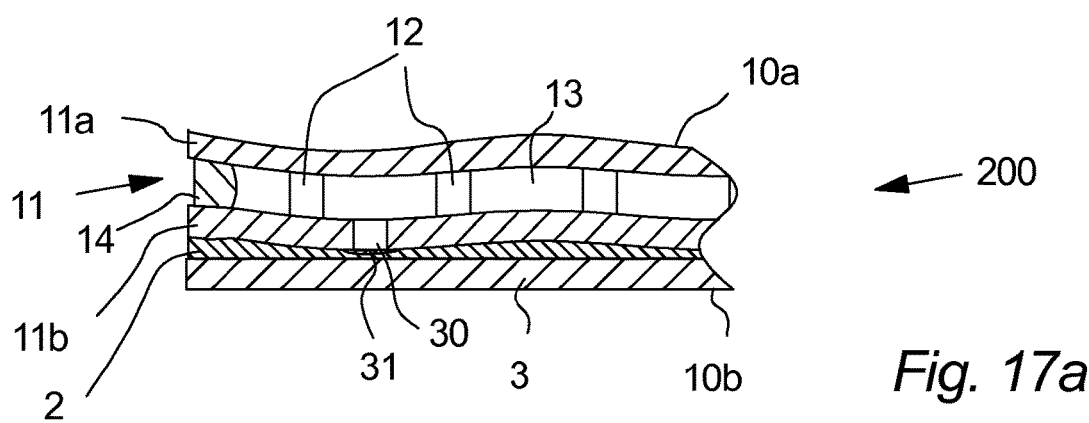
Figure 17B:
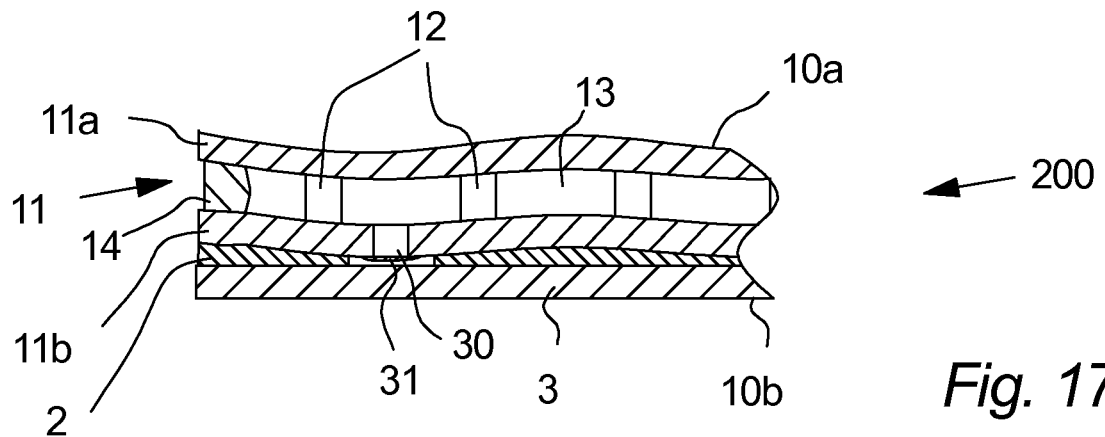
Figure 17C:
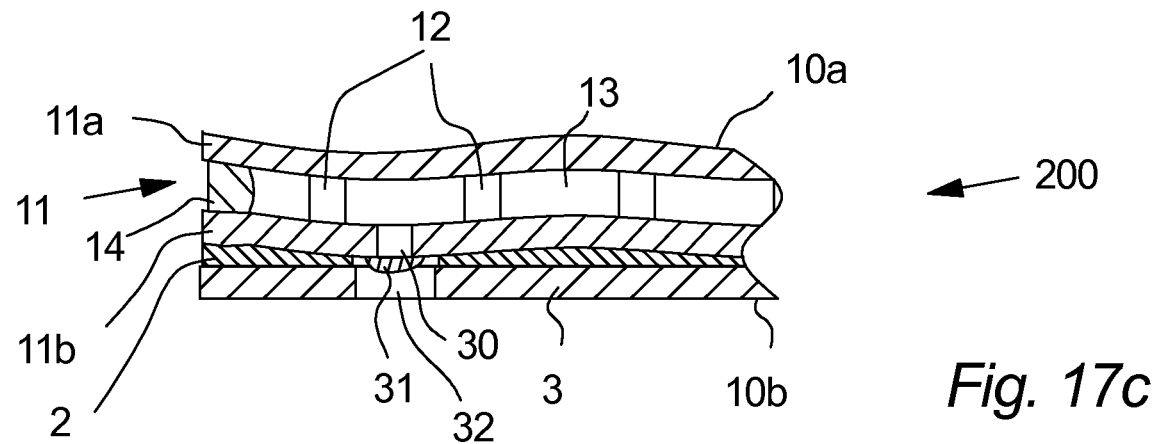
Figure 17D:
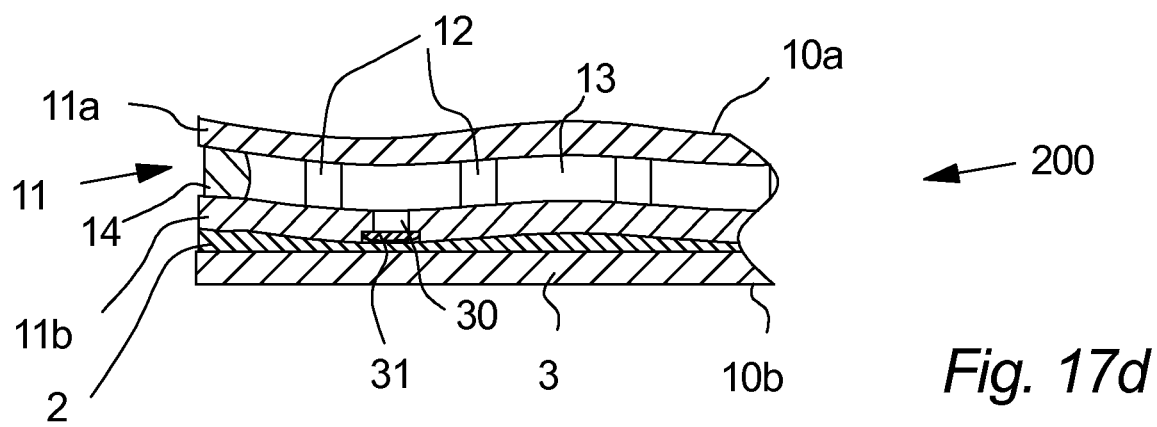
Figure 18:
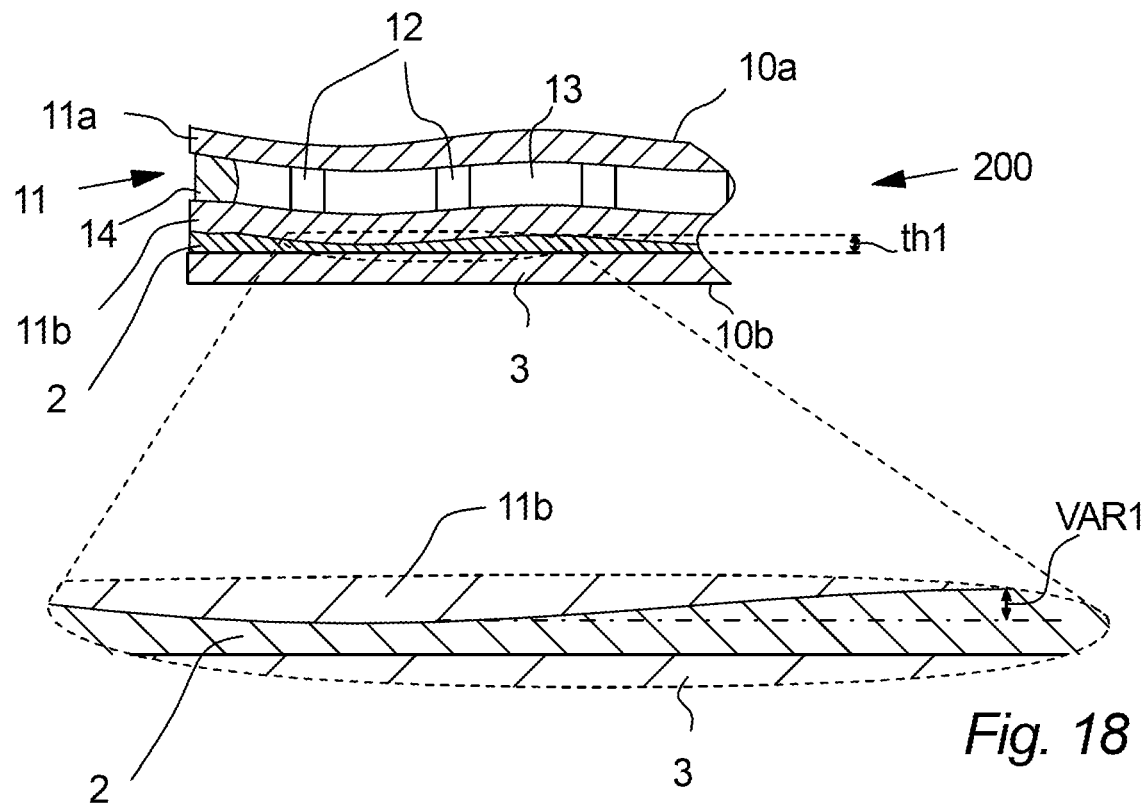
Figure 19:
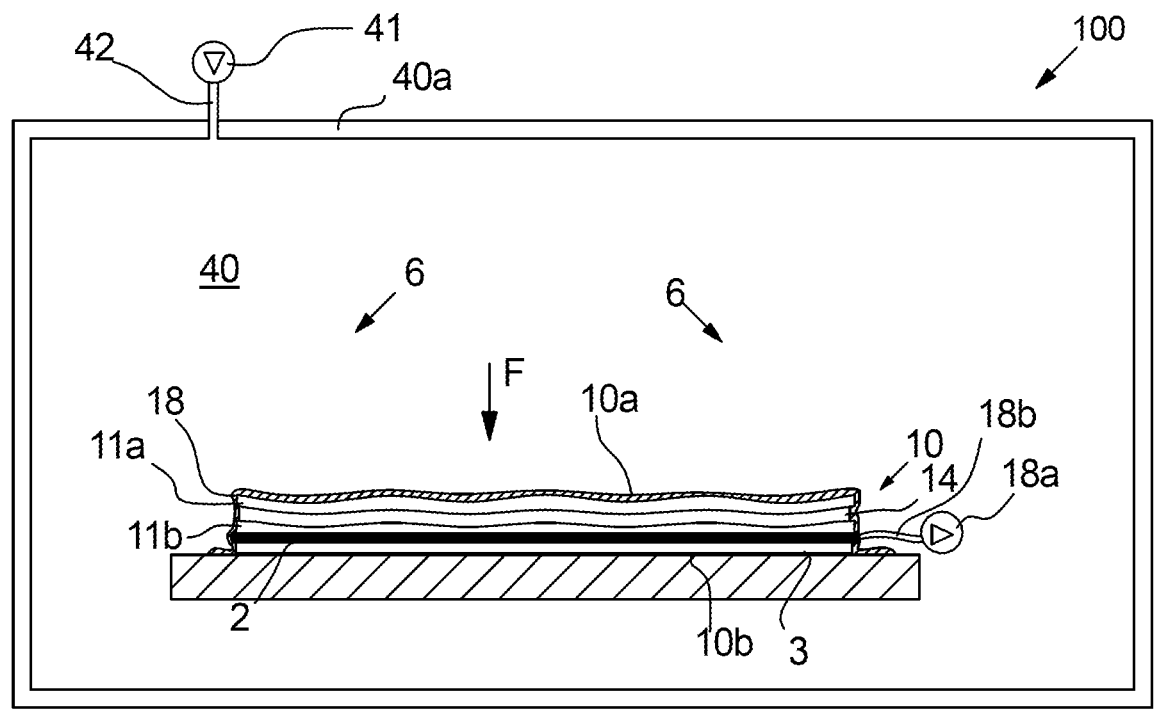
Figure 20:
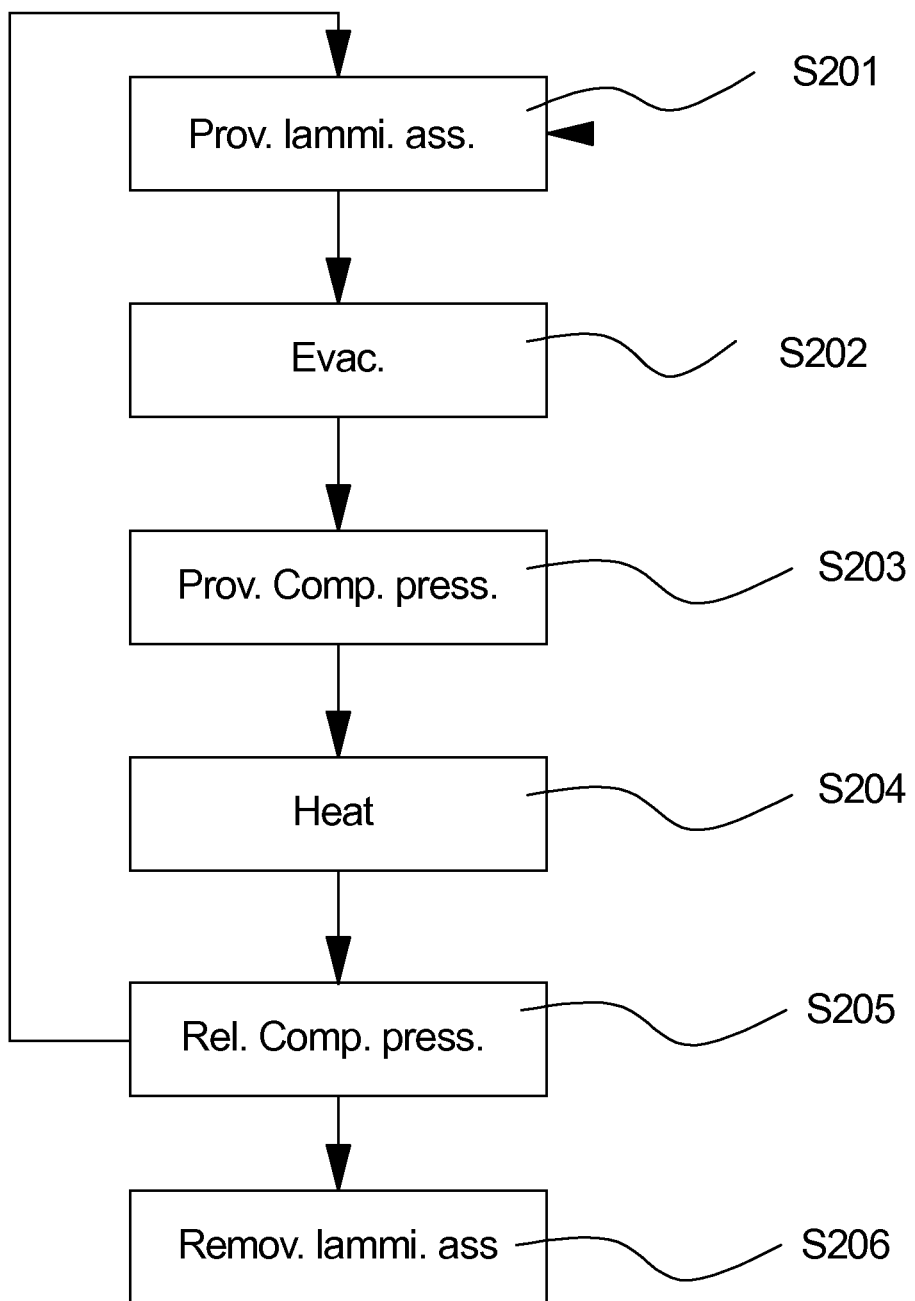
Figure 21:
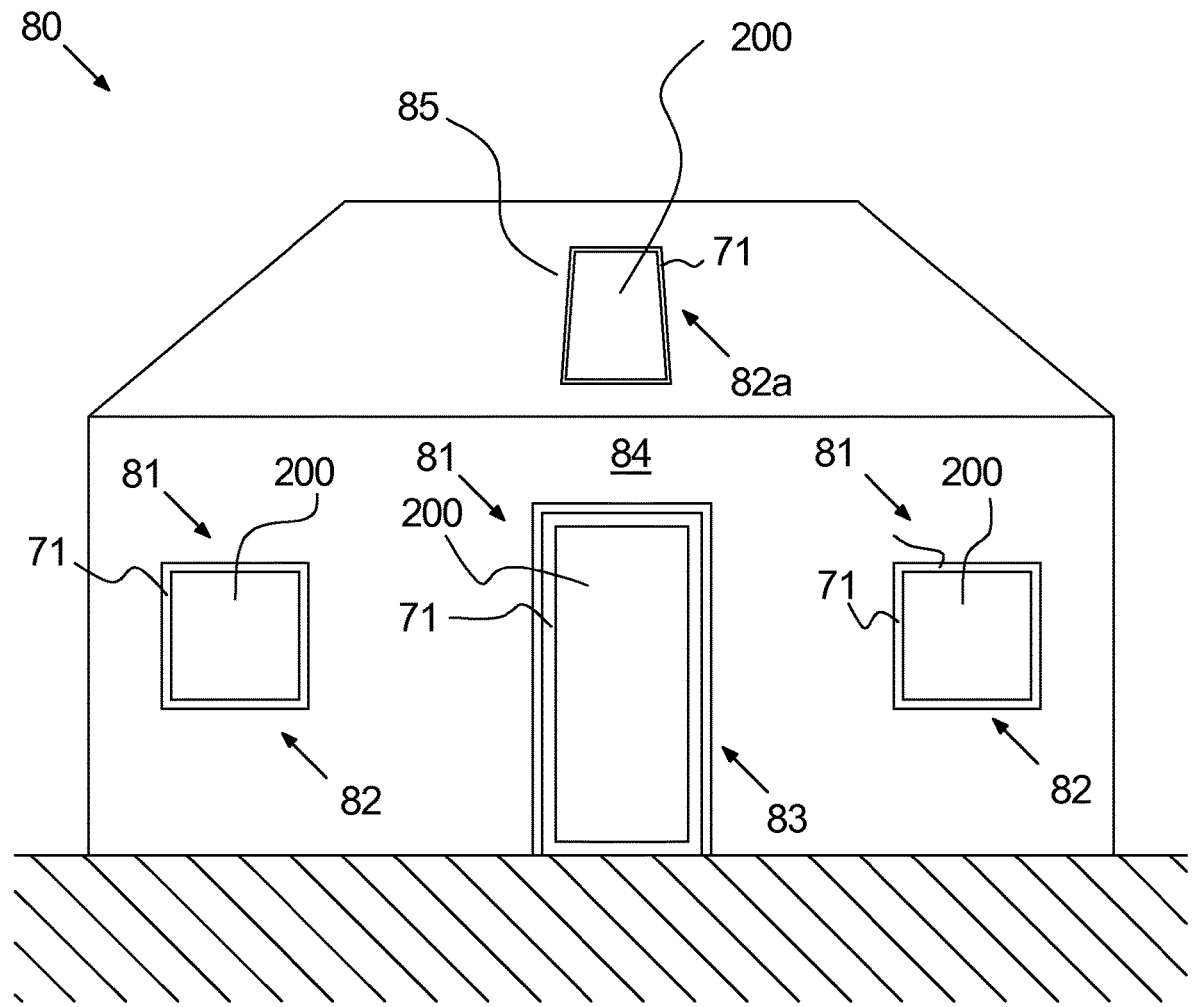
Figure 22:
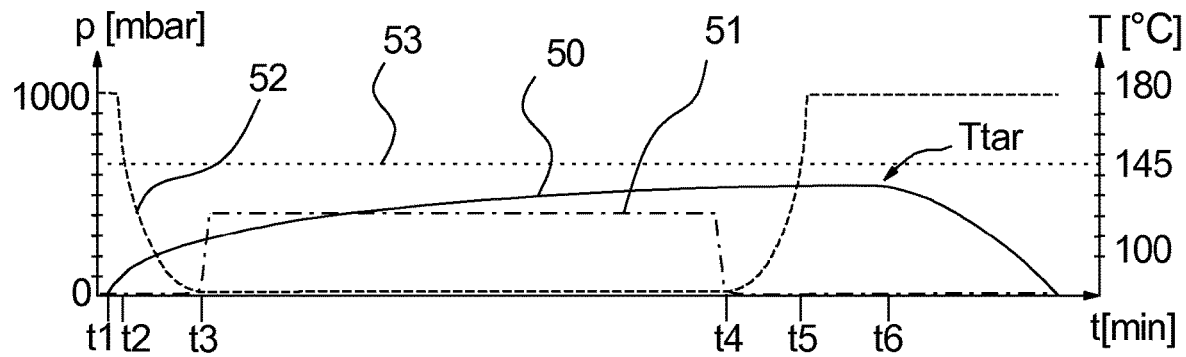
Figure 23:
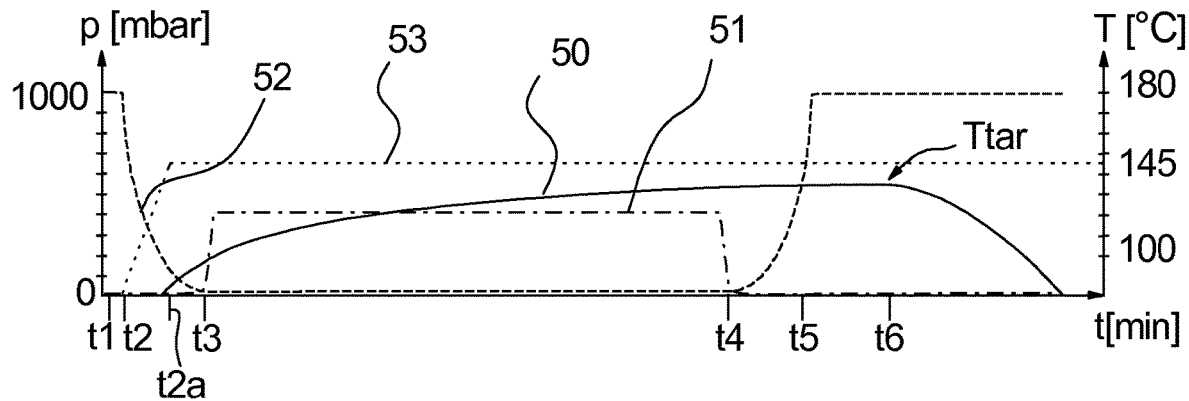
Figure 24:
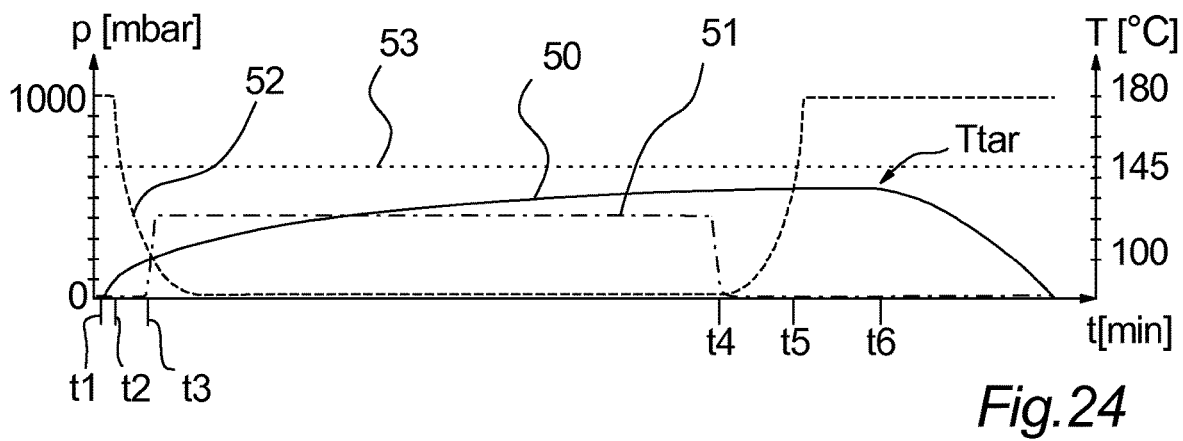
Figure 25:
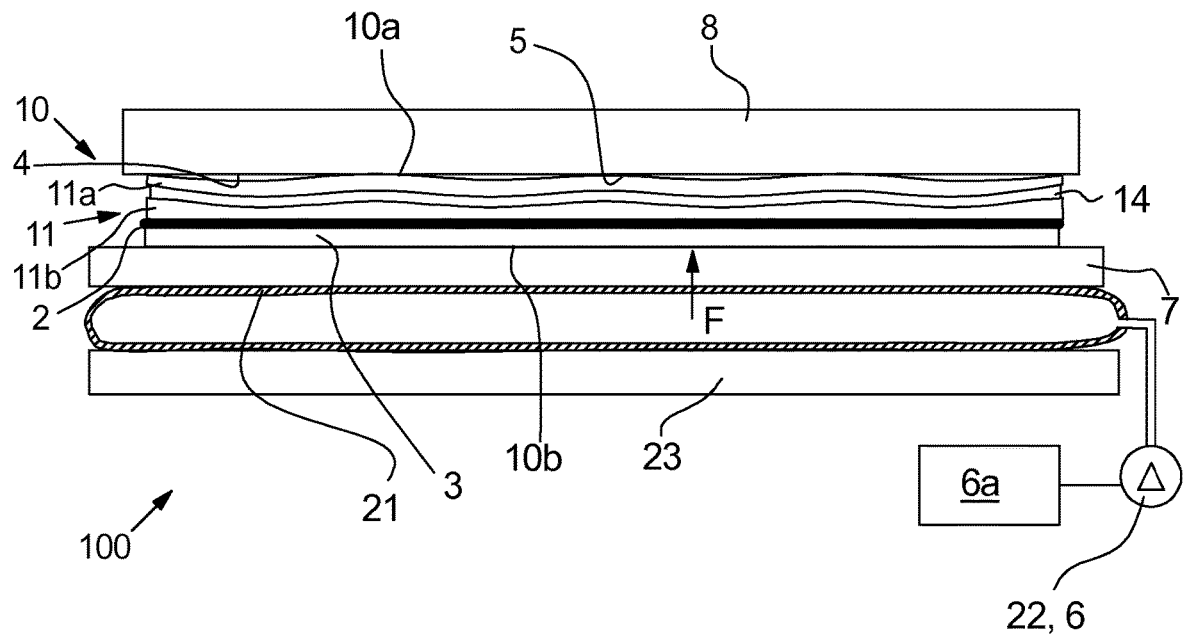
Figure 26:
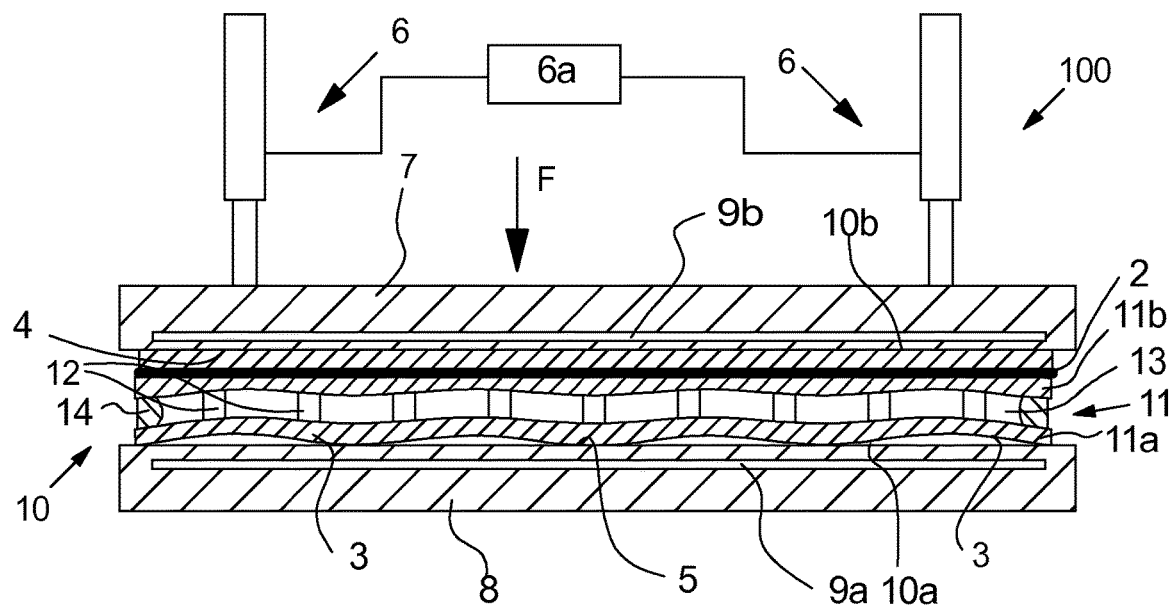
Figure 27:
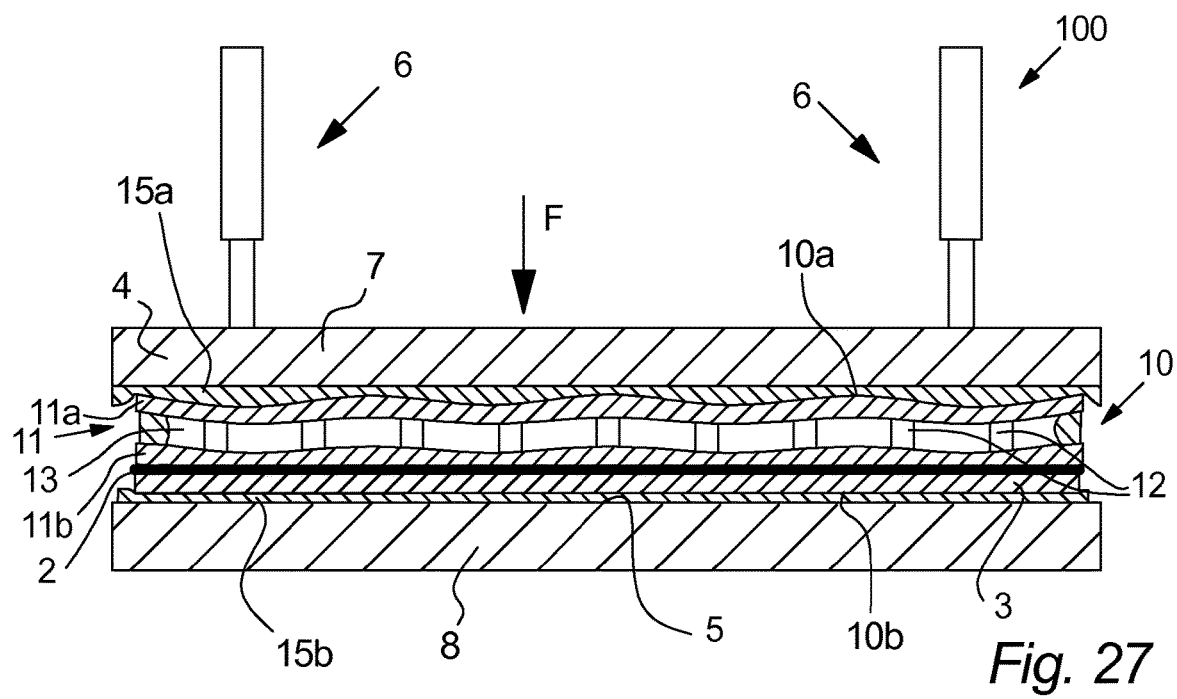
Figure 27A:
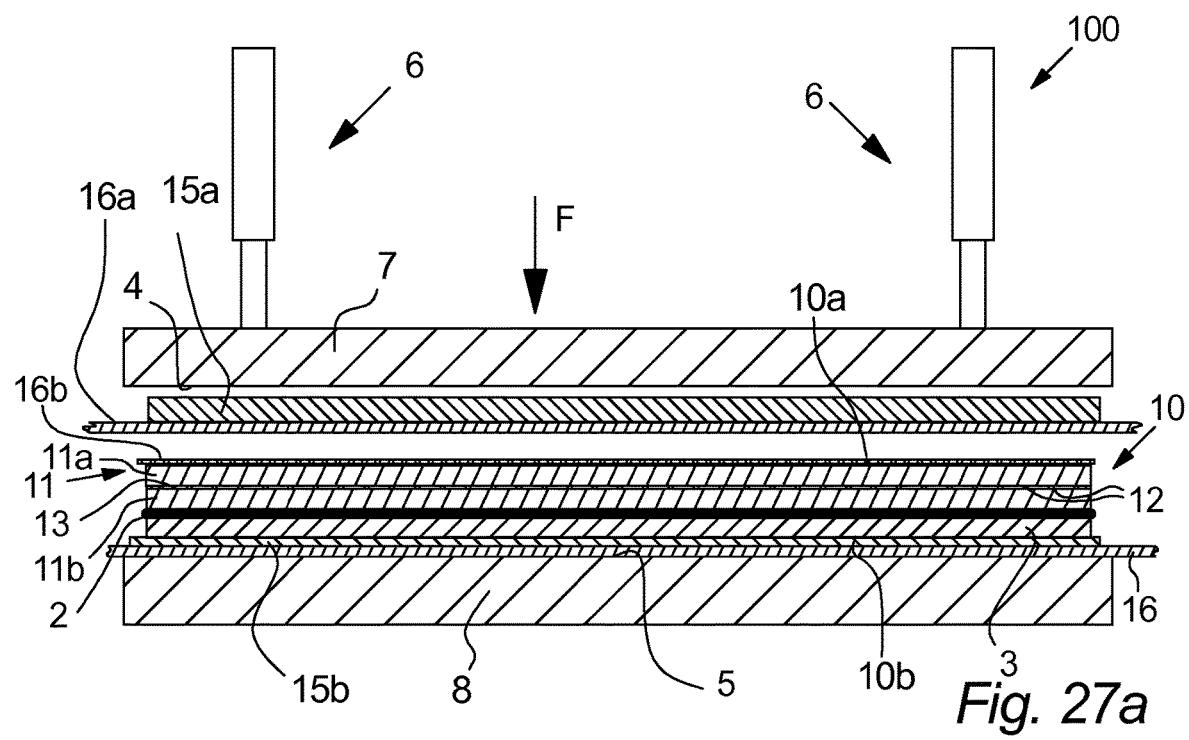
Figure 27B:
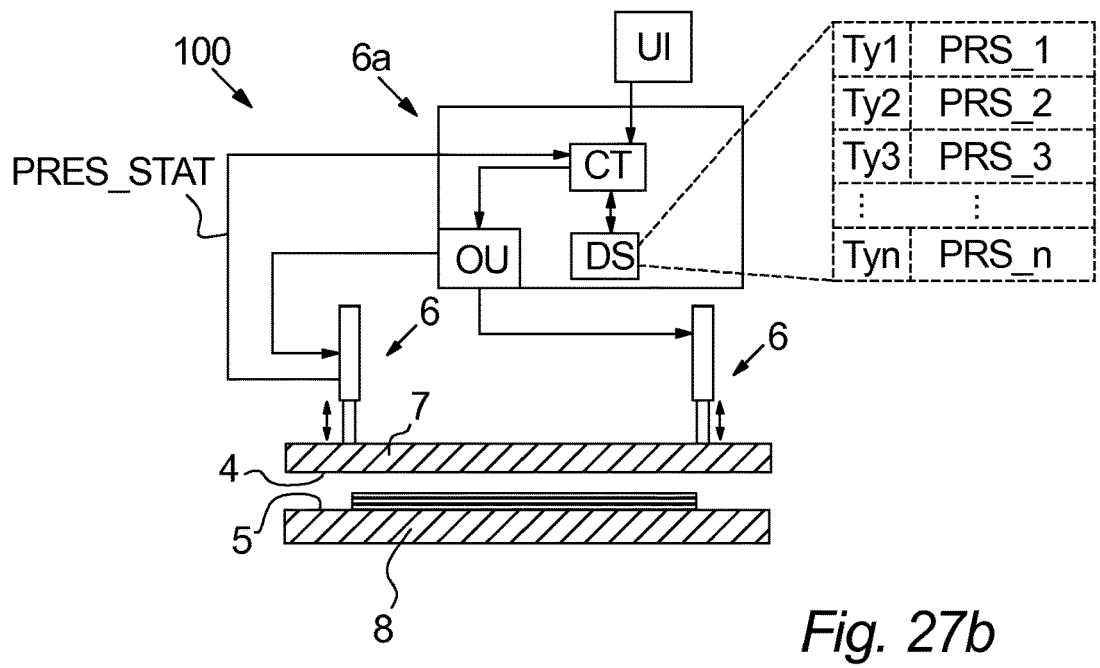
Figure 28:
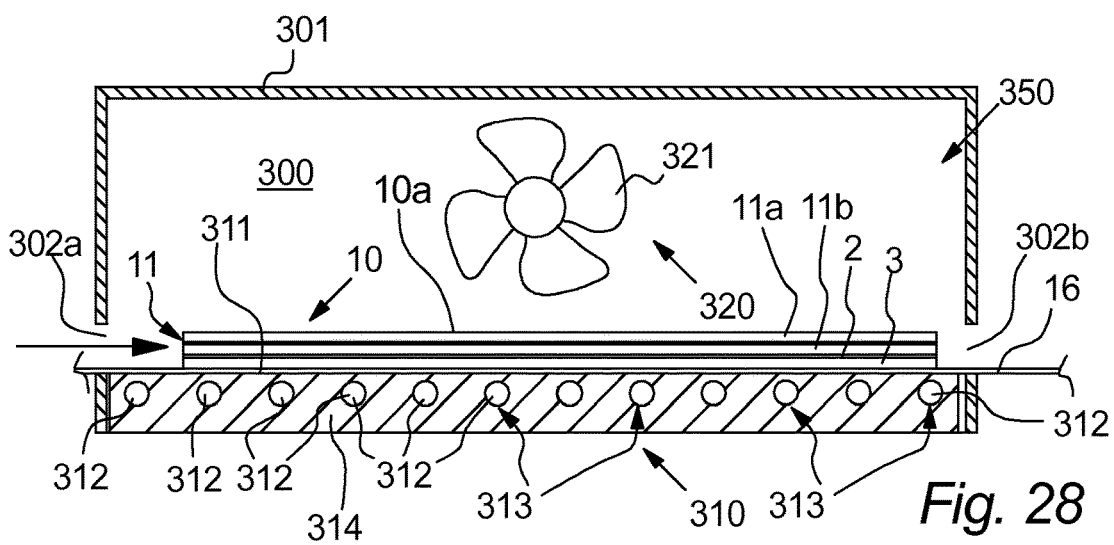
Figure 29:
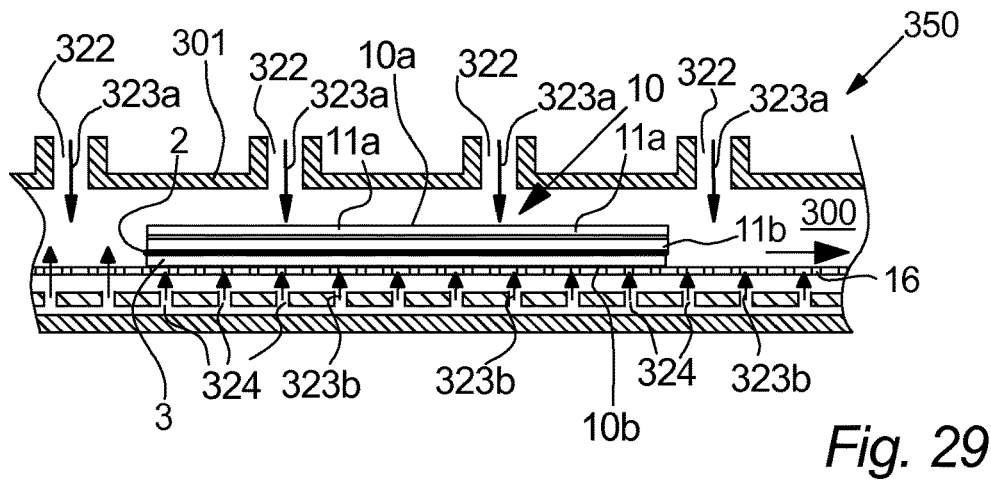
Figure 30:
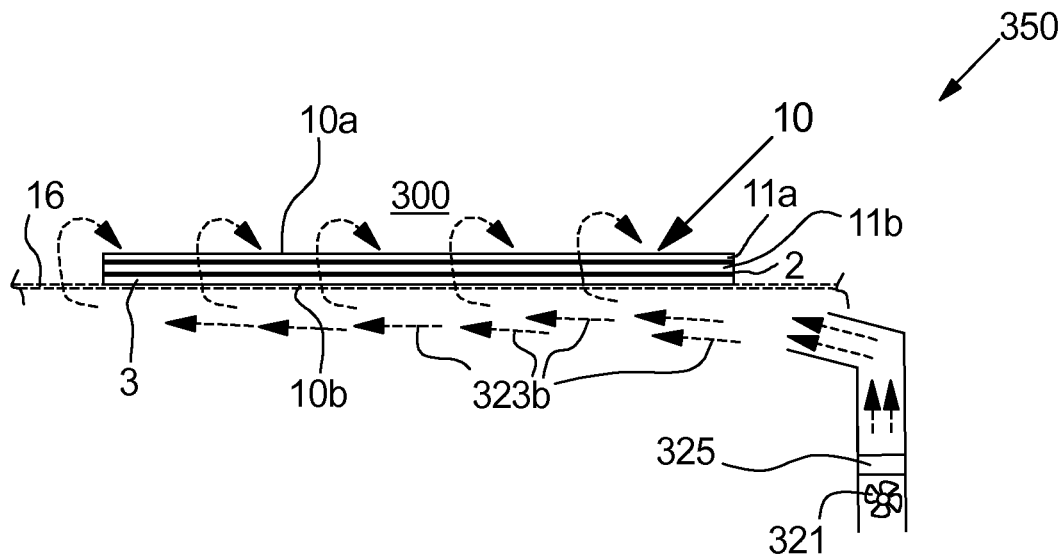
Figure 31:
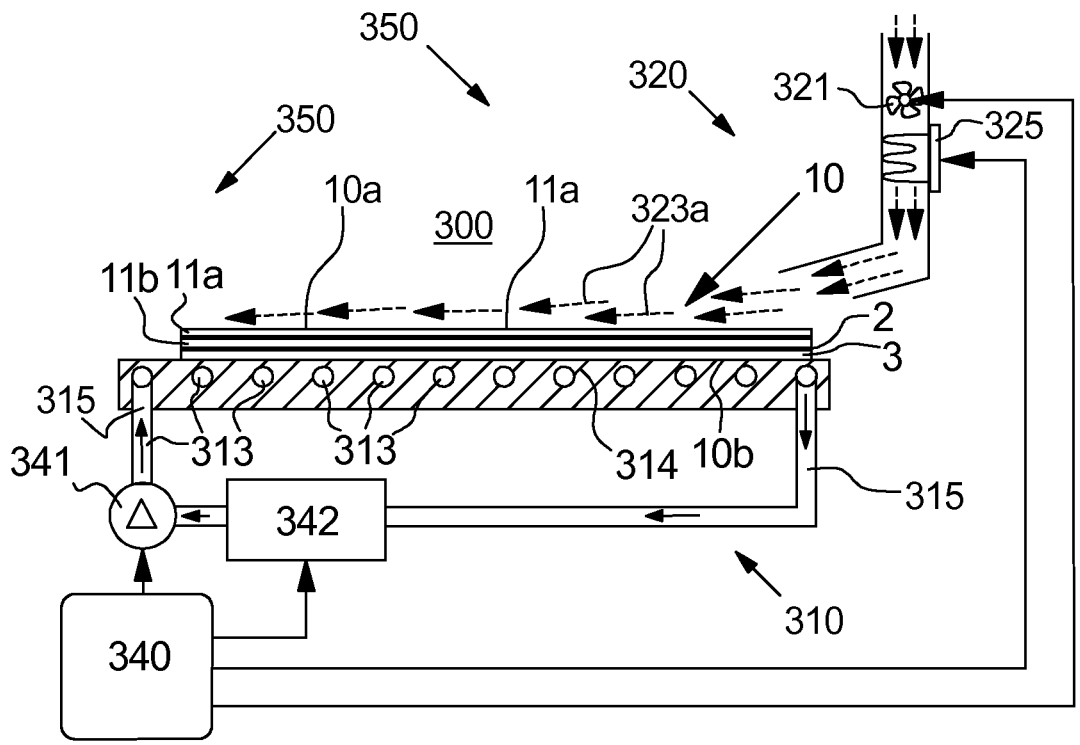
Figure 32:
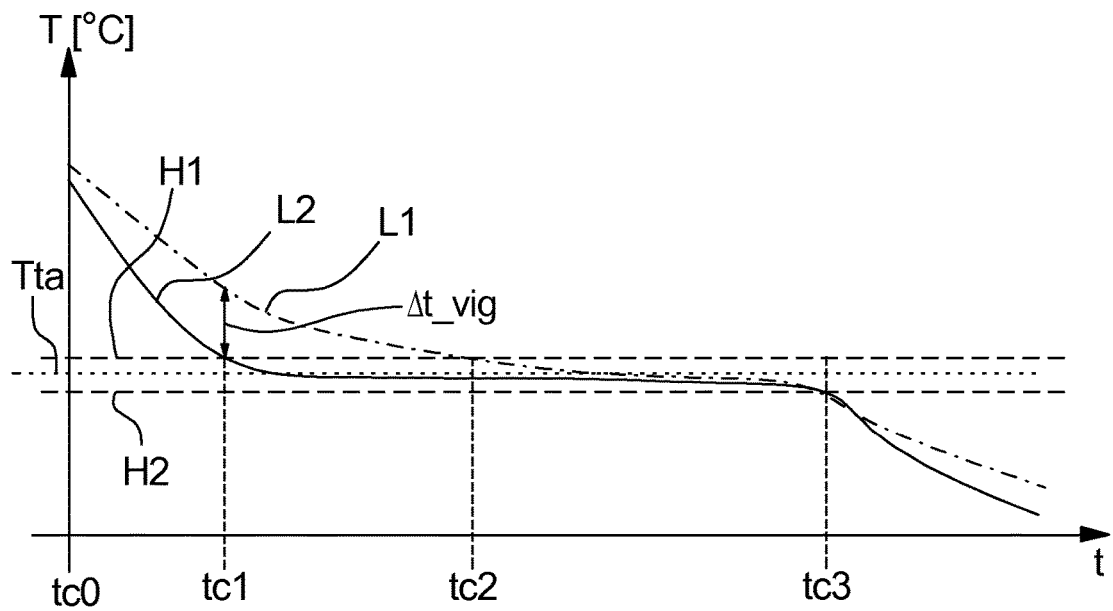
Figure 33:
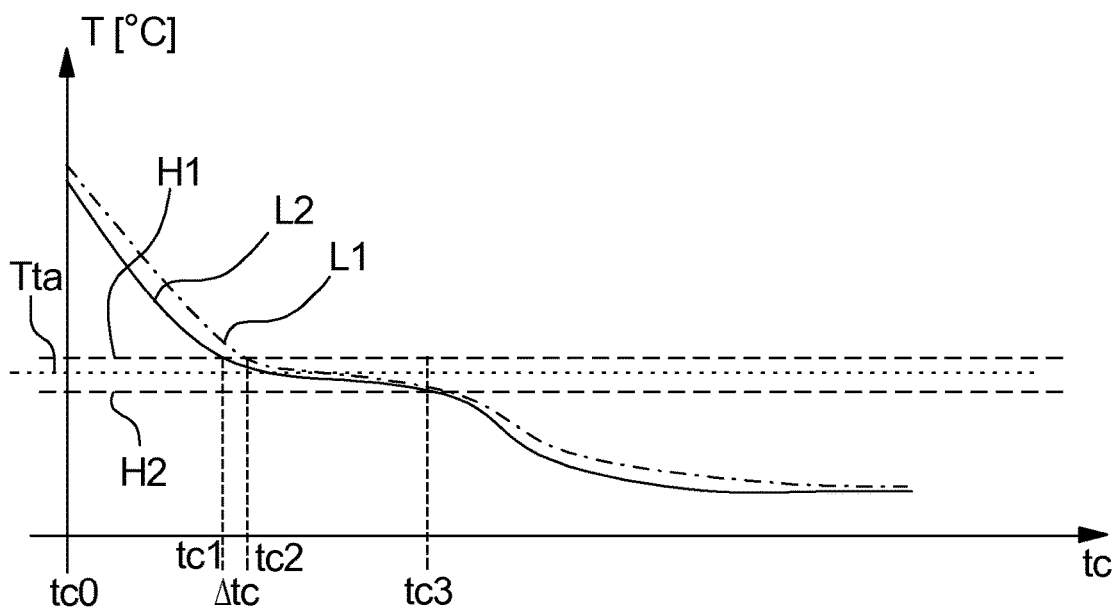
Figure 34:
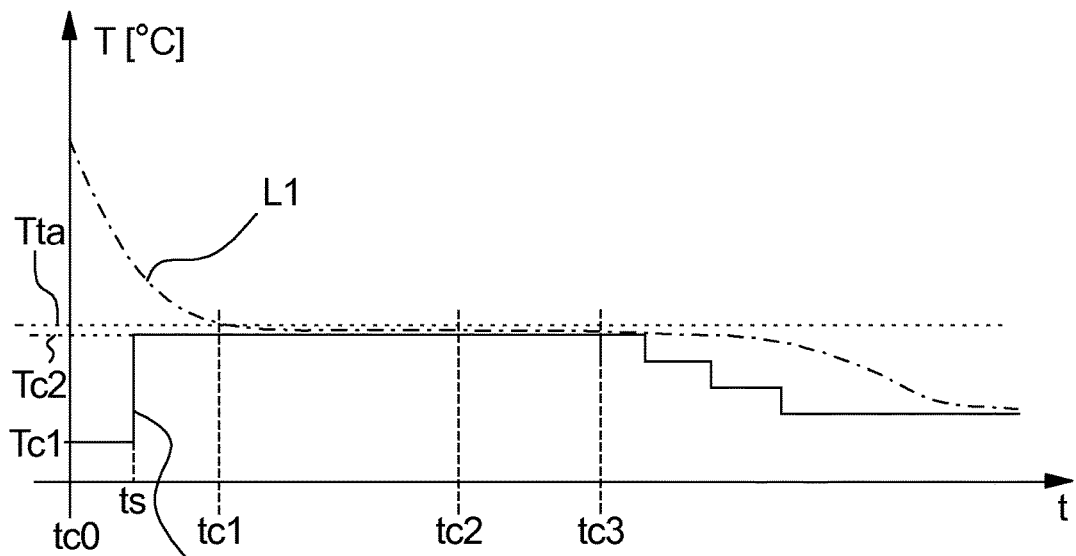
Figure 35:
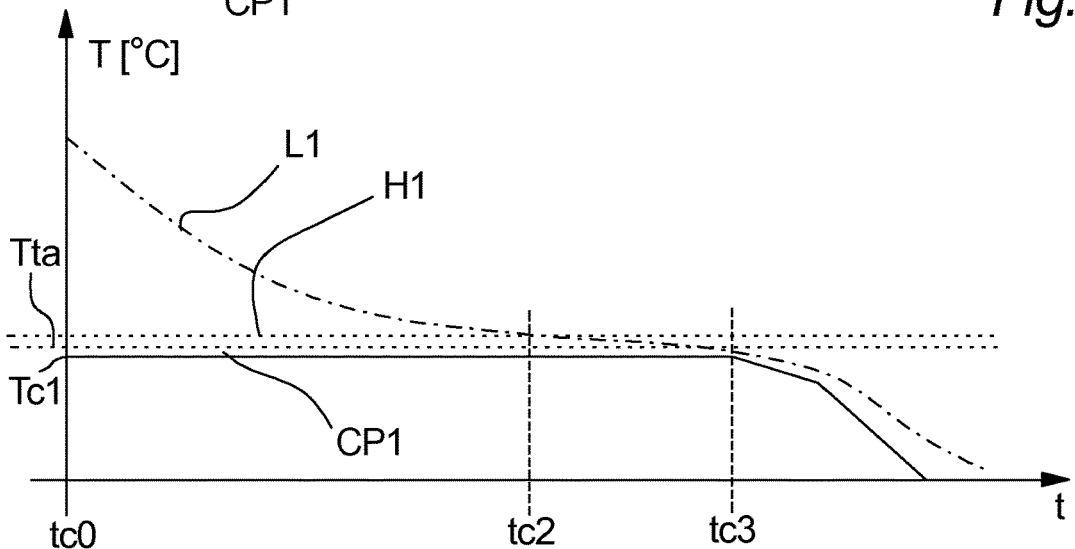
Figure 36:
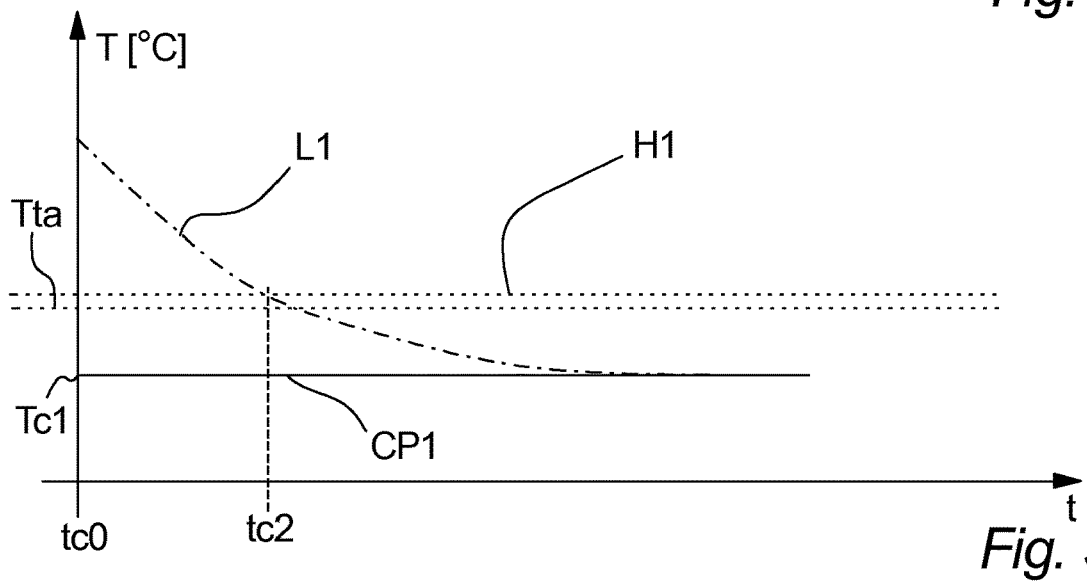
Figure 37:
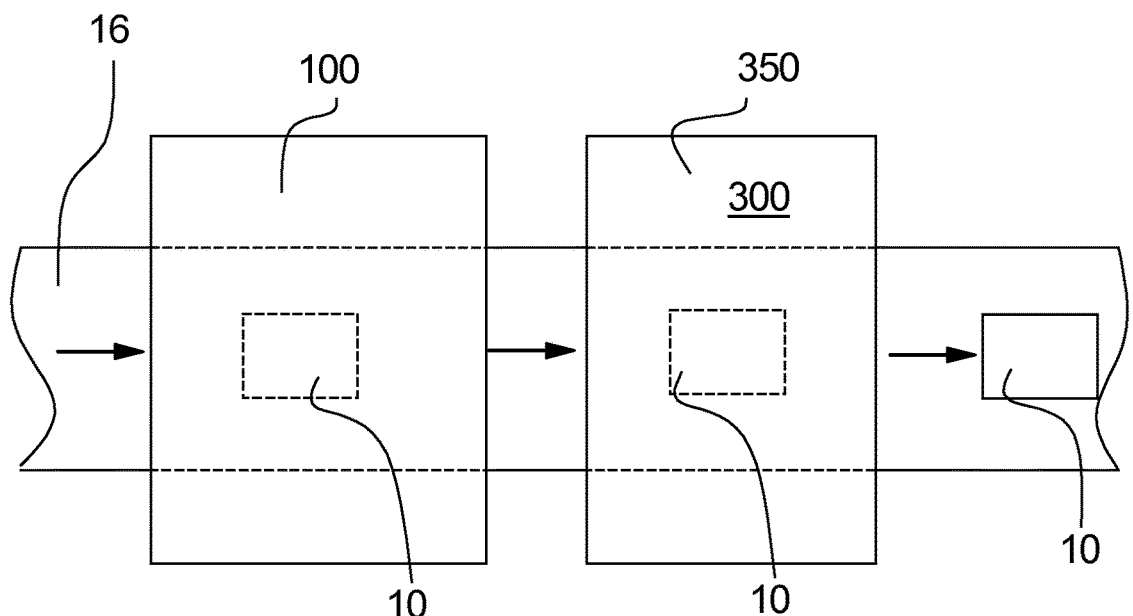
Figure 38:
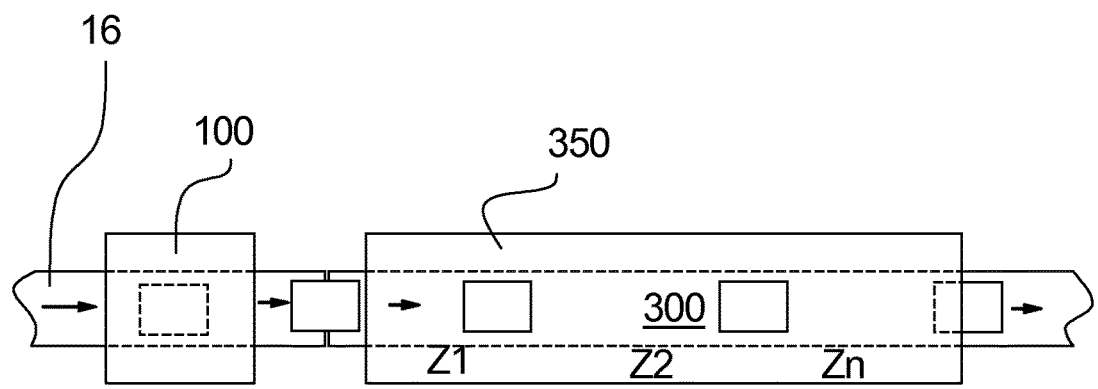
Figure 39:
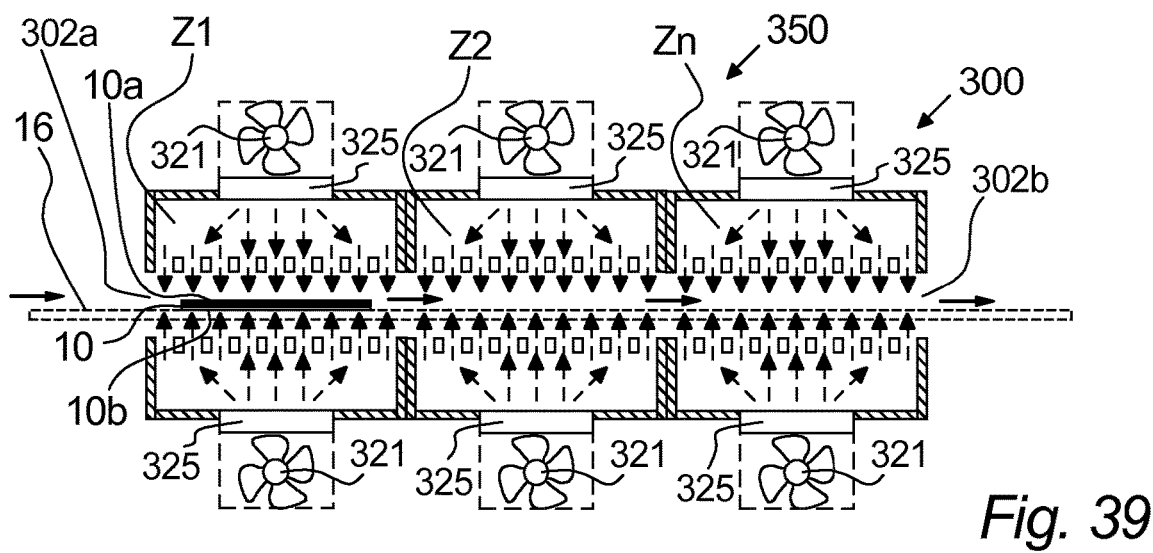
Figure 40:
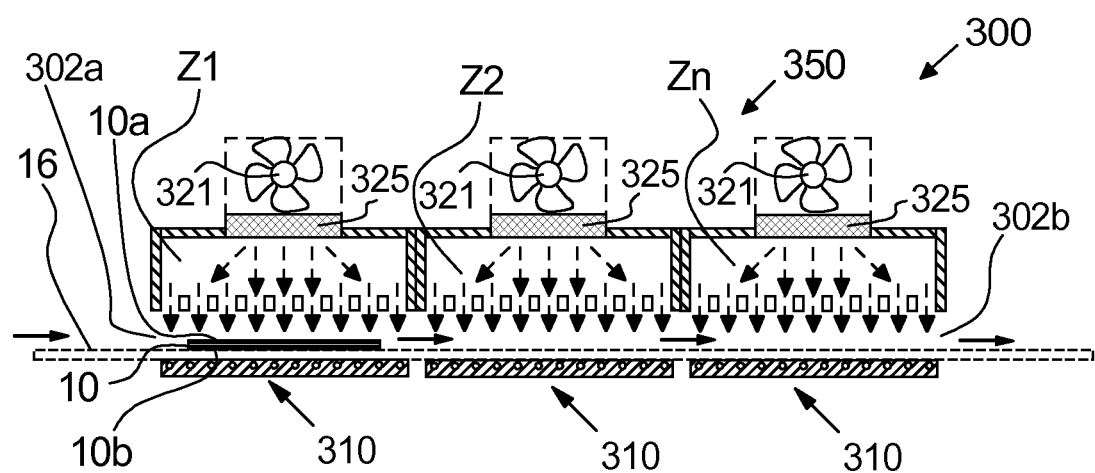

Aspects of the present disclosure will be described in the following with reference to the figures in which:

FIG. 1: illustrates a lamination assembly according to embodiments of the present disclosure, FIG. 2: illustrates a method and system for providing a lamination of a lamination assembly according to embodiments of the present disclosure, FIG. 3 illustrates embodiments of the present disclosure wherein one or more heater elements are placed in or at clamping bodies, FIG. 4 illustrates embodiments of the present disclosure where a resilient layer is used, FIG. 5 illustrates a lamination assembly supported by a transport member according to embodiments of the present disclosure, FIG. 6 illustrates schematically embodiments of the present disclosure where a lamination assembly is arranged in a vacuum enclosure, FIGS. 7-12 illustrates embodiments of the present disclosure where a lamination assembly is subjected to different temperatures during lamination, FIGS. 13-13a illustrates embodiments of the present disclosure wherein an inflatable member is used, FIGS. 14-15 illustrates embodiments of the present disclosure relating to heating arrangements for heating a lamination assembly, FIGS. 16a-16b illustrates a lamination assembly before and after a lamination process according to embodiments of the present disclosure, FIGS. 17a-18 illustrates a laminated VIG unit according to various embodiments of the present disclosure, FIG. 19 illustrates embodiments of the present disclosure where a pressure chamber is used for providing a compression pressure, FIG. 20 illustrates a flowchart according to embodiments of the present disclosure, FIG. 21 illustrates a building comprising one or more laminated VIG units according to embodiments of the present disclosure, FIGS. 22-24 illustrates a lamination process according to various embodiments of the present disclosure, FIG. 25 illustrates embodiments of the present disclosure where an inflatable member for providing a compression pressure is arranged below a lamination assembly, FIG. 26 illustrates embodiments of the present disclosure where a further sheet and lamination layer of a lamination assembly are arranged on top of the VIG unit, FIG. 27 illustrates embodiments of the present disclosure where resilient layers are used at both sides of a VIG assembly during a lamination cycle, FIG. 27a illustrates a heating step according to further embodiments of the present disclosure, FIG. 27b illustrates an embodiment of the present disclosure where different compression pressure settings are applied dependent on VIG unit assembly type, FIG. 28 illustrates embodiments of the present disclosure, where a heated lamination assembly is subjected to a cooling step, FIG. 29 illustrates embodiments of the present disclosure where a cooling step is provided by means of convection cooling, FIG. 30 illustrates embodiments of the present disclosure where a cooling step is provided by means of convection cooling directed at one major surface, FIG. 31 illustrates further embodiments of the present disclosure where conduction and convection cooling is provided in a cooling step, FIGS. 32-33 illustrates graphs of a cooling step according to embodiments pf the present disclosure, provided by means of a cooling system FIGS. 34-36 illustrates graphs of cooling profiles according to various embodiments of the present disclosure, FIG. 37 illustrates a lamination solution comprising a heating step followed by a cooling step, according to embodiments of the present disclosure, FIG. 38 illustrates a lamination solution comprising a heating step followed by a zone-divided cooling step, and FIGS. 39-40 illustrates zone-divided cooling steps according to various embodiments of the present disclosure.

DETAILED DESCRIPTION

In relation to the figures described below, where the present disclosure may be described with reference to various embodiments, without limiting the same, it is to be understood that the disclosed embodiments are merely illustrative of the present disclosure that may be embodied in various and alternative forms. The figures are not to scale; some features may be exaggerated or minimized to show details of particular components. Therefore, specific structural and functional details disclosed herein are not to be interpreted as limiting, but merely as a representative basis for e.g. teaching one skilled in the art to variously employ the present disclosure.

FIG. 1 illustrates schematically a cross sectional view of a lamination assembly 10 according to embodiments of the present disclosure.

The lamination assembly 10 comprises a vacuum insulated glass (VIG) unit 11. The VIG unit 11 comprises two thermally tempered glass sheets 11a, 11b separated by a plurality of support structures 12 distributed in a gap 13 between the tempered glass sheets 11a, 11b. An edge sealing 14 made from e.g. a soldering material such as a low temperature solder glass material which may be lead free, or alternatively a metal seal, extend between the glass sheets and enclose the gap 13 so it is sealed. The gap 13 is been evacuated to a pressure below $10^{-3}$ bar such as at or below $10^{-2}$, $10^{-3}$ or $10^{-4}$ mbar, and has been sealed. The evacuation of the gap 13 may e.g. have been established, prior to the lamination, through an evacuation opening (not illustrated in FIG. 1) in one of the glass sheets 11a, 11b which is subsequently sealed to maintain the reduced pressure in the gap 13.

The distance between the major surfaces of the VIG unit's glass sheets 11a, 11b facing the evacuated gap may in embodiments of the present disclosure be less than 0.5 mm, such as less than 0.3 mm, for example around 0.2 mm or below 0.2 mm, for example around 0.1 mm.

The glass sheets 11a are made from tempered glass such as thermally tempered glass, and as illustrated, the major surface of the glass sheets are uneven/wavy which may be a result/side effect of the thermal tempering. The variation may be up to ±0.1 mm, providing a height difference between "crests" and "troughs", or also denoted as "peaks" and "valleys", of the surface tempered glass sheet surface of up to 0.2 mm or even more. It is however understood that the surface variations are exaggerated in order to enhance the understanding of the figures.

The lamination assembly 11 moreover comprises a lamination layer 2 arranged between an outer surface 20 of the tempered glass sheets 11b of the VIG unit 11 and a further sheet 3 of the lamination assembly 10. The further sheet 3 may have substantially the same width and length as the glass sheets of the VIG unit. The further sheet 3 may in one or more embodiments of the present disclosure be an annealed glass sheet, it may be a thermally tempered glass sheet, it may be a hard polymer plate transparent to light in the visible range and/or the like.

The lamination layer may in one or more embodiments of the present disclosure be a Polyvinyl butyral (PVB) or a Ethylene Vinyl Acetate (EVA) layer, or it may be a SentryGlass® plus lamination layer.

The lamination layer 2 may in one or more embodiments be a multi-layer lamination layer made from a plurality of sheets of lamination material such as e.g. PVB or EVA.

The outer major surface 10b of the further sheet 3 may provide a first outer major surface of the lamination assembly 10, and the outer major surface 10a of the glass sheet 11a of the VIG unit 11 facing away from the lamination layer may provide the other outer major surface (10a) of the lamination assembly 10.

It is to be understood that the outer surfaces 10a, 10b may be coated with a coating layer (not illustrated) in one or more embodiments o the present disclosure.

The lamination layer 2 may e.g. have a thickness th1 between 0.25 mm and 3 mm, such as between 0.4 mm and 2.7 mm, e.g. between 0.7 mm and 2.4 mm. The thickness th1 may in one or more embodiments of the present disclosure be obtained by means of a multilayer lamination sheet comprising a plurality of stacked sheets made from a lamination material such as e.g. PVB or EVA.

The multi-layer lamination layer may in one or more embodiments of the present disclosure e.g. comprise between 2 and 7 layers such as between 2-5 layers, e.g. between 3 and 5 layers of lamination material such as PVB or PVA. Each layer of these may have a thickness of about 0.2-0.5 mm such as between 0.3 and 0.4, e.g. about 0.38 mm, and may together provide a lamination layer 2 thickness of between 0.25 mm and 3 mm, such as between 0.4 mm and 3 mm, e.g. between 0.7 mm and 2.4 mm. For example in one or more embodiments, the lamination layer may comprise two sheets of 0.38 mm PVB or EVA, thus providing an about 0.76 mm lamination layer, or e.g. a layer 2 comprising three or four lamination sheets each having a thickness of 0.2-0.5 mm such as between 0.3 and 0.4, e.g. about 0.38 mm.

Alternatively or additionally, the lamination layer may be a multilayer lamination layer comprising layers providing different properties such as different optical properties, e.g. frosting effect, a colouring effect, a window tinting effect and/or the like, and/or it may provide further effects such as e.g. a heat reflecting effect.

FIG. 2 illustrates schematically a method and system for providing a lamination of a lamination assembly 10 according to embodiments of the present disclosure. The lamination assembly is arranged to be subjected to a compression pressure F during lamination of the VIG unit 11 by means of the system 100.

The lamination assembly 10 is arranged between clamping surfaces 4, 5 of clamping bodies 7, 8 of the system 100 for providing a heating step.

The lower clamping surface 4 provides a support and counter pressure/force for supporting a major surface 10b the lamination assembly when the clamping surfaces are moved relative to each other to provide the compression pressure F to the outer, major surfaces 10a, 10b of the lamination assembly 10.

Both clamping surfaces 4, 5 is/are in the present example substantially plane and provided by rigid clamping bodies 7, 8 configured to be displaced by one or more mechanical clamping body displacers 6 to provide said compression pressure F.

The clamping bodies 7, 8 may comprise metal plates or blocks, or it may comprise fibre reinforced blocks or plates or any other suitable type of material composition.

Generally, it is understood that the clamping bodies 7, 8 may be rigid bodies, but may e.g. comprise a substantially plane surfaces 4, 5, or alternatively a surface comprising protrusions and recesses such as slits and/or holes. The rigid bodies 7, 8 may in one or more embodiments of the present disclosure be partly hollow, e.g. to enclose a heating medium and/or the like.

Generally, in one or more embodiments, the clamping bodies 7, 8 may have the same size or may be larger than the cross sectional area of the major surfaces of the glass sheets of the lamination assembly 10, and the compression pressure F and/or heating may be provided substantially evenly to substantially the entire major, outer surfaces 10a, 10b of the lamination assembly 10.

The clamping body displacer(s) 6 may in one or more embodiments of the present disclosure comprise one or more mechanical clamping body displacer(s) such as linear actuators, for example one or more pneumatic or hydraulic linear actuators, one or more electrically operated linear actuators e.g. comprising a threaded spindle and nut actuator type where nut and/or spindle are rotated to provide a distance change between the surface(s) 4, 5, it may comprise a toothed wheel assembly e.g. comprising a rack solution connected to one or more toothed wheels and/or the like. It may also comprise non-linear actuators such as non-linear guides (not illustrated).

The clamping body displacer(s) 6 is/are controlled by a displacement control arrangement 6a communicatively coupled to the one or more clamping body displacer(s) 6, and comprising control circuitry which is configured to control the distance between surfaces 4,5 based on input from sensors (not illustrated) and/or human operators operating a user interface communicatively connected to the control circuitry (see also FIG. 27b). The sensors may e.g. comprise pressure sensors such as strain gauges or the like configured to provide input to controller 6a so that the controller can adapt the provided compression pressure F in accordance with the measured force.

In one or more embodiments of the present disclosure, the sensor may be sensors configured to measure the electrical current supplied to the clamping body displacers 6, if these are electrically controlled, as the current supplied may be indicative of the compression pressure F provided to the lamination assembly.

In one or more embodiments of the present disclosure, the compression pressure F applied to the lamination assembly 10 may be between 1.05 atm and 5 atm, such as between 1.2 atm and 2.5 atm, e.g. between 1.45 atm and 2 atm. This may be controlled by controller 6a based on e.g. input from the one or more sensors.

The lamination assembly 10 is thus placed between the surfaces 4, 5, and the compression pressure F is provided by moving one or both of the bodies 7,8 towards each other, thereby reducing the distance between surfaces 4, 5.

The compression pressure F may in one or more embodiments of the present disclosure be provided while one or more heaters (not illustrated in FIG. 2) heats the lamination assembly 10. This heating may comprise heating the further sheet 3 to soften the lamination layer 2 between the further sheet 3 and the VIG unit 11, and heating the VIG unit 11 to prevent a warping of the VIG unit 11 due to a temperature difference caused by the heating of the lamination layer as e.g. described in relation to various embodiments later on.

FIG. 3 illustrates schematically an embodiments of the present disclosure, wherein one or more heater elements 9a, 9b, such as electrical heating elements, or heated fluid heating elements, are placed in or at the clamping bodies 7,8. This provides a heating of the bodies 7,8, and this heating is transferred to the outer major surfaces 10a, 10b of the lamination assembly 10 by the surfaces 4, 5, thereby providing a conduction heating of the lamination layer 2 and the VIG unit 11. The heating may in one or more embodiments of the present disclosure be provided after the compression pressure is provided.

It is understood that in further embodiments of the present disclosure, the element or elements 9a in or at the body 7 for heating the major surface 10a facing away from the lamination layer 2 may thereby be omitted. Alternatively, this heating may in further embodiments be provided by heating, such as convection heating, e.g. forced convection heating by the ambient air/gas in the environment wherein the lamination assembly 11 is placed.

In an embodiment of the present disclosure (not illustrated), one or both clamping bodies 7, 8 may be provided by a sandwich construction. This may comprise two substantially solid blocks of a material such as aluminium, brass, copper or the like, and an electrical heating blanket 9a, 9b may be placed between these two blocks. The one of or each of these blocks may e.g. have a thickness of between 5 mm and 80 mm, such as between 10 mm and 40 m, e.g. around 20 mm. For example it may be a 20 mm aluminium block+electrical heating blanket+20 mm aluminium block configuration.

The bodies 7, 8 may in embodiments of the present disclosure comprise different or the same heat capacities and/or different types of heating elements 9a, 9b. For example, the top body 7 may be of the above mentioned sandwich construction whereas the lower body may be a solid body with electrical heating cartridges embedded therein. The lower body may in embodiments have a higher heat capacity as it may be used for heating the laminated side of the VIG unit 11 comprising the further sheet 3 and the lamination layer, whereas the other side may be un-laminated and hence demand lesser capacity.

FIG. 4 illustrates schematically embodiments of the present disclosure wherein a resilient, and preferably also elastic, layer 15 such as a mat is placed between the lamination assembly 11 and the major outer surface 10a of the VIG unit, facing away from the lamination layer 2.

The resilient layer may be made from e.g. a silicone material a rubber material (e.g. synthetic or natural rubber) and/or a fabric material such as a cotton material e.g. made or chosen to be able to act as a resilient layer at the desired temperature(s) without being damaged. It may also in further embodiments of the present disclosure e.g. comprise a flexible layer comprising a Polytetrafluoroethylene (PTFE) composition, e.g. to provide a protective layer.

The thickness of the resilient layer may be between 1 mm and 10 mm, such as between 2 mm and 6 mm, e.g. between 3 mm and 5 mm. for example the thickness may be between 1 and 5 mm. In one or more embodiments, the resilient layer 15 may be a silicon mat that may have a thickness between 2 mm and 6 mm, such as between 2 mm and 4.5 mm.

The resilient layer or layers 15 may be attached to the surface 4 of the body 7 and/or 8, or may be a loose sheet that is/are placed to support/cover the surface of the lamination assembly before the compression pressure is applied.

The resilient layer 15 may in one or more embodiments of the present disclosure e.g. provide a heat insulating functionality to e.g. provide that the surfaces 10a, 10b are heated according to different heating profiles so that the surface 10b is heated faster and/or at a higher temperature than the surface 10a as e.g. described in more details later on.

The resilient layer 15 may e.g. be chosen in order to control the heat flux when heating the further sheet and/or the VIG glass sheet 11a, e.g. to obtain a different heat flux for these surfaces.

In further embodiments of the present disclosure, a resilient layer 15 may also be placed between the body 8 and the further sheet 3 (not illustrated in FIG. 4) e.g. distribute the compression pressure, to protect the lamination assembly surfaces, to provide a thermal insulation and/or the like, see e.g. FIG. 27. This layer 15 may have one or more of the same properties as suggested above, and/or may in further embodiments also be thinner than the sheet between VIG unit glass sheet 11a and the body 7 in order to e.g. obtain an increased heat flux to the further sheet 3 compared to the heat flux to the glass sheet 11a, if the bodies 11a, 11b comprises a heating solution.

FIG. 5 illustrates schematically a lamination assembly 10 supported by a transport member 16 according to embodiments of the present disclosure. The transport member/arrangement 16 is configured to support and transport the lamination assembly 10 to and from a location so as to be subjected to said compression pressure F and/or heating, see e.g. description above relating to FIGS. 2-3 and/or description below.

The transport member support on the clamping surface 5 and slides over this surface.

The compression pressure F is applied so that the transport member 16 is clamped between the lamination assembly 11 and surface 5.

The transport member 16 may comprise a sheet of soft material such as a woven fabric material. In one or more aspects of the present disclosure, the transport member 16 may be a polymer material such as a nylon/polyamid material, e.g. a nylon fabric sheet. The transport member 16 is arranged between a clamping surface 3 and the lamination assembly 10 while the compression pressure F is provided, and thereafter, the transport member 16 may move the lamination assembly 10 when the lamination process is sufficiently done/finished, e.g. to a cooling down location for further cooling the now laminated VIG unit. This is done after the compression pressure F has been released again by increasing the distance between surfaces 4,5.

The cooling may generally, in various embodiments of the present disclosure, be provided by a forced cooling solution, e.g. in a convection cooling chamber where a temperature controller controls the temperature and where cooling air/gas is supplied by means of one or more nozzles or the like (Various embodiments of this is described in more details later on in relation to one or more of FIGS. 28-40), or it may be provided by means of natural cooling.

The surface 5 may in one or more embodiments of the present disclosure be applied with a friction reducing layer (not illustrated) such as e.g. Polytetrafluoroethylene (PTFE) based layer, to reduce friction when sliding the member 16 over the surface 5.

A transport member driver 17 such as an electric motor may control the movement of the transport member 16 and the lamination assembly 10 or lamination assemblies 10 transported on the transport member 16. The transport member 16 may in one or more aspects be arranged to provide/constitute a conveyer belt. Hence, when a sufficiently finished lamination assembly is moved away from the pressure arrangement 7,8, a new lamination assembly may be moved in between the bodies 7, 8 by the transport member 16. The belt 16 may e.g. be a PTFE conveyer belt with a poly-paraphenylen terephthalamid based mesh.

FIG. 6 illustrates schematically embodiments of the present disclosure where the lamination assembly 10 is arranged in a vacuum enclosure 18. The lamination assembly 10 is subjected to an evacuation step in the vacuum enclosure, e.g. during applying said compression pressure (F). This evacuation step may help to remove gas bobbles/remains between the lamination layer and the VIG unit 11 and/or between the lamination layer 2 and the further sheet 3.

The evacuation step may in one or more embodiments of the present disclosure help to apply a part of the compression pressure F, e.g. up to about 1 atm, and the remaining compression pressure may e.g. be provided by means of a mechanical clamping arrangement 7, 8, it may be provided in a pressure chamber (not illustrated) where the ambient air pressure outside the vacuum enclosure is raised and/or the like.

The evacuation step to evacuate the space between the vacuum enclosure 18 and the lamination assembly 2 is provided by a pump 18a arranged in fluid communication 18b (e.g. a tube/pipe or the like) with the interior of the vacuum enclosure 18.

The vacuum enclosure 18 is in the example of FIG. 6 a flexible sheet/bag that cover the lamination assembly 10 in an air-tight way and which can be evacuated to press onto the lamination assembly 10 and remove gas remains between the further sheet 3 and the VIG unit 11.

Figure 7:
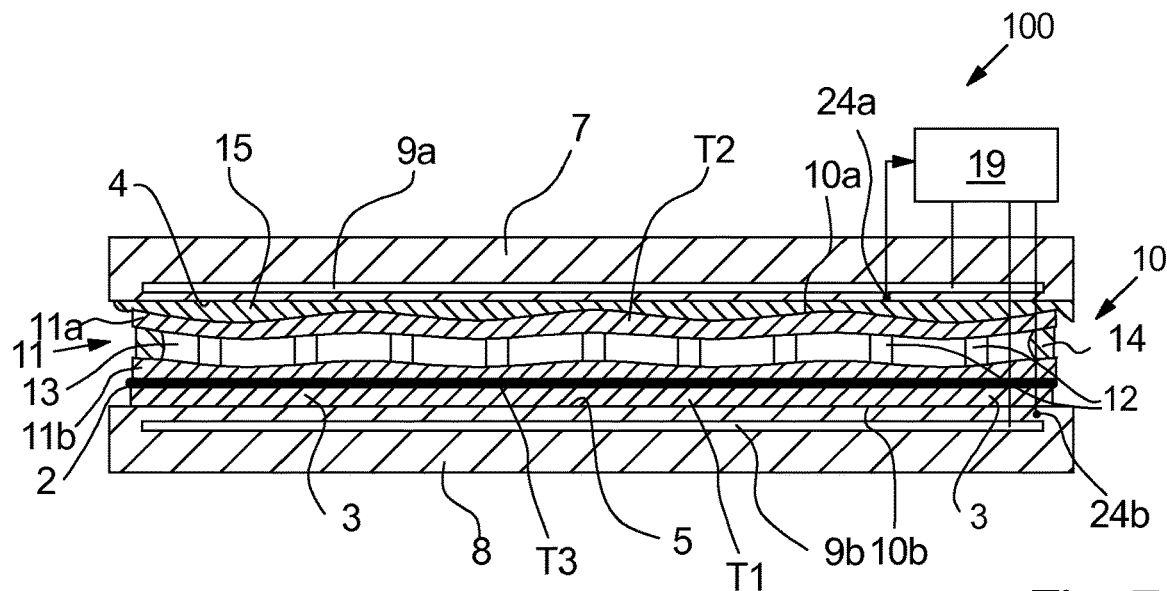

FIG. 7 illustrates schematically embodiments of the present disclosure where the outer major surfaces 10a, 10b of the lamination assembly are subjected to different heating temperatures T1, T2.

The outer major surface 10b of the further sheet 3 is subjected to a first heating temperature T1, and the outer, major surface 10a of the glass sheet 11a of the VIG unit 11 facing away from the further sheet 3 is subjected to a second heating temperature T2.

The first temperature T1 is higher than the second temperature T2 at substantially the same point in time in order to heat the lamination layer to soften the lamination layer to an extent where the lamination can be provided sufficiently, e.g. by means of applying a compression pressure as e.g. explained in various embodiments or aspects above and/or below.

Heating element or elements 9b provides temperature T1, and heating element or elements 9a provides temperature T2.

In one or more embodiments of the present disclosure, the temperature T1 provides that the lamination layer 2 is heated to a softening temperature T3 between 85° C. and 160° C., such as between 90° C. and 155° C., e.g. between 95° C. and 150° C. In further embodiments of the present disclosure, the lamination layer temperature may be heated to e.g. between 90° C. and 110° C., such as between 95° C. and 105° C.

In further embodiments, the lamination layer may be heated to a temperature between 100° C. and 190° C., such as between 125° C. and 165° C., e.g. between 140° C. and 150° C. during lamination.

The temperature T2 may e.g. be set or adapted to be substantially corresponding to the temperature to which the glass sheet 11b of the VIG unit facing the lamination layer 2 is heated due to the heating by T1.

The heating element or elements 9a, 9b are arranged in or at the heating bodies 7, 8.

A resilient layer 15 as e.g. previously explained may be arranged between the surface 10a and the heating element or elements. In the present example, the layer 15 is arranged between the outwardly facing surface 10a of the VIG unit and the heating element or elements 9a. In further embodiments of the present disclosure, (not illustrated in FIG. 3) a resilient layer 15 may be arranged between the further sheet 3 and the heating element or elements 9b.

In further embodiments, the resilient, preferably elastic, layer/mat 15 may be omitted.

In still further embodiments of the present disclosure, the heating element or elements 9a, 9b, such as electrical heating wires, may be embedded in the resilient layer 15 (not illustrated), or be arranged between the layer 15 and the body 7

A temperature controller 19 may on embodiments of the present disclosure comprise closed loop temperature control circuitry such as a PD (proportional-derivative controller) or PID (proportional-integral-derivative controller), or any other suitable type of closed loop control circuitry configured to control the heating of the surfaces 10a, 10b respectively to the different temperatures. The controller 11 may e.g. receive temperature information from temperature sensors 24a, 24b in, at or near the bodies 7, 8 which may be used for determining the temperature of the surfaces 4,5, and the controller 19 may control the heating arrangements 9a, 9b based thereon.

In other embodiments, the temperature controller may comprise an open loop control system.

The temperature difference between the first T1 and second T2 temperature may in one or more embodiments be provided by different temperature settings of the first and second heating arrangements 9a, 9b, e.g. controlled by the temperature controller 19.

In one or more embodiments of the present disclosure, the initial heating temperature T1 at the outwardly facing major surface 10b of the further sheet 3 may be higher than the initial temperature T2 subjected to the major surface 10a of the glass sheet of the vacuum insulated glass VIG unit 11 facing away from the further sheet 3.

The heating temperature T1 at the outwardly facing major surface 10b of the further sheet 3 may in one or more embodiments of the present disclosure be gradually increased. The heating temperature T2 may be subjected to the major surface 10a of the glass sheet of the vacuum insulated glass VIG unit 11 facing away from the further sheet 3 may be gradually increased at a slower rate than said first heating temperature T1. For example so that $dT1/dt > dT2/dt$ during the lamination process and determined at the same point in time, where T1 is said first temperature and T2 is said second temperature.

This may e.g., in one or more aspects of the present disclosure be provided during at least 10% of the heating time, such as at least 20% of the heating time, e.g. at least 35% of the heating time such as at least 50% of the heating time for heating the further sheet and/or the major surface of the glass sheet of the vacuum insulated glass unit facing away from the further sheet.

The first heating temperature T1 is in FIG. 7 provided by a first heating arrangement 9b, and the second heating temperature T2 is provided by a second heating arrangement 9a. These may e.g. comprise one or more electrical heaters, and/or be configured to provide heating by a fluid such as e.g. a heated oil which e.g. is supplied to the interior of heating bodies (7, 8) by a fluid flow of heated oil (not illustrated).

As can be seen in FIG. 7, the lamination assembly 2 may be arranged between first and second heating bodies 7, 8 comprising heating surfaces 4, 5 transferring heat to the VIG assembly at outwardly facing major surfaces 10a, 10b of the lamination assembly 10.

The second heating body 7 heats the outer, major surface 10a of the glass sheet of the VIG unit 11 facing away from the further sheet 3, and a heat insulating layer 15 such as a as a fabric layer, foam layer or the like as e.g. previously disclosed may be placed between the second heating body 7 and the lamination assembly 2 in further embodiments of the present disclosure.

The heating bodies 7, 8 may also, in one or more embodiments of the present disclosure, provide clamping bodies 7, 8 for providing a compression pressure F to the lamination assembly 10 during lamination of the vacuum insulated glass VIG unit 11 as e.g. disclosed above.

The heating surface 5 proximate the further sheet 3 and arranged to heat the further sheet 3 may transfer more heat to the outer surface 10b of the further sheet 3 per time unit than the heating surface 4 arranged to heat the outer, major surface of the glass sheet of the vacuum insulated glass VIG unit 11 facing away from the further sheet 3.

The heating by the first and second heating temperatures T1, T2 may in one or more aspects of the present disclosure be adapted in order to provide a substantially equal temperature of the glass sheets 11a, 11b of the VIG unit at the same time during the lamination process.

In one or more embodiments of the present disclosure, the first temperature T1 and the second temperature T2 are configured to follow different heating profiles.

Figure 8:
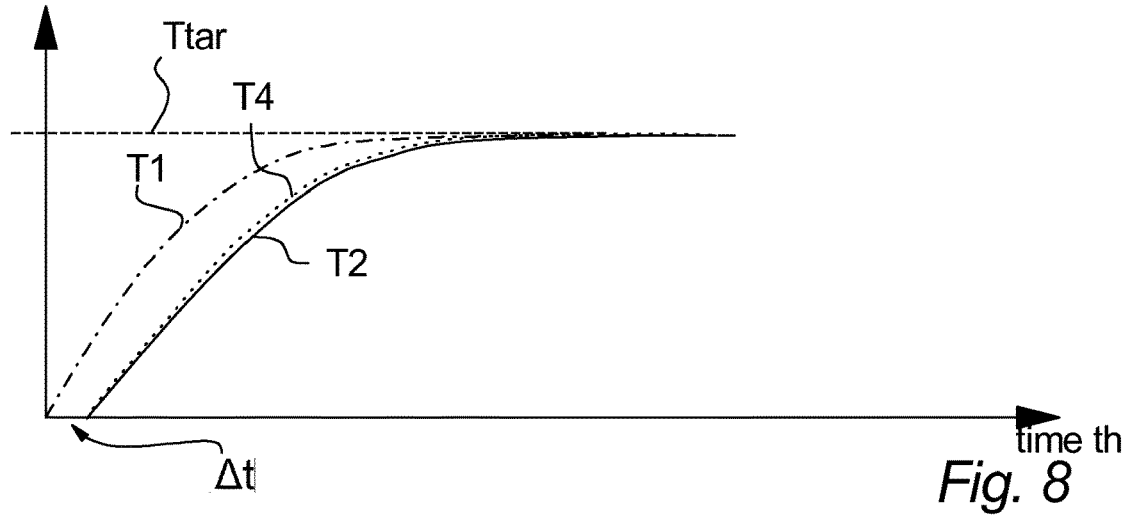

FIG. 8 illustrate an embodiment of the present disclosure where the first temperature T1 (dash/dotted line) and the second temperature T2 (solid line) are configured to follow different heating profiles. As can be seen, the surface of the further sheet 3 may be subjected to a faster temperature increase (see T1 profile as the dashed/dotted line), compared to the temperature increase of the glass sheet 11a of the VIG unit 11 comprising an outwardly facing surface 10a facing away from the lamination layer 2, towards a target temperature Ttar for the lamination layer.

The target temperature Ttar may in one or more embodiments of the present disclosure be at or near the temperature desired for softening the lamination layer sufficiently to provide the desired bonding and/or softness to allow a pressing of the VIG unit surface into the softened lamination layer 2.

The temperature T4 (dotted line) near the solid line T2 illustrates the temperature increase of the glass sheet 11b of the VIG unit proximate the lamination layer 2 due the T1 heating. As can be seen, this heating of glass sheet 11b may be delayed compared to the temperature T1 providing the heating of sheet 11b due to that the further sheet 3 and the lamination layer 2 are heated together with the glass sheet 11b.

T2 illustrates the temperature profile obtained by heating the glass sheet 11a of the VIG unit facing away from the lamination layer 2. As can be seen in FIG. 8, this heating may in one or more embodiments be time delayed Δt to accommodate/adapt to the delay in the heating of the sheet 11b due to that the further sheet 3 and the lamination layer 2 are arranged between the VIG and the heating surface 5. This may e.g. be controlled by e.g. increasing the temperature of the heater or heaters 9a later than the heater or heaters 9b to give the heating provided by the heater or heaters 9a time to be transferred through the further sheet and the lamination layer to the glass sheet 11b. The time delay ΔT may e.g. be more than 10 seconds, such as more than 50 seconds, e.g. more than 3 minutes, such as more than 5 minutes. For example, the time delay may be between 10 seconds and 10 minutes.

The time delay Δt may be controlled by the temperature control arrangement 19 in one or more aspects of the present disclosure, e.g. by a closed loop control such as a PD or PID control, or an open loop control. Also or alternatively, the time delay ΔT be provided at least partly by placing a heat insulating layer 15, see e.g. FIG. 4, in between the heater arrangement heating the surface 10a, and/or by providing/selecting different materials and/or constructions of the bodies 7,8 having different heat transfer characteristics enabling that one body 8 transfer heat faster than the second body 7.

Figure 9:
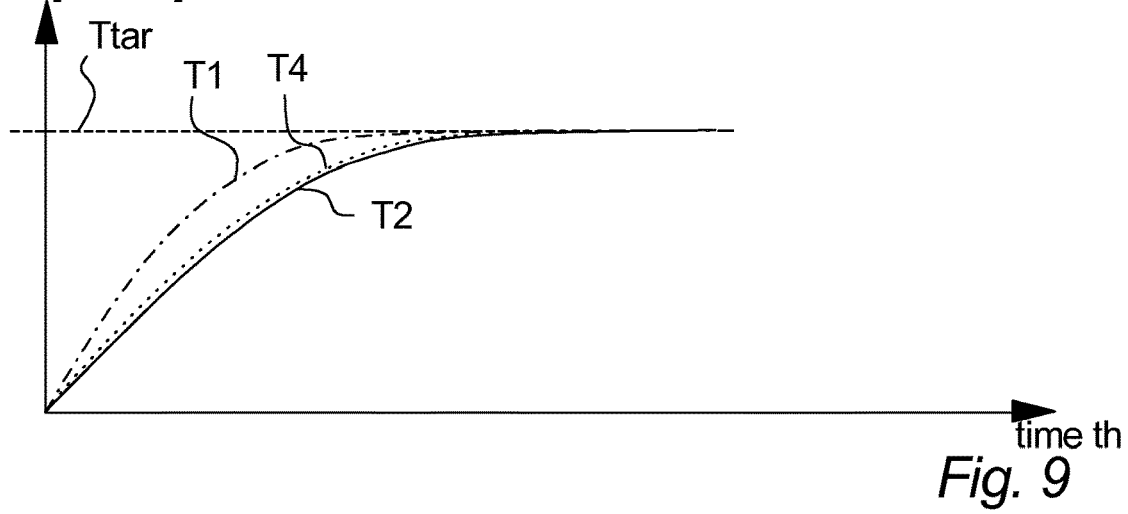

FIG. 9 illustrate a further an embodiment of the present disclosure where the first temperature T1 and the second temperature T2 are configured to follow different heating profiles. Here, the heating temperature T1 at the outwardly facing major surface 10b of the further sheet 3 is gradually increased. The heating temperature T2 subjected to the major surface 10a of the glass sheet of the unit 11 facing away from the further sheet 3 is gradually increased at a slower rate than the first heating temperature T1. The heating processes T1, T2 may here be started at substantially the same time, but due to the different heating slopes, the glass sheet temperature (T4—dotted line) of the glass sheet 11b will tend to follow the heat profile for the second temperature T2 due to that the further sheet 3 and the lamination layer need to be heated to heat the glass sheet 11b. The heating profile (solid line) for the second temperature T2 may in one or more embodiments of the present disclosure be adapted in order to follow the temperature change of glass sheet 11b, so that the glass sheets 11a, 11b does not vary too much towards the target temperature Ttar.

In FIGS. 8 and 9, the temperature of the glass sheet 11a may substantially follow the T2 heating profile.

Figure 10:
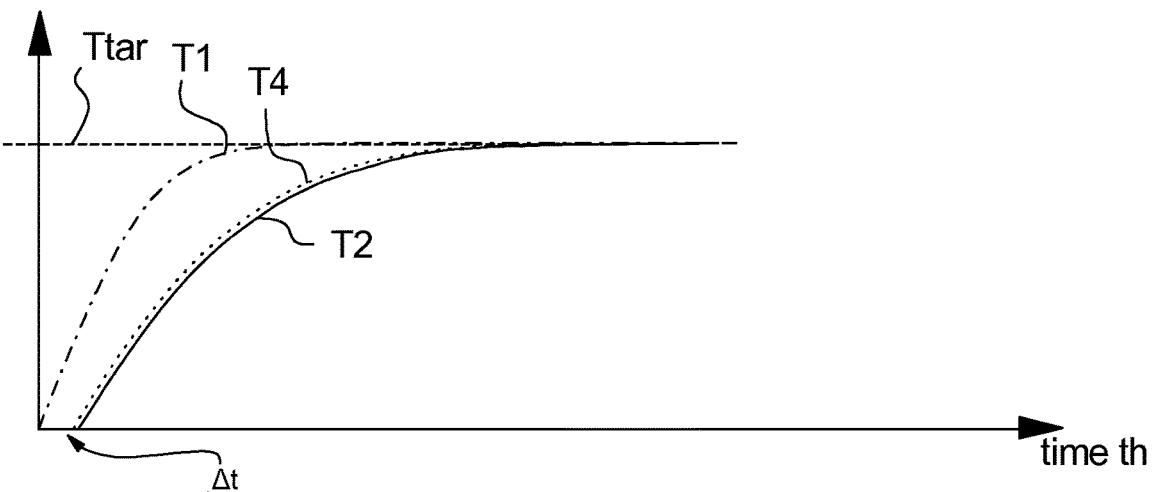

FIG. 10 illustrates an embodiment of the present disclosure where a combination of FIGS. 8 and 9 is disclosed where both a time delay is provided to the heating of the glass sheet 11a of the VIG unit and where the temperature T1 is raised on the further sheet 3 with a steeper slope than on the VIG unit glass sheet 11a having an outer surface facing away from the VIG gap 13 and the lamination layer 2.

Again, this may help to provide that the temperature T4 of the VIG glass sheet 11b facing the lamination layer is heated at a slope to which the heating temperature T2 is adapted.

FIG. 11 illustrates an embodiment of the present disclosure, where the temperature T1 end at a temperature above the desired target temperature Ttar for the lamination layer 2, e.g. as an overshot provide due to PD or PID regulation, so that the further sheet 3 may be subjected, at least in a short time span, to a temperature above the target temperature Ttar.

The temperature T2 of the sheet 11a however substantially follows the actual heating curve T4 of the glass sheet 11b provided due to the temperature T1.

FIG. 12 illustrates an embodiment of the present disclosure wherein the heating profile for temperature T1 provides a substantially constant temperature at the further sheet 3, e.g. as illustrated, at a temperature above the target temperature Ttar for the lamination layer 2. This provides the temperature raise as illustrated by T4 (dotted line) in the VIG glass sheet 11b proximate the lamination layer 2. The temperature T2 subjected to the VIG glass sheet 11a having a major surface facing away from the VIG gap 13 and the lamination layer 2 is regulated or in other ways adapted in order to substantially follow the T4 heating profile during the heating time th.

It is understood that the various embodiments described in relation to e.g. FIGS. 8-12 may provide a heating of the further sheet 3 and the VIG glass sheet 11a having a surface facing away from the VIG gap 13 and the lamination layer 2 which may be considered thermally asymmetric and/or thermal delayed due to the difference in T1 and T2, so that the temperature of the VIG unit glass sheets 11a, 11b may thereby be maintained at a desired temperature during the heating of the lamination layer and the resulting heating of the VIG glass sheet 11b proximate the lamination layer 2.

For example, the various embodiments described in relation to e.g. FIGS. 8-12 may help to provide an increased heat flux to the further sheet 3 and the lamination layer 2 compared to the heat flux provided to the VIG unit glass sheet 11a facing away from the further sheet 3, while avoiding a too large temperature difference between the glass sheets 11a, 11b during the lamination.

In one or more embodiments of the present disclosure, as e.g. illustrated in one or more of FIGS. 8-12, the heating T1 of the further sheet 3 and the heating T2 of the glass sheet 11a of the VIG unit facing away from the further sheet may follow different heating profiles.

In one or more embodiments of the present disclosure, as e.g. illustrated in one or more of FIGS. 8-12, the heating T1 of the further sheet 3 and the heating T4 of the glass sheet 11b facing the lamination layer follow different heating profiles, as a consequence of a heating of the further sheet 3 and the lamination layer 2.

FIG. 13 illustrates an embodiment of the present disclosure wherein an inflatable member 21 is inflated to provide the compression pressure F to the lamination assembly 10.

In FIG. 13, the clamping surface 4 pressing towards the lamination assembly 10 is provided directly by the inflatable member 21, but as illustrated in FIG. 13a, the inflatable member 21 may also be arranged to displace a further, e.g. heated, part comprising the surface 4.

The inflatable member 21 is inflated by a blower 22 such as a pump, controlled by a displacement controller 6a communicatively coupled to the blower 22, which inflates the member 21 based on control signals from the displacement controller 6a. The blower 22 may thus be considered a clamping body displacer which displaces the surface 4 pressing onto the lamination assembly.

The gas blown into the inflatable member may in one or more embodiments of the present disclosure be heated in order to provide a heating of the VIG unit glass sheet 10a. Also or alternatively, in one or more embodiments of the present disclosure (not illustrated) the inflatable member 21 may comprise a heating arrangement 9a embedded therein or at the member 21.

The blower 22 may in one or more embodiments of the present disclosure be configured to deflate the inflatable member after the lamination layer has been heated and the compression pressure F has been provided, to e.g. more rapidly move the member 21 away from the lamination assembly or to at least rapidly reduce the pressure to e.g. improve the manufacturing time. This may e.g. e provided by reversing a rotation direction of the blower. Alternatively, in one or more embodiments a suction unit (not illustrated) separate to blowing unit 22 may deflate the inflatable member 21.

The inflatable member in FIG. 13 may have a soft/flexible wall 21a that adapt to the surface 10a of the lamination assembly 10.

The inflatable member 21 is arranged between the lamination assembly 10 and a counter hold body 23, so that the counter hold body 23 provides a counter pressure ensuring that the inflatable member will provide the compression pressure to the lamination assembly when inflated rather than just expand away from the lamination assembly.

FIG. 13a illustrates schematically embodiments of the present disclosure wherein a rigid body 7 is provided between the inflatable member 21 and the lamination layer (see FIG. 13). The rigid body 7, such as a metal body as a plate or block, is displaced when the inflatable member 21 is inflated by the blower 22, and the rigid body comprises a clamping surface 4 acting directly or indirectly in the lamination assembly to provide the compression pressure F.

In further embodiments, a resilient layer 15 (not illustrated in FIG. 13a or 13) may be arranged between surface or surfaces 4, 5)

The rigid body 7 may in one or more embodiments of the present disclosure comprise a heating arrangement 9a as e.g. described above or below.

Also, a resilient layer may be arranged between surface 4 and/or 5 and a lamination assembly as e.g. previously described.

FIG. 14 illustrates schematically one or more embodiments of the present disclosure wherein the first heating arrangement 9a comprises a plurality of heaters, such as electrical heaters, controlled by control 19. The same applies for the second heating arrangement 9b. The controller 19 may control the plurality of the heaters in the first heating arrangement 9a individually or in groups, or all heaters 9a may be controlled simultaneously to provide the desired heating of the lamination assembly, e.g. based on feedback from a plurality of temperature sensors 24a (not illustrated).

Additionally, the controller 19 may control the plurality of the heaters 9b of the second heating arrangement 9b individually or in groups, or all heaters 9b may be controlled simultaneously to provide the desired heating of the lamination assembly at e.g. the further sheet 3 of a lamination assembly, e.g. based on feedback from a plurality of temperature sensors 24b (not illustrated). In other embodiments of the present disclosure, the heating arrangements 9a, 9b may only comprise one heater each distributed in, at or near the bodies 7, 8.

FIG. 15 illustrates schematically embodiments of the present disclosure, wherein a fluid such as a liquid heating medium, e.g. an oil, molten salt or the like are used as heaters in a heating arrangement 9a, 9b for heating the lamination assembly by heating surfaces 4, 5 of a body 7, 8.

The fluid are distributed from containers 26a, 26b containing the fluid heating medium 25a, 25b respectively. In FIG. 15, individual pumps 27a, 27b provides a circulation pf the heating medium 25a, 25b through a piping system 28a, 28b in the bodies 7, 8 thereby heating the bodies and thus surfaces 4, 5.

The fluid flow of heating medium 25a, 25b provided by the pumps 27a, 27b may in one or more embodiments of the present disclosure be regulated by the temperature controller 19 to control the Temperature T1, T2 as previously explained.

The heating medium 25a, 25b in the containers 26a, 26b may be heated to different temperatures in one or more embodiments of the present disclosure to e.g. obtain a different heating temperature of surface 5 and 4 respectively as e.g. previously described.

In one or more embodiments of the present disclosure which is/are not illustrated, both piping system 28a, 28b may be supplied from the same container with heating medium having the same temperature.

It is understood that the containers ma28a, 28b may each comprise a heater for heating the heating medium. In alternative or further embodiments (not illustrated), one or more heating medium heaters may be arranged to heat a fluid flow of heating medium 25a, 25b at a location in the supply line 29a, 29b between the containers 28a, 28b and the bodies 7, 8.

For both FIGS. 14 and 15, it is understood that the bodies 7, 8 comprising the surfaces 4, 5 in further embodiments may be configured to be displaced relative to each other by one or more clamping body displacers 6 (see e.g. previous description and figs.) so as to change the distance between the surfaces 4, 5 to provide a compression pressure F to a lamination assembly 10 arranged between the bodies 7, 8. The surfaces 4, 5 may thus both comprise heating and clamping surfaces.

FIGS. 16a-16b illustrates a lamination assembly before and after a lamination process according to embodiments of the present disclosure. In FIG. 16a, the glass sheet 11b of the VIG unit 11 facing the lamination layer support on the lamination layer. However, in the present example, the glass sheets 11a and 11b are tempered glass sheets such as thermally tempered glass sheets, having an uneven surface. Accordingly, not all of the major surface of the glass sheet 11b support sufficiently on the lamination layer.

When the compression pressure F is applied (see FIG. 16b) as e.g. previously explained in various embodiments of the present disclosure, the further sheet 3, such as an annealed glass sheet, and the glass sheet 11b are pressed towards each other, and as the lamination layer 2 is heated and thus softened, the surface of glass sheet 11b is forced into the lamination layer so that the lamination layer take up/absorb possible surface variations in the major surface of the tempered glass sheet facing lamination layer.

Crests of the tempered glass sheet 11b may thus be pushed into the softened lamination layer 2 and force it towards nearby troughs/depressions in the lamination layer 2 (see dotted arrows). This may in one or more aspects of the present disclosure be provided while an evacuation is provided to the lamination assembly to remove gas between the lamination layer 2 and the further sheet 3 and/or the VIG glass sheet 11b, see e.g. FIG. 6 and the description thereto.

FIG. 17a illustrates schematically a cross sectional view of a laminated VIG unit 200 according to embodiments of the present disclosure. The lamination layer 2 is arranged proximate/near the major surface of the glass sheet 11b of the VIG unit, This glass sheet 11b comprises comprising a gap evacuation opening 30 that has been used for evacuating the gap 13, and the gap evacuation opening 30 has been sealed by an evacuation opening seal 31, e.g. comprising a low melting point solder glass material, but it may also be another kind of seal, e.g. a metal seal, that has been heated in an evacuation cup (not illustrated) used for evacuating the gap 13 by covering and evacuating the gap 13.

In FIG. 17a, the sealed gap evacuation opening 30 and the evacuation opening seal 31 is covered by the lamination layer 2, so that the evacuation opening seal 31 extend into the lamination layer 2. This may have been provided by means of e.g. applying the compression pressure as e.g. described above.

FIG. 17b illustrates schematically a cross sectional view of a laminated VIG unit 200 according to embodiments of the present disclosure. Here, no lamination layer is present to cover the evacuation opening seal 31. This may e.g. be provided by utilizing a lamination layer where a part has been removed at the location of the evacuation opening 30 to provide space for the seal 31.

FIG. 17c illustrates schematically a cross sectional view of a laminated VIG unit 200 according to embodiments of the present disclosure. Here, no lamination layer 2 is present to cover the evacuation opening seal 31. Moreover, the further sheet 3 comprises a cut-out/recess or hole (as illustrated) at the location of the gap evacuation opening 13. The seal 31 may in one or more embodiments of the present disclosure extend into the opening 32 in the cut-out/recess or hole in the further sheet 3. However, in other embodiments the hole/opening 32 may be present but the seal 31 may not extend into the cut-out/recess or hole 32.

FIG. 17d, illustrates schematically a cross sectional view of a laminated VIG unit 200 according to embodiments of the present disclosure, where the hole 30 has a stepped configuration, and the seal 31 is placed in the stepped part of the evacuation hole 30, so it does not extend over a plane defined by the surface of the glass sheet 11b facing the lamination layer. Here, the lamination layer 2 and further sheet 3 cover the seal 31. In further embodiments of the present disclosure, the lamination layer 2 and/or further sheet 3 may however not cover the evacuation hole 30, e.g. as illustrated in FIGS. 17b and/or 17c. In still further embodiments of the present disclosure, the seal 31 in the stepped hole may however extend over a plane defined by the surface of the glass sheet 11b facing the lamination layer, e.g. as illustrated in FIGS. 17a, 17b and/or 17c.

FIG. 18, illustrates schematically a cross sectional view of a laminated VIG unit 200 according to embodiments of the present disclosure. The glass sheets 11a, 11b of the VIG unit enclosing the gap 13 are in the present example thermally tempered glass sheets, and having a rather uneven major surface such as e.g. varying in the range of e.g. up to 0.1 mm. This may have been caused by the manufacturing of the thermally tempered glass sheets. The thickness th1 of the lamination layer 2 varies in accordance with the surface variation of the thermally tempered glass sheet 11b abutting the lamination layer 2, and may thus have a thickness th1 between the glass sheet 11b and further sheet 3 which is between 0.25 mm and 3 mm, such as between 0.4 mm and 2.7 mm, e.g. between 0.7 mm and 2.4 mm, but varying across the surface.

The lamination layer thickness th1 may in one or more embodiments vary VAR1 with at least 0.1 mm such as at least 0.2 mm, e.g. at least 0.3 mm between the further sheet 3 and the VIG unit 11 across the major surface of the VIG unit, dependent on the surface variation of the thermally tempered glass sheet 11b.

The variation VAR1 may e.g. in one or more embodiments of the present disclosure be up to 0.6 mm between peak/crest to valley/though, e.g. the variation VAR1 may be between 0.2 mm and 0.5 mm from peak to valley.

The further sheet 3 is may be a glass sheet such as an annealed glass sheet which may suffer from far less surface variations, but it may also in other embodiment be a thermally tempered glass sheet.

The variation VAR1 may be estimated or measured between selected neighbouring crests/peaks and thoughs/vallys of the surface of the glass sheet 11b as illustrated, or e.g. estimated or measured from highest crest and the lowest though determined/selected, or another though, selected "globally" on the glass sheet 11b surface.

FIG. 19 illustrates schematically embodiments of the present disclosure where the lamination assembly 10 is arranged in a flexible vacuum enclosure 18 such as a flexible sheet/bag that cover the lamination assembly 10 in an air-tight way and which can be evacuated to press onto the lamination assembly 10 and remove gas remains between the further sheet 3 and the VIG unit 11. This evacuation is provided by a pump 18a arranged in fluid communication 18b (e.g. a tube/pipe or the like) with the interior of the vacuum enclosure 18.

The VIG assembly 2 is arranged in a pressure chamber 40 enclosed by walls 40a which can be pressurized by a pump 41 in fluid communication 42 with the pressure chamber 40. When pressurizing the pressure chamber 40 by the pump 41, this provides a compression pressure F to force the VIG unit and the further sheet towards each other. The remaining part of the compression pressure may be provided by means of the pump 18a and the vacuum enclosure 18.

FIG. 20 illustrates a flow chart according to various embodiments of the present disclosure, e.g. as disclosed in relation to various embodiments described above.

In the first step S201, the lamination assembly 10 is provided, and arranged in a vacuum enclosure such as a bag or an evacuation chamber. Then the evacuation is provided in step S202, and the compression pressure is provided in step S203. Then the heating is provided in step 204 to heat the lamination layer 2 to soften it so that the compression pressure forces the glass sheets 11b, 3 towards each other. After this, the compression pressure is released in step S205, the lamination assembly 2 is removed again, and a new lamination assembly may be provided for the lamination process. It is understood that step S204 in further embodiments of the present disclosure may be started before a compression pressure above 1 atm. is applied.

FIG. 21 illustrates schematically a building 80 seen from the outside/exterior, comprising apertures 81 for windows 82 and a door 83 in the outer wall 84 of the building 80. The building also comprises a roof structure 85 comprising a roof window 82a.

The apertures 81 are covered by one or more laminated VIG units 200 manufactured in accordance with one or more of the embodiments of the present disclosure. The VIG units 200 are placed in a frame 71, and the frame 71 is then attached by fastening parts (not illustrated) such as mechanical fastening parts in the form of one or more hinges, screws, nails, mounting and/or the like to the wall 84 or a part of the roof structure 85 dependent on the aperture covering type (e.g. a roof window 82a.

Generally, it is to be understood that the glass sheets described in this document and used for VIG assemblies/units may in one or more embodiments be transparent to light such as light having a wavelength in the range of about 400 nm to 700 nm to at least such a degree which enables humans to see through the glass sheets of the VIG unit. Also the glass sheets may be configured so that infrared light (about 700 nm to 1 mm) is transmitted through the glass sheet, or reflected.

One or more of the glass sheets may e.g. comprise a low-E coating for improving the U-value of the VIG. The low E coating may be arranged at a major surface of one of the glass sheets 11a, 11b, and faces the gap 13 between the glass sheets.

In further embodiments of the present disclosure, the VIG units manufactured in accordance with one or more of the embodiments described in this document may be used for e.g. refrigerator units or ovens such as conventional household ovens as e.g. windows allowing viewing into the interior of such appliances.

FIG. 22 illustrates schematically a lamination process according to embodiments of the present disclosure,
  where the space between the further sheet 3 and the VIG glass sheet 11b facing the lamination layer 2 is evacuated (see dashed line 52) by a vacuum pump to remove gas between these 3, 11b,
  Where mechanical pressure (dash-dotted line 51) is applied to provide further pressure/compression on the glass sheet, and
  where a heating (dotted line 53) is provided to soften the lamination layer 2.

The heating provides a temperature increase (solid line 50) in the interface between the lamination layer 2 and the VIG glass sheet 11b proximate the lamination layer 2, thereby heating the VIG glass sheet 11b.

It is generally understood that the values indicated in FIG. 22 are only examples according to embodiments of the present disclosure, and that e.g. other temperatures and/or pressure values may be selected in further embodiments of the present disclosure.

For example, the temperature to which the lamination layer is heated may in one or more embodiments of the present disclosure be in one of the ranges mentioned in relation to FIG. 7, for example, in one or more embodiments, between 90° C. and 110° C., such as between 95° C. and 105° C.

In the illustrated example, the VIG assembly is placed before time t1.

At time t1, the heating of the lamination layer is started.

At t2, the evacuation pump is started and this evacuates the space between the further sheet 3 and the VIG unit glass sheet 11b facing the lamination layer 2 as illustrated by dashed line 52. As can be seen, the evacuation of the space between the further sheet 3 and the VIG glass sheet 11b is provided between time t2 and time t3.

The heating provided to heat the further sheet 3 and thereby the lamination layer 2 is in the illustrated example kept substantially constant (see dotted line 53), but in further embodiments it may be controlled to vary according to a predetermined heating profile between t1 and t5. The heating 53 may in the present example be provided by heated clamping surface 5, which may be provided according to various embodiments explained above or below in the present disclosure.

The temperature at the VIG unit glass sheet 11a facing away from the lamination layer may be kept at the same temperature as the heating 53, but it may in further embodiments e.g. be kept lower or in other ways controlled, e.g. as explained in above, for example in relation to one or more of FIGS. 7-12.

At time t3, the mechanically applied compression pressure is applied (dashed-dotted line), after the space between further sheet and VIG unit is sufficiently evacuated.

It is understood that in further embodiments, the mechanical compression pressure may be applied even before the indicated time t3 in FIG. 22, e.g. as illustrated in FIG. 24, where the pressure 51 is applied while the evacuation pump still reduces the pressure in the space between further sheet 3 and VIG unit 11 to evacuate gas. This may e.g. help to evacuate the space between the further sheet 3 and the VIG glass sheet 11b faster and/or more efficiently.

As can be seen in the example of FIG. 22, the heating of the lamination layer 2 gradually increases substantially from time t1 to the target temperature Ttar.

At t4, the applied compression pressure 51 is removed or reduced again, but the temperature 50 may continue to increase after the mechanical compression is removed or reduced at t4, e.g. as the further sheet 3 may continue to heat the lamination layer 2, e.g. as the lamination assembly still may support on the heating surface. At time t5, the vacuum is removed again, and the VIG assembly is removed at t6 to cool the lamination layer 2, e.g. by natural cooling or in a cooling compartment/chamber where the temperature is controlled to provide a cooling.

It is understood that t6, where the lamination assembly is removed, in further embodiments may be adjusted/moved dependent on e.g. the desired temperature for the lamination layer 2, the heating temperature 53 and/or the like.

In one or more embodiments of the present disclosure, the lamination process from start of the heating of the further sheet (t1) to the end where the lamination assembly is removed again (t6) may take between 5 and 30 minutes, such as between 10 and 15 minutes. This may however depend on or be adjusted dependent on the heating temperature 53 for the lamination layer 2, the desired target temperature Ttar for the lamination layer and/or the time (t3 to t4) the compression pressure is applied.

FIG. 23 illustrates schematically a lamination process according to embodiments of the present disclosure, where the lines 50-53 indicates the same parameters as in FIG. 22. The lamination assembly is placed at time t1. The heating of the lamination layer 2 by heating the further sheet 3 is however delayed in time (starting at time t2a) compared to the start of the evacuation (starting at time t2) of the space between the further sheet 3 and the VIG glass sheet 11b facing the lamination layer 2 by an evacuation pump and/or by the mechanical pressure as e.g. previously described.

The time delay between time t2 where the evacuation is started, and time t2a where the heating is started, may e.g. be adjusted/adapted so that the heating does not cause sealing of the lamination layer at the edges so that remaining gas in the space between the further sheet 3 and the VIG glass sheet 11b facing the lamination layer 2 cannot leave before the desired evacuation in the space between the further sheet 3 and the VIG unit has been obtained by the a vacuum pump and/or a further mechanical pressure as e.g. described in various embodiments above.

In further embodiments of the present disclosure, the heating may be provided from the start as e.g. illustrated in FIGS. 22 and 24, and may be timed with the evacuation speed, e.g. by selecting a properly sized evacuation pump and/or by controlling the heating speed, to avoid a that the sealing of the lamination layer 2 at the edges is caused too soon.

FIG. 25 illustrates schematically one or more embodiments of the present disclosure, substantially similar to the embodiments of FIG. 13a. However, the rigid body 7 and the inflatable member 21 for displacing the body 7 are here arranged below the lamination assembly 10 so that the lamination assembly support on the displaceable (and e.g. also heated) body 7. The body 7 and the lamination assembly 10 are thus displaced upwards when the member 21 is inflated, thereby providing the compression pressure F. When the compression pressure is released by e.g. stopping the blower 22 and e.g. opening a valve (not illustrated), and/or by reversing the blower 22, the rigid body 7 and the lamination assembly 10 automatically help to deflate the member 21 due to the weight of these and due to gravity.

FIG. 26 illustrates a further embodiment of the present disclosure where the further sheet 3 and lamination layer 2 are arranged on top of the VIG unit 11, facing VIG unit glass sheet 11b, and the compression pressure is applied by surfaces 4, 5 while the lamination assembly 10 is arranged in this way, e.g. in accordance with one or more of the embodiments described above. In further embodiments, as illustrated in a plurality of the figures previously described, the VIG unit 11 may in one or more embodiments of the present disclosure be arranged on top of the further sheet 2 and lamination layer 3 so that the VIG unit 11 provides a pressure on the lamination sheet 2 due to gravity. FIGS. 27 and 27a illustrates an embodiment of the present disclosure, where resilient layers 15a, 15b are used at both sides of a VIG assembly 10 during a lamination cycle where a compression pressure is applied between clamping bodies 6, 7 by clamping body displacers 6.

It is generally understood that the resilient layers 15a, 15b may have different thicknesses (see FIG. 27a). In embodiments of the present disclosure, the resilient layer 15a arranged at the major outer surface 10b where the further glass sheet 3 is placed may be thinner than the resilient layer 15b placed at the major outer surface 10a of the unlaminated side of the lamination assembly 10. In one or more embodiments, the thickness of the resilient layer 15b arranged at/proximate the surface 10b may be between 2 mm and 6 mm, such as between 2 mm and 4 mm e.g. obtained by a single or a plurality of layered mats. The thickness of the layer 15a arranged at/proximate the surface 10a may be between 4 mm and 10 mm, such as between 6 mm and 10 mm, e.g. about 8 mm obtained from for example layered mats such as a 3 mm and 5 mm resilient, elastic silicone mat. It is understood that any other suitable material for the mats 15 may be provided, and it may also be a combination of materials such as e.g. a fabric and silicone sheet combination.

FIG. 27a illustrates a further embodiment of the present disclosure (where the body 7 has been refracted from the lamination assembly), where a transportation arrangement 16 such as a conveyer belt or the like is placed between the lamination assembly 10 and the lower heating body 8 as previously explained. The resilient layer 15b is in FIG. 27a placed on this transportation arrangement 16 between the transportation arrangement 16 and the lamination assembly 10. In other embodiments, the resilient layer 15b may however be arranged between the transportation arrangement 16 and the lower body 8, and may be reused for several consecutive heating steps to heat a plurality of lamination assemblies without intermediate removal of the layer 15b, and the transportation arrangement may hence move relative to this resilient layer. A further low friction layer may in further embodiments of the present disclosure be provided between the resilient layer 15b and the transportation arrangement 16 so as to ease the sliding of the transportation arrangement 16 over the resilient layer 15b.

FIG. 27a illustrates a further embodiment of the present disclosure, wherein the upper resilient layer 15a is retained by a flexible retainer 16a such as a belt or the like, between the lamination assembly 10 and the resilient layer 15a. The retainer 16a can be displaced by the clamping body 7 when lowered towards the major surface 10a. This may e.g. provide easier adaption and/or replacement of the resilient layer 15a and may provide an advantageous way of reusing the layer 15a for several consecutive heating steps applied for different lamination assemblies. In other, further embodiments, the resilient layer 15a may be attached to the body 7, and the retaining top belt 16a may be omitted, or it may be a loose sheet of material (as may the layer 15a) arranged at the lamination assembly 10 before it enters in between the bodies 7, 8.

In still further embodiments of the present disclosure, as e.g. illustrated in FIG. 27a, a sheet 16b with an open air-permable structure, such as a flexible mesh, fabric or perforated sheet, may be provided between the upper surface 10a and the body 7, such as between the upper surface 10a of the lamination assembly and the top belt 16a (as illustrated), or between the upper surface 10a of the lamination assembly and the resilient layer/member 15a. The sheet 16b with an open air-permable structure 16b may e.g. be a synthetic fluoropolymer mesh of a tetrafluoroethylene such as a PTFE (Polytetrafluoroethylene) sheet, but other materials may also be used. This sheet 16b may help to avoid or reduce the risk of the lamination assembly 10 sticking to the top body 7, e.g. due to a suction cup effect, and is lifted by this from the bottom body 8 when the distance between the heating bodies 7,8 is increased again after the heating operation where the clamping of the lamination assembly between the bodies 7, 8 is provided.

FIG. 27b illustrates a still further embodiment illustrates an embodiment of the present disclosure where different compression pressure settings are applied dependent on VIG unit assembly type. A lamination system 100 for laminating VIG units by a heating and compression step by means by clamping bodies 7,8 as e.g. previously described, is used. The VIG unit is placed between the clamping bodies 7, 8. These bodies may be part of a clamping assembly also comprising one or more resilient layers (15, 15a, 15b), meshes 16b and/or the like as previously described. As may the system 100 comprise a transportation arrangement 16 and/or a further belt/sheet 16b as described above. These are however not illustrated in FIG. 27b.

In FIG. 27b, the mechanical clamping body displacer(s) 6, such as linear actuators or the like is/are controlled by a displacement control arrangement 6a communicatively coupled to the one or more clamping body displacer(s) 6. This control arrangement 6a comprises control circuitry which is configured to control the distance between surfaces 4,5 of the bodies 7, 8.

In order not to either damage the lamination assembly (e.g. by providing cracks on the VIG unit's glass sheets or the lamination glass 3 or by compressing the support structures arranged in the evacuated gap of the VIG unit), and in order to at the same time provide a sufficient lamination, the system 100 is configured to adapt the compression pressure applied to the lamination assembly by means of the bodies 7,8 and the one or more clamping body displacers 6 based on a plurality of Pressure presets PRS_1-PRS_n stored in a data storage. As the system 100 may in embodiments of the present disclosure be configured to be used for laminating different sizes of VIG units, the pressure applied by the clamping body displacers 6 may be adapted to the size of VIG unit to be used. This may e.g. at least be based on the Length×Width measure of the VIG unit 11. Other factors such as the type of VIG unit (for example if it is a two layer VIG with one evacuated gap, a three layer VIG comprising two evacuated gaps, a hybrid VIG comprising an evacuated gap between a first and second glass sheet and a gas filled gap between a further glass sheet and one of the first and second glass sheets) may also result in different preset compression pressure values PRS_1-PRS_n.

The preset compression pressure values PRS_1-PRS_n are stored in a data storage DS. A user may hence, by means of a user interface UI, enter or select lamination assembly information such as VIG unit type information TY1n-TYn, such as a length×width size, select a predefined VIG unit type selectable by the interface UI and/or the like.

Based on the entered information, the control arrangement 100 selects a suitable pressure setting PRS1-PRSn stored in the data storage, and assures that this setting is applied by transmitting control signals to the clamping body displacer(s) 6 by means of control signal output OU, preferably while monitoring the clamping pressure applied by received input PRES STAT.

The pressure settings PRS1-PRSn to be applied may in embodiments of the present disclosure be selected or calculated so that a compression pressure between 1.5 and 3.5 Newton/cm$^2$, for example between 2 and 3 Newton/cm$^2$, such as between 2.4 and 2.8 Newton/cm$^2$ is applied, and this may be controlled by selecting or calculating a pressure setting PRS1-PRSn corresponding to the VIG unit type such as a VIG size defined by a surface 10a, 10b area.

In further embodiments of the present disclosure a sensor arrangement for determining lamination assembly information may be used (not illustrated). This may e.g. comprise a barcode reader (e.g for matrix barcodes or conventional barcodes), an RFID reader or the like for automatically reading Identification Information (not illustrated) of the lamination assembly 10, e.g. by reading a VIG unit identifier on the VIG unit or on the lamination glass sheet 3, or placed between the lamination glass sheet 3 and the VIG unit 11. The sensor arrangement may e.g. in embodiments of the present disclosure be placed to read identification information on lamination assemblies arranged at a transport member (not illustrated in FIG. 27b, see e.g. FIG. 5) prior to entering in between the clamping bodies. Based on this information, the control arrangement 6a may retrieve relevant information from a data storage, e.g. the data storage DS relating to e type TY1n-TYn of VIG unit. Also/or alternatively, the sensor arrangement may be used for measuring the surface area if the VIG unit assembly, e.g. the area of the surface 10a as illustrated in other figures described above. Based on this retrieved information, the arrangement 6a such as the controller CT may calculate or select a compression pressure setting to be applied during the heating step for the respective lamination assembly type TY1n-TYn.

In still further embodiments of the present disclosure, the control arrangement 6a may, instead of selecting presets PRS1-PRSn, be configured to calculate a pressure setting. This may be provided each time a user provides one or more new selections by means of the User Interface UI, and/or when/if a sensor arrangement provides new lamination assembly information as mentioned above. The controller CT may hence provide a clamping pressure calculation having e.g. at least a predefined constant and a variable such as the VIG unit size information (such as length and width) as calculation parameters.

FIG. 28 illustrates schematically an embodiment of the present disclosure, where the heated lamination assembly 10 is subjected to a forced cooling step. The cooling step cools the lamination layer 2 to harden the lamination layer 2 after a heating step provided according to e.g. one or more embodiments described above, for example by means of a "heat and clamp" solution where clamping bodies 4, 5 are used to provide a compression pressure F during heating and softening of the lamination layer 2 as disclosed in relation to one or more of the figures described above.

The heated lamination assembly 10 enters a cooling chamber 300 enclosed by walls 301 through an inlet 302a by means of a transport system 16 such as a conveyer. The conveyer 16 may in embodiments of the present disclosure be the same, or be arranged in continuation of a transport solution 16 used during the heating step. See e.g. FIG. 5. While the heated lamination assembly 10 is placed in the chamber/compartment 300, it is subjected to a forced cooling provided by means of a cooling system 350. The cooling system 350 in FIG. 28 is configured to provide a convection cooling by means of a convection cooling arrangement 320, and a conduction cooling by means of a conduction cooling arrangement 310 respectively.

The lamination glass sheet 3 of the lamination assembly 10 supports on a surface 311 of the conduction cooling arrangement 310 to provide a heat transfer from the lamination glass sheet 3 to the conduction cooling arrangement 310, in the present example through the transport system 16 (but this 16 may be omitted in further embodiments). Hence, heat is transferred from the lamination layer 2, through the lamination glass sheet 3, and thus from the outer surface 10b of the lamination assembly 10 to the conduction cooling arrangement 310, thereby cooling the lamination layer 2 to harden the lamination layer 2.

The conduction cooling arrangement 310 provides a forced flow of a cooling fluid 310 such as a gas or a liquid, such as water, oil or another suitable cooling liquid inside guiding tunnels or pipes 313 for guiding the cooling fluid 312 arranged or embedded in a cooling body 314 such as a metal body, e.g. an aluminium, brass or copper body 314. The cooling fluid 312 is circulated in the guiding tunnels/pipes 313 by means of a pump or a blowing unit (not illustrated in FIG. 28), hence transferring the heat from the lamination assembly 10 away from the lamination assembly 10 and cooling body 314, e.g. to a cooling device configured to reduce the temperature of the returned cooling fluid 312 before it re-enters the tunnels/pipes 313.

The convection cooling arrangement 320 comprises a ventilation system 321 for moving the ambient gas such as air over the other outer surface 10a of the lamination assembly, to cool this surface 10a. This gas may in embodiments of the present disclosure be heated to a desired, higher temperature by use of a heating arrangement and/or or reduced in temperature by a cooling arrangement.

In embodiments of the present disclosure, the cooling step may be provided until the lamination layer 2 reaches a temperature where it is hardened again after the heating step. This temperature may vary dependent on the selected material for the lamination layer. In embodiments, the cooling step may be considered finished when the lamination layer 3 has a temperature below 95° C., such as around 90° C., or such as around 85° C.

Naturally, further forced cooling may be provided in the chamber 300 or at another location in order to e.g. fast get the lamination assembly's temperature to a point where it may be more easy, cost efficient and/or safe to handle by human hands or by automation system components. Such components may e.g. comprise robotic equipment utilizing e.g. suction cups or the like for handling and rearranging the cooled lamination assembly that now constitutes a laminated VIG unit.

The VIG unit 11 may thermally deflect if it is subjected to a temperature difference between the glass sheets 11a, 11b due to a rigid edge seal between the glass sheets. According to embodiments of the present disclosure, it may hence be relevant to provide the cooling of the sheet 3 and the glass sheet 11a in order to obtain a desired deflection condition of the VIG unit at the point where the lamination layer 2 hardens, to provide a more controlled stress condition in the final laminated VIG unit. This may e.g. be controlled by providing a controlled cooling temperature at the conduction cooling system 210, and by the convection cooling system 320, to control the thermal deflection of the VIG unit around/in a desired temperature range that may be selected based on the viscosity profile (e.g. given by a Tg (T glazing) of the lamination material 2.

It is generally understood that the difference in temperature between the VIG unit's glass sheets 11a, 11b may preferably be kept below 65° C., such as below 45° C., for example below 20° C., for example below 10° C. by means of said cooling system 350 during at least 50% such as at least 70%, e.g. at least 90% of the time of said cooling step. This may e.g. be provided so that the difference in temperature between said at least two glass sheets (11a, 11b) of the vacuum insulated glass unit is kept below 45° C., such as below 20° C., for example below 10° C. by means of the cooling system 350, at least during the last 50%, such as during the last 25%, such as during the last 10% or last 5% of said cooling step by means of said cooling system before the lamination layer hardens.

The cooling system 350 may be configured so that the conduction cooling system 310 in embodiments of the present disclosure forces a larger heat transfer per time unit from the outer major surface 10b (the lamination side) of the lamination assembly 10, when compared to the heat transfer per time unit provided from the oppositely directed outer major surface 10a (unlaminated side) of the lamination assembly 10 subjected to the convection cooling by the convection cooling system 320.

In one or more aspects of the present disclosure, the total time from the heating step to soften the lamination layer 2 to bond it to the VIG unit 11 and the further sheet 3 as e.g. described previously, is initiated, and to the cooling step by means of the cooling system 350 is terminated and the lamination layer 2 is thus hardened again, may be less than 60 minutes, such as less than 40 minutes, for example less than 25 minutes.

It is generally understood that the cooling may be provided as a batch process in the chamber 300 or a substantially continuous process where multiple lamination assemblies are moved through the chamber 300, e.g. in a row on the transport system 16.

The now cooled lamination assembly 10 then leaves the cooling chamber 300 through an outlet 302a by means of the transport system 16.

FIG. 29 illustrates schematically a cooling step by means of a cooling system 350 according to further embodiments of the present disclosure, where convection cooling is provided at both outwardly facing major surfaces 10a 10b of the lamination assembly 10. A temperature controlled cooling gas 323a is supplied a plurality of gas nozzles/outlets 322, so as to cool the upwardly facing major surface 10a of the lamination assembly 11. In further embodiments, the plurality of nozzles may be omitted and a more indirect flow of gas 323a may be provided, e.g. by circulating the gas in the chamber 300. In the present case, the exposed surface 10a of the lamination assembly 10 facing upwards is the major outer surface 11a of the un-laminated side of the lamination assembly, and may thus be the outermost surface of the glass sheet 11a of the VIG unit.

The temperature controlled cooling gas is temperature controlled in the sense that temperature regulating circuitry may control a heater or a cooler in order to get the cooling gas to have a desired temperature, e.g. based on input from a temperature measurement sensor. The same may apply if using a liquid in a conduction cooling system.

The gas 323a is supplied through gas nozzles 322 distributed along the length of the cooling chamber 300, so as to blow and distribute cooling gas 323a to the surface 10a to cool the surface.

The lamination glass sheet 3 supports on a gas-permeable, perforated conveyer belt 16, and cooling gas 323b is supplied to the outer major surface 10b of the lamination glass sheet through a plurality of nozzles 324. The temperature and/or the amount of gas 323a, 323b supplied per time unit through the nozzles 322 and 324 respectively may be different in embodiments of the present disclosure. This may e.g. be set/adjusted so as to provide a faster cooling/heat transfer per time unit of the surface 10b compared to the cooling per time unit surface 10a during at least a part of the cooling step in the chamber 300. This may e.g. be achieved by providing a larger flow of gas 323b to the surface 10b of the lamination glass to cool the lamination layer 2, compared to the flow of gas 323b provided to surface 10a.

FIG. 30 illustrates schematically an embodiment of the present disclosure, where the cooling step is provided by mainly providing a convection cooling by the cooling system 350 to the lamination glass sheet 3 by means of a flow of cooling gas 323b directed towards this surface 10b. Some of the cooling gas reaches the surface 10b through a gas permeable conveyer arrangement 16. This gas cools the glass sheet's surface 3, and thereby the lamination layer 2. Some of this cooling gas is subsequently distributed to the other major surface 10a, hence also cooling this surface of the lamination assembly 10.

It is generally to be understood that a ventilator/blowing arrangement 321 may generate the flow of cooling gas 323b, and that a suitable heater or cooler 325 may control the temperature of the supplied gas 323b.

FIG. 31 illustrates schematically an embodiment of the present disclosure, where the cooling step is provided by means of conduction cooling as e.g. disclosed in relation to FIG. 28 to lower the temperature of the lamination glass sheet 3 and hence the lamination layer 2.

The conduction cooling is provided by means of a fluid such as a liquid circulated in a tube/tunnel arrangement 313 by means of a pump 341 or a blowing unit (not illustrated in FIG. 28). This cools the cooling body 314 and hence reduces the temperature of the lamination glass 3.

The pump/flow generator 341 supplies the cooling fluid into the tunnel arrangement 313 of the body 314. When the fluid leaves the cooling body, it is returned in a guiding pipe 315 to a cooling arrangement 342 which reduces the temperature of the cooling fluid before the fluid is reintroduced into the cooling body. The pump may be controlled by the cooling controller 340, and may operate substantially continuously during the cooling process. The cooling arrangement 342 may be controlled by the cooling controller during the cooling step in order to control and regulate the temperature of the cooling fluid provided to the cooling body 314. This regulation may be provided to obtain a substantially continuous fixed temperature of the cooling fluid within a relatively narrow temperature variation range, such as within +10° C., for example within ±5° C. relative to a target temperature. Alternatively, the temperature of the recirculating cooling fluid may be adjusted over time in order to control the speed of the cooling at different time points during the cooling step. This regulation may in further embodiments of the present disclosure be provided by the cooling controller 340 based on feedback from one or more temperature sensors (not illustrated) such as thermocouples or the like measuring the temperature of the fluid and/or the cooling body at or near the surface providing the cooling of the lamination assembly.

As can be seen, an active, controlled cooling of the surface 10a facing away from the lamination layer of the cooling body the cooling controller 340 may be provided by means of convection cooling as previously described. Here, the cooling controller 340 may control a ventilation/blowing arrangement 321 in order to increase or reduce the amount of cooling gas such as air provided per time unit. Additionally, the cooling controller 340 may provide a temperature control of the cooling gas by means of a gas temperature regulation unit such as a gas heater or cooler 325 which controls the temperature of the supplied cooling gas 325b. This temperature may be based on sensor feedback (not illustrated).

It is generally understood that the cooling of the first 10a and/or second surface 10b of the lamination assembly may be controlled by the same or different cooling controllers 340. The control may comprise a closed loop control circuitry such as a PD (proportional-derivative controller) or PID (proportional-integral-derivative controller), or any other suitable type of closed loop control circuitry configured to control the heating of the surfaces 10a, 10b respectively to the different temperatures. Alternatively, the control may be less advanced and e.g. rely on an on/off control including temperature hysteresis control, based on pre-set, fixed temperatures of the cooling gas or liquid and/or amount of gas or liquid supplied, so as to cool the outer major surfaces 10a, 10b.

FIG. 32 illustrates schematically a graph according to embodiments of a cooling step provided by means of the cooling system 350, according to embodiments of the present disclosure. The dash/dotted line L1 represents the temperature of the laminated glass sheet 11b of the VIG unit. It is in the figure, for simplicity, assumed/estimated that the temperature (T) of the laminated glass 11b of the VIG unit 11 is substantially the same as the lamination layer 2 temperature. The solid line L2 represents the temperature of the un-laminated glass sheet 11b of the VIG unit. The Y-axis denoted (T) represents a temperature in e.g. ° C., and the x-axis denoted tc represents the time elapsed time during the cooling step.

At the time t0, the cooling step is initiated by the cooling system. The laminated side of the VIG unit where the lamination layer 2 and the lamination sheet 3 is placed has a higher thermal capacity/heat capacity than the other, un-laminated side of the VIG unit. Accordingly, reducing the temperature of the laminated side of the VIG unit to cool the lamination layer requires more heat transferred from this side, compared to the cooling of the other un-laminated side, to reach the same target temperature Tta.

As can be seen, the temperature of the un-laminated glass sheet 11a (L2) may relatively fast be reduced to be within a desired temperature hysteresis (defined between the dashed, horizontal hysteresis lines H1, H2) set based on a target temperature Tta (dotted horizontal line) of the lamination layer 2. See time tc1 where the temperature of the unlaminated glass sheet L2 reaches within the hysteresis at t1. For example, in embodiments of the present disclosure, a convection cooling arrangement may be set to a temperature around this target temperature Tta, so that the cooling gas is kept at that temperature, and keep it there, at least until the lamination layer 2 reaches within the same temperature range given by the hysteresis H1, H2.

It is generally understood that the target temperature Tta may be selected based on the viscosity characteristics of the lamination material and/or the desired end temperature of the lamination assembly. The target temperature Tta may e.g. be set based on a temperature around which the lamination layer 2 may be determined to be sufficiently hardened so that subsequent thermal deflection of the laminated VIG does not affect the lamination, at least within a selected temperature range.

Since a larger amount of heat needs to be transferred away from the laminated side of the VIG unit due to the higher heat capacity, to reach the same temperature within the target temperature Tta based hysteresis H1, H2, it may take a longer time to reach this temperature hysteresis, see L1. Eventually, it will reach a temperature within the hysteresis H1, H2, (see tc2) and here, the lamination layer may be sufficiently hard.

In further embodiments of the present disclosure, the time from tc0 and until tc2 for the lamination layer 2 to reach within the hysteresis H1, H2 may be reduced by forcing a larger heat transfer per time unit from the laminated side 10b, when compared to the heat transfer per time unit provided from the oppositely directed un-laminated side 10a, see FIG. 33. Alternatively the same heat transfer per time unit may be provided to both sides 10a, 10b, as illustrated in FIG. 32, though providing a longer time delay between tc1 and tc2 and hence a longer process time.

Since the temperature of the un-laminated glass sheet 11a of the VIG unit (in FIG. 32) is kept at or near the desired target temperature Tta within H1-H2, the VIG unit's thermal deflection may be very small when the glass sheet 11b reaches the same temperature range. Hence, a stress in the lamination layer of the final VIG unit due to thermal deflection may be low or substantially zero when the VIG unit glass sheets have substantially the same temperature, this may depend on the characteristics of the lamination layer material.

Generally, in aspects of the present disclosure, the cooling may be adapted or controlled to ensure that the temperature difference Δt_vig between the VIG unit glass sheets 11a, 11b is not too large during the cooling, to reduce the risk of damaging or weaken the VIG unit. Hence, in embodiments of the present disclosure, during the controlled cooling so as to harden the lamination layer 2, the difference in temperature between said glass sheets 11a, 11b of the vacuum insulated glass unit 11 enclosing the evacuated gap may be kept below 65° C., such as below 45° C., for example below 20° C., for example below 10° C. (measured at the substantially same point in time) by means of said cooling system. This may in embodiments of the present disclosure apply for at least 50% such as at least 70%, e.g. at least 90% of the time, such as at least 99% of the time of said cooling step, which is ended at the time tc3. In FIG. 32, the temperature difference Δt_vig between the VIG glass sheets 11a, 11b is illustrated at the point in time tc1.

At tc3 the cooling step to make the lamination layer 2 harder is considered ended, in the present example at/near the lower temperature threshold H2.

A further, subsequent cooling after the time point tc3 may however in further embodiments of the present disclosure be provided to reduce the temperature of the lamination assembly with the now hardened lamination layer 2, see FIG. 32. This may for example be regulated by the cooling controller 340 as previously described or by moving the lamination assembly to a further location.

FIG. 33 illustrates schematically an embodiment of the present disclosure, where a more intense cooling is provided at the further sheet 3 compared to the cooling provided at the un-laminated side 10a of the VIG unit not comprising a lamination layer and further glass sheet. Hence, a larger heat transfer per time unit from the further sheet is obtained when compared to the heat transfer per time unit provided from the oppositely directed outer major surface 10a of the lamination assembly 10. This is despite the larger heat capacity on the laminated side given by the presence of the lamination layer that needs to be cooled to hardened, and also the further glass sheet 3.

Hence the time difference Δtc=tc2−tc1 between the point in time t1 where the VIG unit glass sheet 11a at the un-laminated side (L2), and the point in time t2 where the where VIG unit glass sheet at the laminated side (L1), reaches the temperature range where the lamination layer 2 hardens, in the present example within the hysteresis H1, H2, may be reduced. This may hence reduce the lamination process time while also providing a controlled cooling that may not e.g. risk damaging the VIG unit. Also or alternatively, it may help to provide a fast cooling while reducing the risk of unwanted stress conditions in the final laminated VIG unit when subsequently subjected to certain climatic conditions.

The cooling step (starting at time t0) and until the lamination layer 2 hardens sufficiently (at e.g. time tc3), and/or until the lamination assembly reached desired target "handling temperature", such as below 60° C. or below 45° C., may e.g. be provided for between 4 minutes and 60 minutes, such as between 6 minutes and 30 minutes, for example between 8 minutes and 15 minutes. For example, the cooling step in the chamber 300 may in aspects of the present disclosure be provided for a time less than 60 minutes, such as less than 30 minutes, for example less than 20 minutes such as less than 15 minutes. A further subsequent cooling after tc3 to further reduce the temperature of the lamination assembly may also be provided for a longer time subsequently after the hardening of the lamination layer 2 as illustrated in e.g. FIGS. 32 and 33.

In embodiments of the present disclosure, the cooling step may be provided from t0 and until the lamination assembly reached a temperature below 60° C. or below 45° C. at both surfaces 10a, 10b, and the time to reach this may be less than 60 minutes, such as less than 30 minutes, for example less than 20 minutes such as less than 15 minutes.

It is generally understood that a forced, larger heat transfer per time unit from the further sheet may be provided in various ways. For example, tit may be provided by means of providing a time delayed cooling at the outer major surface 10a facing away from the lamination layer 2 and further sheet 3. Hence an initial, forced cooling at the further sheet 3 may be provided before starting an active, forced cooling at the other side of the VIG unit may be started. This may help to bring down the temperature of the further sheet and the lamination layer, e.g. while a passive cooling of the other surface of the VIG unit may be accepted. Then, at a certain point in time (e.g. predetermined of determined by means of a temperature measurement), a forced cooling may be provided at the surface of the VIG facing away from the further sheet.

Also or alternatively, the forced, larger heat transfer per time unit from the further sheet 3 may be provided by means of providing a cooling at the further sheet 3 by a first cooling medium (e.g. a gas or liquid) having a lower temperature compared to the temperature of a second cooling medium (e.g. gas or liquid) used for cooling the oppositely directed outer major surface 10a of the lamination assembly. These cooling solutions of the outer surfaces may be provided simultaneously or be delayed in time.

In one or more still further embodiments of the present disclosure, the forced, larger heat transfer per time unit from the further sheet 3 may be provided by means of providing a larger fluid flow per time unit of a first cooling medium (e.g. a gas such as air) at the further sheet 3 when compared to the fluid flow per time unit of a cooling medium used for cooling the oppositely directed outer major surface 10a of the lamination assembly. In one or more still further embodiments of the present disclosure, the forced, larger heat transfer per time unit from the further sheet 3 may be provided by utilizing cooling systems of different types at the opposing outer surfaces of the lamination assembly. For example by providing a conduction cooling at one of the surfaces and a convection cooling at the other surface as previously disclosed.

FIG. 34 illustrates schematically a cooling profile graph according to embodiments of the present disclosure. The cooling profile CP1 represents the temperature setting, and temperature of the cooling fluid/medium used for cooling the laminated side of the VIG unit, and the dash/dotted line L2 represents the temperature of the laminated VIG unit glass sheet 11b to which the lamination layer 2 is attached during the heating step.

As can be seen in FIG. 34, the temperature of the cooling fluid is initially set to a lower temperature which is significantly lower than a desired temperature target temperature Tta for the lamination assembly. It may for example be more than 30° C. such as more than 40° C., e.g. more than 50° C. below the target temperature Tta of the lamination material 2. For example, Tc1 may be below 50° C., such as below 40° C., e.g. below 30° C. Tta. This provides a faster cooling of the further glass sheet 3 than if the temperature was for example just 5° C. or 10° C. below the Tta, or at Ta, and hence a higher temperature transfer per time unit may be achieved, which is also illustrated By L1 where the temperature reduction per time unit is higher from t0 to ts than after the temperature of the cooling fluid is increased to Tc2 at the time ts. When the temperature of the cooling fluid is increased to Tc2, e.g. to be around the Tta or between 5° C.-15° C. below the target temperature Tta, this may help to reduce the heat transfer per time unit, and hence so to say avoid or reduce an undesired or unacceptable "overshot" situation for the temperature L1. Hence, this may help to reduce the time difference Δtc, see e.g. FIG. 33.

FIG. 35 illustrates an embodiment of the present disclosure wherein the temperature of the cooling fluid (see cooling profile CP) is maintained substantially constant during the cooling step from tc0-tc3. This provides a longer cooling time for the glass sheet 11b to reach the time tc2 where the temperature of the VIG glass sheet and the lamination layer 2 gets within the desired Target temperature Tta range (defined between Hysteresis H1 and target temperature in FIG. 35).

Though, the constant cooling temperature Tc1 may be lowered, which may speed up the cooling process and hence reduce the cooling time measured between t0-t2. In FIG. 36 (illustrating an embodiment of the present disclosure), this is the case, and hence the cooling time between tc0-tc2 may be reduced (ca seen when compared to FIG. 35), which may also help to reduce the overall cooling time for the lamination assembly.

In FIG. 36 (illustrating an embodiment of the present disclosure), the significantly lower temperature Tc1 (see FIG. 36) is maintained both during and after reaching time tc2, and this provides a continuous fast reduction in temperature through the temperature range around the target temperature Tta. This may be acceptable, but may demand a more controlled temperature regulation of the temperature of the unlaminated VIG unit glass sheet 11a, so as to e.g. control the final stress conditions caused by the VIG unit's thermal deflection and/or to avoid a too large temperature difference between the glass sheets 11a, 11b of the VIG unit 11.

In FIG. 35, a further embodiment of the present disclosure is illustrated, where, after t3 the cooling step to harden the lamination layer may be considered ended (to e.g. provide a controlled hardening of the lamination layer in a predefined temperature range), the heating profile temperature is reduced to further cool the VIG unit to a more advantageous handling temperature such as below 60° C. or below 45° C. It is generally understood that the cooling step may be considered ended when the temperature of the lamination layer 2 is at the target temperature Tta of the lamination layer material, or a predefined temperature below, such as about 5° C.-15° C. below this rated temperature.

In further embodiments of the present disclosure, the cooling step may be considered ended when the lamination assembly's surfaces 10a, 10b reaches a "handling temperature" such as a temperature below 60° C. such as below 45° C.

FIG. 37 illustrates schematically a lamination solution comprising a heating step followed by a cooling step according to various embodiments of the present disclosure. Initially, a lamination assembly 10 as previously disclosed is provided. This is first subjected to a heating step at a heating location 100 so as to soften the lamination layer to provide a bonding between the VIG unit 11 and the lamination layer 2, and a bonding between the further sheet 3 and the lamination layer 2. This heating step may in embodiments of the present disclosure be provided in any suitable way, such as heating and clamping between clamping bodies, in a pressure chamber, by prior evacuation to remove gas bobbles between the lamination layer and the further sheet, and a subsequent heating or the VIG unit in at the location 100 as for example previously described in relation to one or more of the FIGS. 1-27b. It is however understood that other heating solutions at location 100 may be provided in further embodiments.

After this heating, the heated lamination assembly 10 with the heated and soft lamination layer 2 is moved to the cooling location 300, e.g. by a conveyer solution 16 such as a conveyer band solution, roller conveyers or the like on which the assembly 10 supports. Here, it is subjected to a cooling step as e.g. previously described. This is obtained by a cooling system 350 providing a controlled cooling, such as a forced cooling, of one or both major outer surfaces 10a, 10b of the heated lamination assembly so as to cool the heated lamination assembly to harden the lamination layer 2. Then the lamination assembly with the hardened lamination layer 2 leaves the cooling location 300, possibly after a further cooling to further reduce the temperature of the lamination assembly to a temperature where it may more easily be handled by automation equipment.

FIG. 38 illustrates schematically an embodiment of the present disclosure where a controlled cooling is provided after the heating step at the location 100, e.g. as previously described. Here the cooling step at the location 300 is provided as a continues cooling process where the laminated VIG unit is subjected to different cooling conditions at different cooling zones Z1-Zn from the start and to the end of the location 300 such as one or more cooling chambers.

Embodiments of this are illustrated in FIG. 39 in more details where cooling is provide by convection cooling at three Zones Z1-Zn, but it is generally understood that it may also be two zones or more than three zones in further embodiments, at one or both sides of the VIG unit.

For example, if the system 300 illustrated in FIG. 38 or 39 in embodiments of the present disclosure is used for providing the cooling profile CP1 illustrated in FIG. 34, Zone 1 may provide the cooling from the time tc0 to the time ts, the zone Z2 may be used for providing the cooling from the time ts to the time tc3, and the zone Zn may be used for providing the further cooling after the cooling step, i.e. after the time point tc3. Alternatively, this may be obtained in the same chamber in further embodiments.

In FIG. 39, a plurality of nozzles are provided to cool both the upwardly facing surface 10a, and the downwardly facing surface 10b in the first Zone 1a. The temperature of the cooling gas may be controlled by the heater or cooler 325, and/or the amount of cooling gas supplied per time unit may be controlled by the blowing unit 321. It is understood that the setting of the temperature of the cooling gas and/or the setting of the amount of cooling gas supplied per time unit may either be different or the same for both outer major surfaces 10a, 10b. Then the lamination assembly 10 enters the second, subsequent zone, e.g. as illustrated through an opening in a partition arrangement separating the zones Z1, Z2 as illustrated, and/or through an air curtain (not illustrated). Here, a further cooling to harden the lamination layer is provided, e.g. by means of a different temperature of the cooling gas and/or the setting of the amount of cooling gas supplied per time unit compared to the Zone Z1, and this may apply for both or one of the surfaces 10a, 10b of the lamination assembly. Then the lamination assembly enters the Zone Z3 to further cool to harden the lamination layer, or to reduce the temperature of the hardened lamination layer 2 and the rest of the VIG unit to a lower temperature before it leaves the outlet 302b.

The conveyer arrangement 16 may be moved with a continuous speed (without stops) from the inlet 302a to the outlet 302b, or may be moved with, e.g. predefined, time intervals, so as to move the lamination assemblies on the arrangement 16 between the zones Z1-Zn. It is understood that the conveyer arrangement may also comprise a plurality of individually controllable subparts to be able to adjust the feeding of the individual lamination assembly through the zones Z1-Zn.

It is to be understood that in further embodiments of the present disclosure, it may be a conduction cooling (see e.g. FIG. 40) or another cooling solution used for cooling at least one of the sides 10a, 10b of the lamination assembly 10, as e.g. previously described, at one or more of the zones Z1-Zn and the type of cooling (e.g. convection cooling, conduction cooling or the like) may be varied or be the same at the different zones Z1-Zn. For example, at the first zone Z1, the conduction cooling may be used to cool the further sheet 3, and at the second Z2 and/or third zone Zn, it may be convection cooling that is used to cool the same sheet 3. For example, various cooling solutions as disclosed in relation to FIGS. 28-31 may be used for the different zones Z1-Zn and may be different for these zones.

The different zones Z1-Zn may in embodiments of the present disclosure hence subject the lamination assembly 10 to different cooling environments, e.g. by providing different cooling temperatures at the different zones, by providing a different amount of cooling gas (in case of convection cooling) by a forced cooling at the different zones, by shifting between convection and conduction cooling and/or the like.

FIG. 40 illustrates schematically an embodiment of the present disclosure, where the cooling step is provided at different zones Z1-Zn as described In relation to e.g. FIGS. 38 and 39. Here, the cooling of the downwardly facing surface 10b of the VIG unit, e.g. the side where the further sheet and lamination layer 2 is placed, is provided by conduction cooling systems 310, which are set different for the different zones to e.g. provide a predetermined cooling profile CP1 during the transport of the lamination assembly 10 through the chamber 300. The temperature of the cooling fluid in the conduction cooling systems 310 at the different zones Z1-Zn may hence be set to be different in an embodiment of the present disclosure.

While the present disclosure has been described in detail in connection with only a limited number of embodiments or aspects, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments or aspects of the present disclosure have been described, it is to be understood that aspects of the present disclosure may include only some of the described embodiments or aspects or combinations of the various embodiments or aspects. Accordingly, the present disclosure is not to be seen as limited by the foregoing description.

The invention claimed is:

1. A method of providing a laminated vacuum insulated glass (VIG) unit, wherein the method comprises:
   providing a lamination assembly comprising
      a vacuum insulated glass (VIG) unit comprising at least two glass sheets separated by a plurality of support structures distributed in a gap between the glass sheets, and
      a lamination layer arranged between one of the glass sheets of the vacuum insulated glass (VIG) unit and a further sheet,
   subjecting said lamination assembly to a heating step at a heating location so as to soften said lamination layer to provide a bonding between the VIG unit and the lamination layer, and a bonding between the further sheet and the lamination layer, and
   subjecting said heated lamination assembly to a cooling step provided by a cooling system, wherein said cooling step comprises providing a controlled cooling of one or both major outer surfaces of the heated lamination assembly so as to cool said heated lamination assembly to harden said lamination layer;
      wherein a difference in temperature between said glass sheets of the vacuum insulated glass unit enclosing said gap is kept below 65° C., during said cooling step during at least 50% of the time of said cooling step.

2. A method according to claim 1, wherein said controlled cooling is a forced cooling.

3. A method according to claim 1, wherein said controlled cooling forces a larger heat transfer per time unit from said further sheet when compared to a heat transfer per time unit provided from an oppositely directed outer major surface of the lamination assembly.

4. A method according to claim 3, wherein said forced, larger heat transfer per time unit from the further sheet is provided by means of providing a time delayed cooling at said oppositely directed outer major surface of the lamination assembly.

5. A method according to claim 3, wherein said forced, larger heat transfer per time unit from the further sheet is provided by means of providing a cooling at the further sheet by a first cooling medium having a lower temperature compared to a temperature of a second cooling medium used for cooling said oppositely directed outer major surface of the lamination assembly.

6. A method according to claim 1, wherein said controlled cooling provides a forced cooling of both oppositely directed outer major surfaces of the heated lamination assembly by means of different cooling systems.

7. A method according to claim 1, wherein said cooling step is provided in one or more cooling chambers enclosed by walls of a cooling arrangement, and wherein a transport system, is configured to transport the heated lamination assembly from said heating location and into the one or more cooling chambers.

8. A method according to claim 1, wherein said controlled cooling subjects the lamination assembly to a controlled change of a cooling temperature provided by a cooling medium utilized at one or both of said major outer surfaces of the lamination assembly during said cooling step.

9. A method according to claim 1, wherein said lamination assembly is moved between different cooling zones utilizing different cooling systems during said cooling step.

10. A method according to claim 1, wherein said controlled cooling comprises providing a conduction cooling by means of a conduction cooling system to at least one of said outer major surfaces of the lamination assembly by means of one or more cooling bodies, wherein said conduction cooling is provided to the outer major surface of the lamination assembly which is arranged at a side of the vacuum insulated glass unit where said further sheet and said lamination layer is placed.

11. A method according to claim 1, wherein at least a part of said controlled, forced cooling is a convection cooling provided by means of a convection cooling system utilizing a temperature controlled cooling gas, provided in a convection cooling chamber, wherein said convection cooling is provided by supplying a cooling gas through one or more gas outlets of a cooling gas outlet arrangement.

12. A method according to claim 11, wherein at least a part of said convection cooling is provided so as to cool a glass sheet of the vacuum insulated glass unit facing away from the further sheet.

13. A method according to claim 1, wherein one of the outer major surfaces of the lamination assembly is cooled by means of conduction cooling, and wherein another outer major surface is cooled by means of convection cooling.

14. A method according to claim 1, wherein said cooling step is terminated when the lamination layer has reached a temperature which is below 95° C.

15. A method according to claim 1, wherein the difference in temperature between said glass sheets of the vacuum insulated glass unit enclosing said gap is kept below 45° C., during said cooling step during at least 70% of the time of said cooling step.

16. A method according to claim 1, wherein said cooling step is provided for a time span which is between 6 minutes and 30 minutes.

17. A method according to claim 1, wherein said heating step comprises:
   arranging the lamination assembly between clamping bodies providing clamping surfaces, displacing at least one of said clamping surfaces by one or more clamping body displacers, to change a distance between the clamping surfaces, so as to provide a compression pressure to the lamination assembly by the clamping surfaces, and
   heating the lamination assembly between the clamping bodies by means of a heating arrangement.

18. A method according to claim 1, wherein said heating step comprises:
   that an outer major surface of the further sheet is subjected to a first heating temperature, and
   that an outer, major surface of the glass sheet of the vacuum insulated glass unit facing away from the further sheet is simultaneously subjected to a second heating temperature, wherein the first temperature is higher than the second temperature.

19. A method according to claim 18, wherein the first heating temperature is provided by a first heating arrangement, and wherein the second heating temperature is provided by a second heating arrangement.

20. A method according to claim 17, wherein a heating of an outer major surface of the lamination assembly facing away from the further sheet is time delayed compared to an initiation of a heating at an outwardly facing major surface of the further sheet.

* * * * *